US012530659B2

(12) United States Patent
Kolambkar et al.

(10) Patent No.: US 12,530,659 B2
(45) Date of Patent: Jan. 20, 2026

(54) CONTENT COLLABORATION PLATFORM WITH AN ENTITY CARD INTERFACE AND CROSS-PRODUCT TOPIC-BASED DATA STRUCTURES

(71) Applicant: Atlassian Pty Ltd., Sydney (AU)

(72) Inventors: Navin Kolambkar, Sydney (AU); Zhaohui Wang, Mountain View, CA (US); Yulia Shevchenko, Mountain View, CA (US); Isabelle Jana Kohout, Sydney (AU); Aniket Bhosale, Mountain View, CA (US); Stacey Law, Bellevue, WA (US); Victoria Huynh, Mountain View, CA (US); Geoff Sims, Sydney (AU); Helena Cuenca-Cruz, Vancouver (CA)

(73) Assignee: ATLASSIAN PTY LTD., Sydney (AU)

( * ) Notice: Subject to any disclaimer, the term of this patent is extended or adjusted under 35 U.S.C. 154(b) by 0 days.

(21) Appl. No.: 18/759,503

(22) Filed: Jun. 28, 2024

(65) Prior Publication Data
US 2026/0004243 A1 Jan. 1, 2026

(51) Int. Cl.
*G06F 16/00* (2019.01)
*G06F 16/355* (2025.01)
*G06F 21/31* (2013.01)
*G06F 40/205* (2020.01)
*G06F 40/279* (2020.01)
(Continued)

(52) U.S. Cl.
CPC ......... *G06Q 10/101* (2013.01); *G06F 16/355* (2019.01); *G06F 21/31* (2013.01); *G06F 40/205* (2020.01); *G06F 40/279* (2020.01); *G06F 40/30* (2020.01)

(58) Field of Classification Search
CPC ...... G06Q 10/10; G06Q 50/01; G06Q 10/101; G06F 3/0481; G06F 16/285; G06F 21/31; G06F 40/205; G06F 16/35; G06F 40/30; G06F 40/279; H04L 12/1822; H04L 51/214; G06N 20/00
See application file for complete search history.

(56) References Cited

U.S. PATENT DOCUMENTS 8,938,690 B1 * 1/2015 Khouri ................... G06Q 50/01
715/753
2014/0317116 A1 * 10/2014 Shah ...................... G06Q 50/01
707/737

(Continued)

*Primary Examiner* — Yicun Wu
(74) *Attorney, Agent, or Firm* — Brownstein Hyatt Farber Schreck, LLP

(57) ABSTRACT

Embodiments described herein relate to systems and methods for generating and displaying content for an entity card interface of a collaboration platform. The entity card interface may be displayed in response to a natural language input or inquiry of a search interface or the entity card interface may also be displayed in response to a user selection of text or a designated object within user-generated content of an editor. The systems and methods described use a network architecture that includes a prompt generation service and a set of one or more purpose-configured large language model instances (LLMs) and/or other trained classifiers or natural language processors used to provide generative responses for content collaboration platforms.

20 Claims, 23 Drawing Sheets

(51) Int. Cl.
 *G06F 40/30* (2020.01)
 *G06Q 10/101* (2023.01)

(56) References Cited

U.S. PATENT DOCUMENTS

2018/0285996 A1* 10/2018 Ma .................... H04L 9/0637
2020/0412676 A1* 12/2020 Kau .................. H04L 12/1822

* cited by examiner

PERSON
JULIA RAMIREZ
PRODUCT OWNER, DEPOSITS SECURITY ~812
TORONTO, CANADA • 9:34 AM LOCAL TIME

810 ~820

TOPIC 1 | TOPIC 2 | ✉ | ✻ | VIEW PROFILE ~831

813a → WORKED ON | CONTRIBUTING TO | WORKS WITH ~811

SECURE WALLET PROJECTIONS
SPREADSHEET • JULIA RAMIREZ UPDATED YESTERDAY

815a → SECURE WALLET PROJECT STRATEGY
WEBSITE PAGE • JULIA RAMIREZ UPDATED 3 DAYS AGO

SECURE WALLET PROJECT STRATEGY  814
WEBSITE PAGE • JULIA RAMIREZ UPDATED 3 DAYS AGO

SECURE WALLET STRATEGY
PRESENTATION • JULIA RAMIREZ UPDATED 4 DAYS AGO

⌄ VIEW MORE

RESPONSES FOLLOW YOUR PERMISSIONS, QUALITY AND CONTENT MAY VARY    POWERED BY AI ✻

PERSON
JULIA RAMIREZ
PRODUCT OWNER, DEPOSITS SECURITY
TORONTO, CANADA • 9:34 AM LOCAL TIME

TOPIC 1 | TOPIC 2 | ✉ | ✻ | VIEW PROFILE

~820

WORKED ON | CONTRIBUTING TO ← 813b | WORKS WITH

CURRENT GOALS

815b → ⊚ GROW CUSTOMER BASE BY 8% IN Q3      [ON TRACK] FOR [📅 APR-JUN]
⊚ INCREASE MAU BY 12% IN Q2FY25           [AT RISK] FOR [📅 JUL-SEPT]

CURRENT PROJECTS

816b → ⊚ PROJECT 1          814          [ON TRACK] FOR [📅 APR-JUN]
⊚ PROJECT 2                             [AT RISK] FOR [📅 JAN-MAR]

RESPONSES FOLLOW YOUR PERMISSIONS, QUALITY AND CONTENT MAY VARY    POWERED BY AI ✻

| PERSON | | TOPIC 1 | TOPIC 2 | ✉ | ✿ | VIEW PROFILE |

JULIA RAMIREZ
PRODUCT OWNER, DEPOSITS SECURITY
TORONTO, CANADA • 9:34 AM LOCAL TIME

813c

820

WORKED ON   CONTRIBUTING TO   WORKS WITH

---

(P1) PLATFORM 1　　　　　　　　　　　🯅🯅🯅 5

815c →

(P2) PLATFORM 2　　　　　　　　　　　🯅🯅🯅 7

👤 JOHN SMITH
　　PRODUCT OWNER, DEPOSIT SECURITY　　814

👤 JANE DOE
　　PRODUCT OWNER, DEPOSIT SECURITY

[˅] VIEW MORE

---

RESPONSES FOLLOW YOUR PERMISSIONS, QUALITY AND CONTENT MAY VARY　　POWERED BY AI ✦

| PROJECT | TOPIC A | TOPIC B | FOLLOW |

SECURE WALLET

[AT RISK] FOR [📅 APR-JUN] ~912          910          ~920

913a ~ OVERVIEW    UPDATES    CONTRIBUTORS    LINKS ~911

ABOUT
SECURE WALLET IS A REVOLUTIONARY PROJECT AIMED AT PROVIDING USERS WITH A HIGHLY SECURE AND USER-FRIENDLY DIGITAL WALLET SOLUTION. IN AN ERA WHERE DIGITAL TRANSACTIONS ARE INCREASINGLY PREVALENT, ENSURING THE SAFETY OF FINANCIAL ASSETS IS PARAMOUNT. SECURE WALLET...

CONTRIBUTES TO GOALS                        914

915a ~ ◎ HARDEN SECURITY BY FY25                     [ON TRACK]
       ◎ REDUCE NON-LENDING LOSS BY $3M IN FY25       [AT RISK]

RESPONSES FOLLOW YOUR PERMISSIONS. QUALITY AND CONTENT MAY VARY    POWERED BY AI ✳

| PROJECT | TOPIC A | TOPIC B | FOLLOW |

SECURE WALLET

[AT RISK] FOR [📅 APR-JUN]                         ~920

OVERVIEW    UPDATES    CONTRIBUTORS    LINKS

👤 JANE DOE                           [ON TRACK] FOR [📅 JANUARY]
4 DAYS AGO • 21 PEOPLE VIEWED

📄 SHIPPED:
  • STAY ON TOP OF YOUR ORG IN PLATFORM 1 - FILTER PROJECT AND GOALS BY REPORTING LINE
915b ~ • TC-3314: ADD SOME PERSONALITY TO THE "ADD COMMENT..." TEXT BOX
  • SOFT DELETE FOR WORKSPACES (VIDEO DEMO)
  • MS TEAMS APP RENAME IS LIVE

📄 READ:                               914
  • PRODUCT GROUP LEADERSHIP CHECK-IN (SHARED LEARNINGS & PLANS):
    [📄 PLATFORM 1 PRE-GA CHECK-IN]

[SEE MORE ON PLATFORM 2]

RESPONSES FOLLOW YOUR PERMISSIONS. QUALITY AND CONTENT MAY VARY    POWERED BY AI ✳

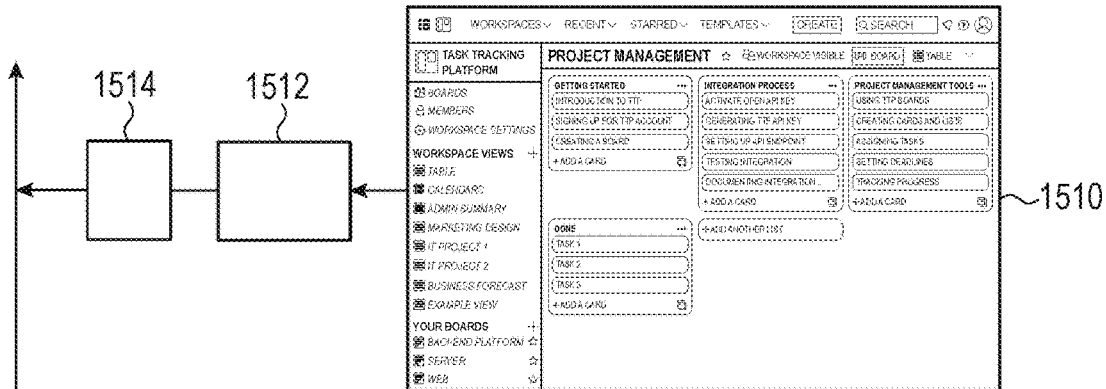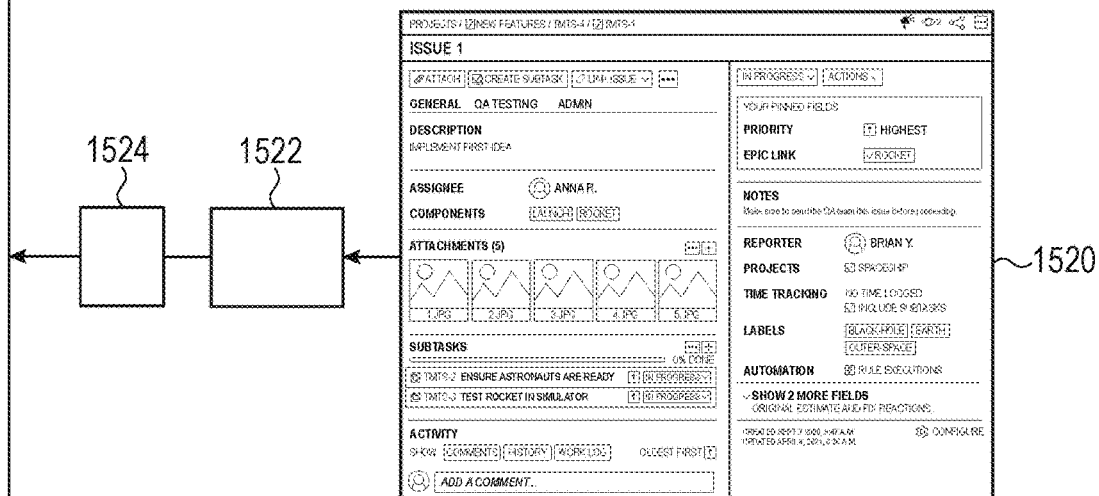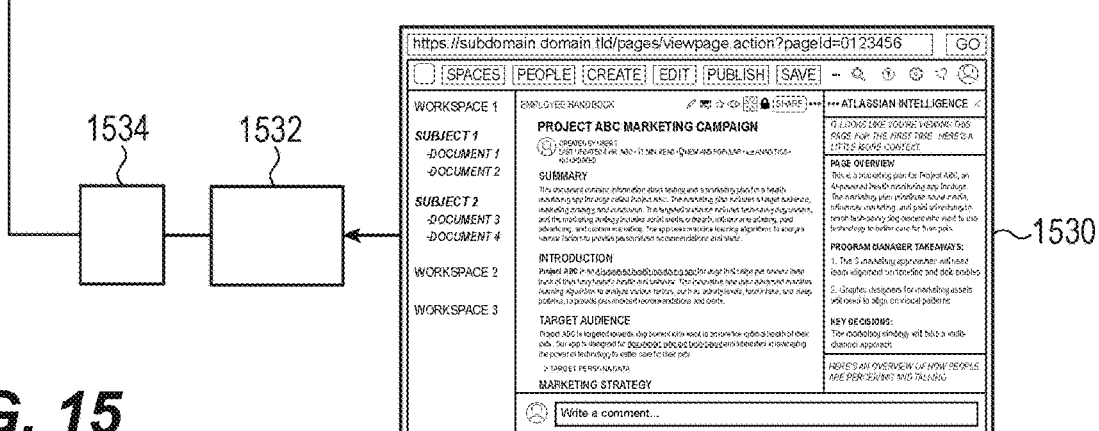
FIG. 15

CONTENT COLLABORATION PLATFORM WITH AN ENTITY CARD INTERFACE AND CROSS-PRODUCT TOPIC-BASED DATA STRUCTURES

TECHNICAL FIELD

Embodiments described herein relate to multitenant services of collaborative work environments and, in particular, to systems and methods for generating an entity card interface and top-based data structures in a content collaboration platform.

BACKGROUND

An organization can establish a collaborative work environment by self-hosting, or providing its employees with access to, a suite of discrete software platforms or services to facilitate cooperation and completion of work. In some collaborative work environments, a large amount of user-generated content may be created across multiple platforms. It can be difficult to locate relevant content and even more difficult to synthesize answers, identify related entities, and identify other relevant content in response to user search queries in an efficient an accurate manner. The systems and techniques described herein may be used to identify and extract relevant content from multiple collaboration platforms and present generative and curated results in an entity card interface.

SUMMARY

Embodiments described herein are directed to a computer-implemented method for generating and displaying content for an entity card interface of a collaboration platform. The entity card interface may be displayed in response to a natural language input or inquiry, or the entity card interface may also be displayed in response to a user selection of text or a designated object within user-generated content of an editor. The systems and methods described use a network architecture that includes a prompt generation service and a set of one or more purpose-configured large language model instances (LLMs) and/or other trained classifiers or natural language processors used to provide generative responses for content collaboration platforms.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

FIGS. 6A-6B depict another example graphical user interface of a content collaboration platform having a generative answer interface.

Figure 7:
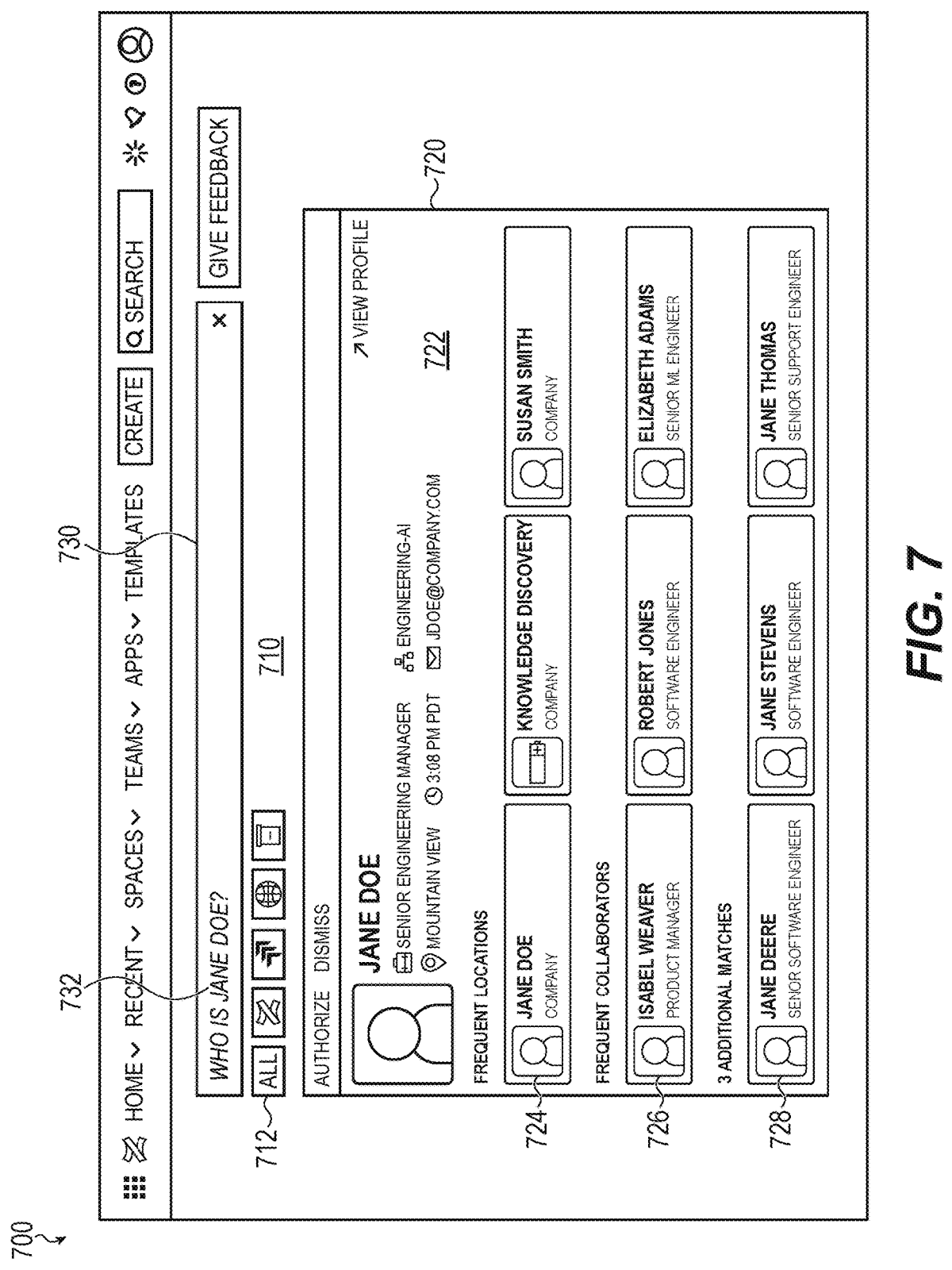

FIG. 7 depicts an example graphical interface of a content collaboration platform having an entity card interface.

FIGS. 8A-8C depict an example entity card interface.

FIGS. 9A-9D depict another example entity card interface.

FIGS. 12 and 13 depict an example graphical interface of a content collaboration platform having an entity card interface.

FIG. 15 depicts a schematic view of a system for providing a generative answer interface across a multi-platform system.

The use of the same or similar reference numerals in different figures indicates similar, related, or identical items.

Figure 1:
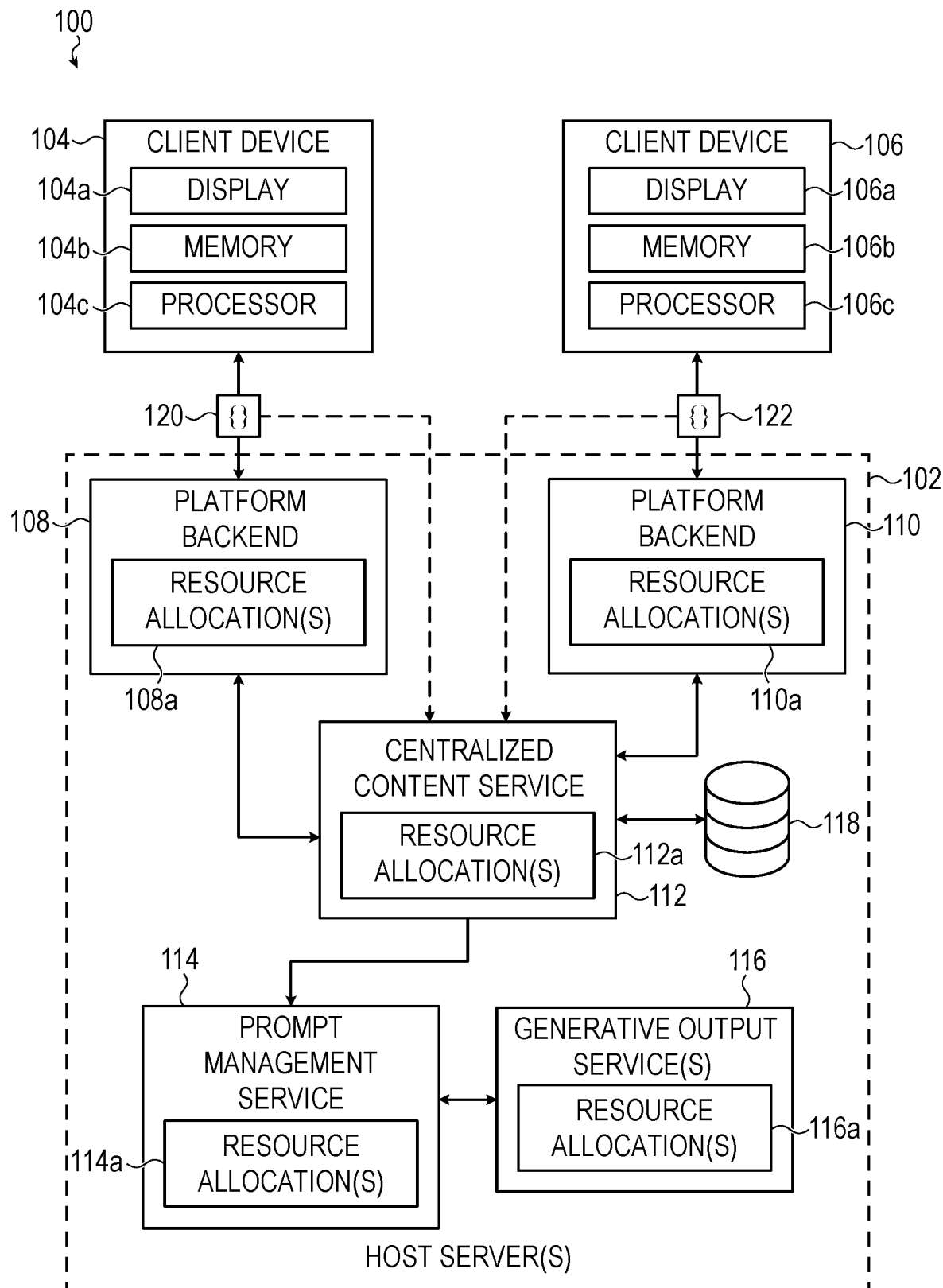
FIG. 1 depicts a simplified diagram of a system, such as described herein that can include and/or may receive input from a generative output engine.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems and methods for automatically generating content, generating API requests and/or request bodies, structuring user-generated content, and/or generating structured content in collaboration platforms, such as documentation systems, issue tracking systems, project management platforms, and the like. Specifically, some examples described herein are directed to an entity card interface, which may be accessed via designated content objects or other text in user-generated content of the collaboration platform. The entity card interface provides content that is generated using content extracted from documentation, issues, and other content items of the collaboration platform. The entity card also includes selectable card objects that may be selected using a topic-based data structure.

Generally, an entity card interface may be used to provide context-specific definitions and curated selectable elements linking to related content and resources. The content of the entity card interface may be both adapted to the content used by a particular tenant and also based on what predicted to be authoritative content. The content of the entity card can be dynamically generated, and the curated objects displayed in the entity card interface may be selected based, at least in part, on a topic-based data structure. In some embodiments, an entity data graph or other data structure may be used to maintain the content and relationships between a particular entity and other content items or data objects.

As described herein, the entity card interface may include one or more selectable topic elements that are generated using tenant specific content. Each selectable topic element may correspond to a respective topic-based data structure. The topic elements indicate how the entity may be related to more general subject matter, themes, or initiatives within the organization. The topic elements, through the use of a topic-based data structure, may link content items and other objects across multiple platforms or services, which may facilitate topic-based navigation and allow for more efficient navigation across platforms or services. In some implementations, the topic-based data structure is constructed using designated content that is precited to have authoritative or accurate content based on monitored usage and user interactions on the platform. As described herein, text snippets or text blocks may be extracted from the designated content and clusters of text may be defined using a numerical or vector-based natural-language processing techniques. For a given cluster of text snippets or blocks, a set of keywords may be extracted. A topic string or phrase may be determined based on the set of keywords. As described herein, a text prompt may be generated using extracted keywords and other predetermined text. The topic strings may be determined by providing the prompt to a generative output engine and analyzing the corresponding generative response produced in response to the prompt. Additionally, the content of the cluster of text snippets or blocks may be analyzed to identify related content including linked documents, issued managed by an external platform like an issue tracking platform, references to system users, projects managed by a project management platform or registry, and other content and data objects. The topic string may be used to generate or modify a topic-based data structure and the related content may be associated with or linked to the respective topic-based data structure. Using these relationships between cross-platform content, users may quickly navigate to obtain the content related to a particular topic or entity, as described herein.

As described herein, an entity card interface may be displayed in response to a user selection of particular content or text of a document or page. In some implementations the user-generated content of the document or page is parsed by the system and keywords associated with a top-based data structure is identified and replaced with selectable objects. The selectable objects may include the text of the original keyword and may be highlighted, bolded, or otherwise displayed in a manner that is visually distinct from the surrounding text in order to visually indicate that an entity card is available for the selectable object. In some implementations, an entity card interface may be displayed in response to a user selection of ordinary or non-highlighted text.

Other examples described herein provide access to an entity card interface using a generative interface also referred to as a generative answer interface. The generative answer interface may be invoked from a search field or interface and, depending on the user input, may provide one of a number of different response styles, each having distinct substantive content. Generally, the generative interface system can be used to synthesize and identify content in response to a natural language query or other user input. The generative interface may be integrated with one or more collaboration platforms hosting content items (e.g., pages, knowledge base documents, issues, source code and documentation) that can be used to synthesize an automatically generated answer, links to relevant content, and/or summaries of content.

In some implementations, the generative interface is configured to receive user input including natural language text that may include a request for a cross-platform search, an interrogatory or question, or a request for an entity, which may include a user, project, or other system-defined term or phrase. The natural language input may be analyzed to determine an intent and different results and different interfaces are produced depending on the determined intent. For example, in accordance with an intent determination consistent with a search request, the generative interface provide the content search interface which produces cross-platform search results and other resources in response to the user input. In accordance with an intent determination consistent with an interrogatory or natural language question, the generative interface may be adapted to include a generative response region that displays generated or synthesized content that is generated based on content extracted from relevant content items managed by a respective collaboration platform. In accordance with an intent determination consistent with a request for an entity, the generative interface may include an entity card, which includes information about the requested entity, generative content, and other content items and data objects linked to the entity by a topic-based data structure. As described herein, a topic-based data structure may be generated using clustered and analyzed blocks or snippets of content and may be used to define and manage relationships between content items, user profiles, project profiles, messaging channels, and other objects.

With regard to the generative answer interface, in some implementations, the generative interface is adapted to interface with multiple collaboration platforms, each platform hosting native content that may vary widely from other platforms in the system. The generative interface may produce generative responses that are based on portions of content extracted from multiple different platform sources and synthesize a response that is more accurately tailored to the user's query and may avoid both repeated individual queries to the separate platforms or potential inaccuracies when compiling multiple individual responses. In some implementations, the system is able to electronically tag extracted portions of content used to synthesize the generative response. The electronic tags may be used to identify content that was used in formulating the response and the interface may include a curated set of links to content items containing the extracted content. In some cases, the generative response may include snippets of the respective content, which may be selectable to cause display of the content in the respective platform hosting the content.

Automatically generated content can supplement, summarize, format, and/or structure existing tenant-owned user-generated content created by a user while operating a software platform, such as described herein. In one embodiment, user-generated content can be supplemented by an automatically generated summary or answer. The generated summary may be rendered or displayed in a generative interface and, in some cases, may be inserted into user generated content of a content item managed by the respective platform. In yet other examples, the generated summary may be transmitted to another application, messaging system, or notification system. For example, a generated document summary can be attached to an email, a notification, a chat or ITSM support message, or the like, in lieu of being attached or associated with the content it summarizes. In yet other examples, multiple disparate user-generated content items, stored in different systems or in different locations, can be collapsed together into a single summary or list of summaries.

The generative interface may be adapted to handle a wide range of inquiries or natural language question input drawing from the user generated content provided by one or more of the collaboration platforms. In some cases, the generative answer interface may be adapted for an information technology service management (ITSM) environment. For example, automatically generated content can summarize and/or link to one or more documents that outline troubleshooting steps for common problems. In these examples, the customer experiencing an issue can receive through the interface, one or more suggestions that summarize steps outlined in comprehensive documentation, link to a relevant portion of comprehensive documentation, and/or prompt the customer to provide more information. In another case, a service agent can be assisted by automatically generated content that summarizes steps outlined in comprehensive documentation and/or one or more internal documentation tools or platforms, provides links to relevant portions of comprehensive help documentation, and/or prompt the service agent to request more information from the customer. In some cases, generated content can include questions that may help to further narrowly characterize the customer's problem. The generative interface may also be used to identify key individuals or subject-matter experts in response to an entity inquiry. The generative interface may be used to identify related projects or initiatives that are documented in one or more of the related platforms. More generally, automatically generated content can assist either or both service agents and customers in an ITSM or self-help environment.

In addition to embodiments in which automatically generated content is generated in respect of existing user-generated content (and/or appended thereto), automatically generated content, as described herein, can also be used to supplement API requests and/or responses generated within a multiplatform collaboration environment. For example, in some embodiments, API request bodies can be generated automatically leveraging systems described herein. The API request bodies can be appended to an API request provided as input to any suitable API of any suitable system. In many cases, an API with a generated body can include user-specific, API-specific, and/or tenant-specific authentication tokens that can be presented to the API for authentication and authorization purposes.

The foregoing embodiments are not exhaustive of the manners by which automatically generated content can be used in multi-platform computing environments, such as those that include more than one collaboration tool. More generally and broadly, embodiments described herein include systems configured to automatically generate content within environments defined by software platforms. The content can be directly consumed by users of those software platforms or indirectly consumed by users of those software platforms (e.g., formatting of existing content, causing existing systems to perform particular tasks or sequences of tasks, orchestrate complex requests to aggregate information across multiple documents or platforms, and so on) or can integrate two or more software platforms together (e.g., reformatting or recasting user generated content from one platform into a form or format suitable for input to another platform).

Scalable Network Architecture for Automatic Content Generation

More specifically, systems and methods described herein can leverage a scalable network architecture that includes an input request queue, a normalization (and/or redaction) preconditioning processing pipeline, an optional secondary request queue, and a set of one or more purpose-configured large language model instances (LLMs) and/or other trained classifiers or natural language processors.

Collectively, such engines or natural language processors may be referred to herein as "generative output engines." A system incorporating a generative output engine can be referred to as a "generative output system" or a "generative output platform." Broadly, the term "generative output engine" may be used to refer to any combination of computing resources that cooperate to instantiate an instance of software (an "engine") in turn configured to receive a string prompt as input and configured to provide, as deterministic or pseudo-deterministic output, generated text which may include words, phrases, paragraphs and so on in at least one of (1) one or more human languages, (2) code complying with a particular language syntax, (3) pseudocode conveying in human-readable syntax an algorithmic process, or (4) structured data conforming to a known data storage protocol or format, or combinations thereof.

The string prompt (or "input prompt" or simply "prompt") received as input by a generative output engine can be any suitably formatted string of characters, in any natural language or text encoding. In some examples, prompts can include non-linguistic content, such as media content (e.g., image attachments, audiovisual attachments, files, links to other content, and so on) or source or pseudocode. In some cases, a prompt can include structured data such as tables, markdown, JSON formatted data, XML formatted data, and the like. A single prompt can include natural language portions, structured data portions, formatted portions, portions with embedded media (e.g., encoded as base64 strings, compressed files, byte streams, or the like) pseudocode portions, or any other suitable combination thereof.

The string prompt may include letters, numbers, whitespace, punctuation, and in some cases formatting. Similarly, the generative output of a generative output engine as described herein can be formatted/encoded according to any suitable encoding (e.g., ISO, Unicode, ASCII as examples). In these embodiments, a user may provide input to a software platform coupled to a network architecture as described herein. The user input may be in the form of interaction with a graphical user interface affordance (e.g., button or other UI element), or may be in the form of plain text. In some cases, the user input may be provided as typed string input provided to a command prompt triggered by a preceding user input.

For example, the user may engage with a button in a UI that causes a command prompt input box to be rendered, into which the user can begin typing a command. In other cases, the user may position a cursor within an editable text field and the user may type a character or trigger sequence of characters that cause a command-receptive user interface element to be rendered. As one example, a text editor may support slash commands-after the user types a slash character, any text input after the slash character can be considered as a command to instruct the underlying system to perform a task.

Regardless of how a software platform user interface is instrumented to receive user input, the user may provide an input that includes a string of text including a natural language request or instruction (e.g., a prompt). The prompt may be provided as input to an input queue including other requests from other users or other software platforms. Once the prompt is popped from the queue, it may be normalized and/or preconditioned by a preconditioning service.

The preconditioning service can, without limitation: append additional context to the user's raw input; may insert the user's raw input into a template prompt selected from a set of prompts; replace ambiguous references in the user's input with specific references (e.g., replace user-directed pronouns with user IDs, replace @mentions with user IDs, and so on); correct spelling or grammar; translate the user input to another language; or other operations. Thereafter, optionally, the modified/supplemented/hydrated user input can be provided as input to a secondary queue that meters and orders requests from one or more software platforms to a generative output system, such as described herein. The generative output system receives, as input, a modified prompt and provides a continuation of that prompt as output which can be directed to an appropriate recipient, such as the graphical user interface operated by the user that initiated the request or such as a separate platform. Many configurations and constructions are possible.

Large Language Models

An example of a generative output engine of a generative output system as described herein may be a large language model (LLM). Generally, an LLM is a neural network specifically trained to determine probabilistic relationships between members of a sequence of lexical elements, characters, strings or tags (e.g., words, parts of speech, or other subparts of a string), the sequence presumed to conform to rules and structure of one or more natural languages and/or the syntax, convention, and structure of a particular programming language and/or the rules or convention of a data structuring format (e.g., JSON, XML, HTML, Markdown, and the like).

More simply, an LLM is configured to determine what word, phrase, number, whitespace, nonalphanumeric character, or punctuation is most statistically likely to be next in a sequence, given the context of the sequence itself. The sequence may be initialized by the input prompt provided to the LLM. In this manner, output of an LLM is a continuation of the sequence of words, characters, numbers, whitespace, and formatting provided as the prompt input to the LLM.

To determine probabilistic relationships between different lexical elements (as used herein, "lexical elements" may be a collective noun phase referencing words, characters, numbers, whitespace, formatting, and the like), an LLM is trained against as large of a body of text as possible, comparing the frequency with which particular words appear within N distance of one another. The distance N may be referred to in some examples as the token depth or contextual depth of the LLM.

In many cases, word and phrase lexical elements may be lemmatized, part of speech tagged, or tokenized in another manner as a pretraining normalization step, but this is not required of all embodiments. Generally, an LLM may be trained on natural language text in respect of multiple domains, subjects, contexts, and so on; typical commercial LLMs are trained against substantially all available internet text or written content available (e.g., printed publications, source repositories, and the like). Training data may occupy petabytes of storage space in some examples.

As an LLM is trained to determine which lexical elements are most likely to follow a preceding lexical element or set of lexical elements, an LLM must be provided with a prompt that invites continuation. In general, the more specific a prompt is, the fewer possible continuations of the prompt exist. For example, the grammatically incomplete prompt of "can a computer" invites completion, but also represents an initial phrase that can begin a near limitless number of probabilistically reasonable next words, phrases, punctuation and whitespace. A generative output engine may not provide a contextually interesting or useful response to such an input prompt, effectively choosing a continuation at random from a set of generated continuations of the grammatically incomplete prompt.

By contrast, a narrower prompt that invites continuation may be "can a computer supplied with a 30 W power supply consume 60 W of power?" A large number of possible correct phrasings of a continuation of this example prompt exist, but the number is significantly smaller than the preceding example, and a suitable continuation may be selected or generated using a number of techniques. In many cases, a continuation of an input prompt may be referred to more generally as "generated text" or "generated output" provided by a generative output engine as described herein.

Generally, many written natural languages, syntaxes, and well-defined data structuring formats can be probabilistically modeled by an LLM trained by a suitable training dataset that is both sufficiently large and sufficiently relevant to the language, syntax, or data structuring format desired for automatic content/output generation.

In addition, because punctuation and whitespace can serve as a portion of training data, generated output of an LLM can be expected to be grammatically and syntactically correct, as well as being punctuated appropriately. As a result, generated output can take many suitable forms and styles, if appropriate in respect of an input prompt.

Further, as noted above in addition to natural language, LLMs can be trained on source code in various highly structured languages or programming environments and/or on data sets that are structured in compliance with a particular data structuring format (e.g., markdown, table data, CSV data, TSV data, XML, HTML, JSON, and so on).

As with natural language, data structuring and serialization formats (e.g., JSON, XML, and so on) and high-order programming languages (e.g., C, C++, Python, Go, Ruby, JavaScript, Swift, and so on) include specific lexical rules, punctuation conventions, whitespace placement, and so on. In view of this similarity with natural language, an LLM generated output can, in response to suitable prompts, include source code in a language indicated or implied by that prompt.

For example, a prompt of "what is the syntax for a while loop in C and how does it work" may be continued by an LLM by providing, in addition to an explanation in natural language, a C++ compliant example of a while loop pattern. In some cases, the continuation/generative output may include format tags/keys such that when the output is rendered in a user interface, the example C++ code that forms a part of the response is presented with appropriate syntax highlighting and formatting.

As noted above, in addition to source code, generative output of an LLM or other generative output engine type can include and/or may be used for document structuring or data structuring, such as by inserting format tags (e.g., markdown). In other cases, whitespace may be inserted, such as paragraph breaks, page breaks, or section breaks. In yet other examples, a single document may be segmented into multiple documents to support improved legibility. In other cases, an LLM generated output may insert cross-links to other content, such as other documents, other software platforms, or external resources such as websites.

In yet further examples, an LLM generated output can convert static content to dynamic content. In one example, a user-generated document can include a string that contextually references another software platform. For example, a documentation platform document may include the string "this document corresponds to project ID 123456, status of which is pending." In this example, a suitable LLM prompt may be provided that causes the LLM to determine an association between the documentation platform and a project management platform based on the reference to "project ID 123456."

In response to this recognized context, the LLM can wrap the substring "project ID 123456" in anchor tags with an embedded URL in HTML-compliant syntax that links directly to project 123456 in the project management platform, such as: "<a href='https://example link/123456>project 123456</a>".

In addition, the LLM may be configured to replace the substring "pending" with a real-time updating token associated with an API call to the project management system. In this manner, this manner, the LLM converts a static string within the document management system into richer content that facilitates convenient and automatic cross-linking between software products, which may result in additional downstream positive effects on performance of indexing and search systems.

In further embodiments, the LLM may be configured to generate as a portion of the same generated output a body of an API call to the project management system that creates a link back or other association to the documentation platform. In this manner, the LLM facilitates bidirectional content enrichment by adding links to each software platform.

More generally, a continuation produced as output by an LLM can include not only text, source code, pseudocode, structured data, and/or cross-links to other platforms, but it also may be formatted in a manner that includes titles, emphasis, paragraph breaks, section breaks, code sections, quote sections, cross-links to external resources, inline images, graphics, table-backed graphics, and so on.

In yet further examples, static data may be generated and/or formatted in a particular manner in a generative output. For example, a valid generative output can include JSON-formatted data, XML-formatted data, HTML-formatted data, markdown table formatted data, comma-separated value data, tab-separated value data, or any other suitable data structuring defined by a data serialization format.

Transformer Architecture

In many constructions, an LLM may be implemented with a transformer architecture. In other cases, traditional encoder/decoder models may be appropriate. In transformer topologies, a suitable self-attention or intra-attention mechanism may be used to inform both training and generative output. A number of different attention mechanisms, including self-attention mechanisms, may be suitable.

In sum, in response to an input prompt that at least contextually invites continuation, a transformer-architected LLM may provide probabilistic, generated, output informed by one or more self-attention signals. Even still, the LLM or a system coupled to an output thereof may be required to select one of many possible generated outputs/continuations.

In some cases, continuations may be misaligned in respect of conventional ethics. For example, a continuation of a prompt requesting information to build a weapon may be inappropriate. Similarly, a continuation of a prompt requesting to write code that exploits a vulnerability in software may be inappropriate. Similarly, a continuation requesting drafting of libelous content in respect of a real person may be inappropriate. In more innocuous cases, continuations of an LLM may adopt an inappropriate tone or may include offensive language.

In view of the foregoing, more generally, a trained LLM may provide output that continues an input prompt, but in some cases, that output may be inappropriate. To account for these and other limitations of source-agnostic trained LLMs, fine tuning may be performed to align output of the LLM with values and standards appropriate to a particular use case. In many cases, reinforcement training may be used. In particular, output of an untuned LLM can be provided to a human reviewer for evaluation.

The human reviewer can provide feedback to inform further training of the LLM, such as by filling out a brief survey indicating whether a particular generated output: suitably continues the input prompt; contains offensive language or tone; provides a continuation misaligned with typical human values; and so on.

This reinforcement training by human feedback can reinforce high quality, tone neutral, continuations provided by the LLM (e.g., positive feedback corresponds to positive reward) while simultaneously disincentivizing the LLM to produce offensive continuations (e.g., negative feedback corresponds to negative reward). In this manner, an LLM can be fine-tuned to preferentially produce desirable, inoffensive, generative output which, as noted above, can be in the form of natural language and/or source code.

Generative Output Engines & Generative Output Systems

Independent of training and/or configuration of one or more underlying engines (typically instantiated as software), it may be appreciated that generally and broadly, a generative output system as described herein can include a physical processor or an allocation of the capacity thereof (shared with other processes, such as operating system processes and the like), a physical memory or an allocation thereof, and a network interface. The physical memory can include datastores, working memory portions, storage portions, and the like. Storage portions of the memory can include executable instructions that, when executed by the processor, cause the processor to (with assistance of working memory) instantiate an instance of a generative output application, also referred to herein as a generative output service.

The generative output application can be configured to expose one or more API endpoint, such as for configuration or for receiving input prompts. The generative output application can be further configured to provide generated text output to one or more subscribers or API clients. Many suitable interfaces can be configured to provide input to and to receive output from a generative output application, as described herein.

For simplicity of description, the embodiments that follow reference generative output engines and generative output applications configured to exchange structured data with one or more clients, such as the input and output queues described above. The structured data can be formatted according to any suitable format, such as JSON or XML. The structured data can include attributes or key-value pairs that identify or correspond to subparts of a single response from the generative output engine.

For example, a request to the generative output engine from a client can include attribute fields such as, but not limited to: requester client ID; requester authentication tokens or other credentials; requester authorization tokens or other credentials; requester username; requester tenant ID or credentials; API key(s) for access to the generative output engine; request timestamp; generative output generation time; request prompt; string format form generated output; response types requested (e.g., paragraph, numeric, or the like); callback functions or addresses; generative engine ID; data fields; supplemental content; reference corpuses (e.g., additional training or contextual information/data) and so on. A simple example request may be JSON formatted, and may be:
{
  "prompt": "Generate five words of placeholder text in the English language.",
  "API_KEY": "hx-Y5u4zx3kaF67AzkXK1hC",
  "user_token": "PkcLe7Co2G-50AoIVojGJ"
}

Similarly, a response from the generative output engine can include attribute fields such as, but not limited to: requester client ID; requester authentication tokens or other credentials; requester authorization tokens or other credentials; requester username; requester role; request timestamp; generative output generation time; request prompt; generative output formatted as a string; and so on. For example, a simple response to the preceding request may be JSON formatted and may be:
{
  "response": "Hello world text goes here.",
  "generation_time_ms": 2
}

In some embodiments, a prompt provided as input to a generative output engine can be engineered from user input. For example, in some cases, a user input can be inserted into an engineered template prompt that itself is stored in a database. For example, an engineered prompt template can include one or more fields into which user input portions thereof can be inserted. In some cases, an engineered prompt template can include contextual information that narrows the scope of the prompt, increasing the specificity thereof.

For example, some engineered prompt templates can include example input/output format cues or requests that define for a generative output engine, as described herein, how an input format is structured and/or how output should be provided by the generative output engine.

Prompt Pre-Configuration, Templatizing, & Engineering

As noted above, a prompt received from a user can be preconditioned and/or parsed to extract certain content therefrom. The extracted content can be used to inform selection of a particular engineered prompt template from a database of engineered prompt templates. Once the selected prompt template is selected, the extracted content can be inserted into the template to generate a populated engineered prompt template that, in turn, can be provided as input to a generative output engine as described herein.

In many cases, a particular engineered prompt template can be selected based on a desired task for which output of the generative output engine may be useful to assist. For example, if a user requires a summary of a particular document, the user input prompt may be a text string comprising the phrase "generate a summary of this page." A software instance configured for prompt preconditioning—which may be referred to as a "preconditioning software instance" or "prompt preconditioning software instance"—may perform one or more substitutions of terms or words in this input phrase, such as replacing the demonstrative pronoun phrase "this page" with an unambiguous unique page ID. In this example, preconditioning software instance can provide an output of "generate a summary of the page with id 123456" which in turn can be provided as input to a generative output engine.

In an extension of this example, the preconditioning software instance can be further configured to insert one or more additional contextual terms or phrases into the user input. In some cases, the inserted content can be inserted at a grammatically appropriate location within the input phrase or, in other cases, may be appended or prepended as separate sentences. For example, in an embodiment, the preconditioning software instance can insert a phrase that adds contextual information describing the user making the initial input and request. In this example, output of the prompt preconditioning instance may be "generate a summary of the page with id 123456 with phrasing and detail appropriate for the role of user 76543." In this example, if the user requesting the summary is an engineer, a different summary may be provided than if the user requesting the summary is a manager or executive.

In yet other examples, prompt preconditioning may be further contextualized before a given prompt is provided as input to a generative output engine. Additional information that can be added to a prompt (sometimes referred to as "contextual information" or "prompt context" or "supplemental prompt information") can include but may not be limited to: user names; user roles; user tenure (e.g., new users may benefit from more detailed summaries or other generative content than long-term users); user projects; user groups; user teams; user tasks; user reports; tasks, assignments, or projects of a user's reports, and so on.

For example, in some embodiments, a user-input prompt may be "generate a table of all my tasks for the next two weeks, and insert the table into my home page in my personal space." In this example, a preconditioning instance can replace "my" with a reference to the user's ID or another unambiguous identifier associated with the user. Similarly, the "home page in my personal space" can be replaced, contextually, with a page identifier that corresponds to that user's personal space and the page that serves as the homepage thereof. Additionally, the preconditioning instance can replace the referenced time window in the raw input prompt based on the current date and based on a calculated date two weeks in the future. With these two modifications, the modified input prompt may be "generate a table of the tasks assigned to User 1234 dating from Jan. 1, 2023-Jan. 14, 2023 (inclusive) and insert the generated table into page 567." In these embodiments, the preconditioning instance may be configured to access session information to determine the user ID.

In other cases, the preconditioning service may be configured to structure and submit a query to an active directory service or user graph service to determine user information and/or relationships to other users. For example, a prompt of "summarize the edits to this page made by my team since I last visited this page" could determine the user's ID, team members with close connections to that user based on a user graph, determine that the user last visited the page three weeks prior, and filter attribution of edits within the last three weeks to the current page ID based on those team members. With these modifications, the prompt provided to the generative output engine may be:

{
"raw_prompt": summarize the edits to this page made by my team since I last visited this page",
"modified_prompt": "Generate a summary of each paragraph tagged with an editId attribute matching editId=1, editId=51, editId=165, editId=99 within the following HTML-formatted content: [HTML-formatted content of the page]."
}

Similarly, the preconditioning service may utilize a project graph, issue graph, or other data structure that is generated using edges or relationships between system object that are determined based on express object dependencies, user event histories of interactions with related objects, or other system activity indicating relationships between system objects. The graphs may also associate system objects with particular users or user identifiers based on interaction logs or event histories.

Generally, a preconditioning service, as described herein, can be configured to access and append significant contextual information describing a user and/or users associated with the user submitting a particular request, the user's role in a particular organization, the user's technical expertise, the user's computing hardware (e.g., different response formats may be suitable and/or selectable based on user equipment), and so on.

In further implementations of this example, a snippet of prompt text can be selected from a snippet dictionary or table that further defines how the requested table should be formatted as output by the generative output engine. For example, a snippet selected from a database and appended to the modified prompt may be:

{
"snippet123_table_from_tasks": "The table should be formatted as a three-column table with multiple rows. The leftmost column should be titled 'Title' and the corresponding content of each row of this column should be the title attribute of a task. The middle column should be titled 'Created Date' and the corresponding content of each row of this column should be the creation date of the task. The rightmost column should be titled 'Status' and the corresponding content of each row of this column should be the status attribute of the selected task."
}

The foregoing examples of modifications and supplements to user input prompt are not exhaustive. Other modifications are possible. In one embodiment, the user input of "generate a table of all my tasks for the next two weeks" may be converted, supplemented, modified, and/or otherwise preconditioned to:

{
"modified_prompt": "Find all tasks assigned to User 1234 dating from Jan. 1, 2023-Jan. 14, 2023 (inclusive). Create a table in which each found task corresponds to a respective row of that table. The table should be formatted as a markdown table, in plain text, with a three columns. The leftmost column should be titled 'Title' and the corresponding content of each row of this column should be the title attribute of a respective task. The middle column should be titled 'Created Date' and the corresponding content of each row of this column should be the creation date of the respective task. The rightmost column should be titled 'Status' and the corresponding content of each row of this column should be the status attribute of the respective task."
}

The operations of modifying a user input into a descriptive paragraph or set of paragraphs that further contextualize the input may be referred to as "prompt engineering." In many embodiments, a preconditioning software instance may serve as a portion of a prompt engineering service configured to receive user input and to enrich, supplement, and/or otherwise hydrate a raw user input into a detailed prompt that may be provided as input to a generative output engine as described herein.

In other embodiments, a prompt engineering service may be configured to append bulk text to a prompt, such as document content in need of summarization or contextualization.

In other cases, a prompt engineering service can be configured to recursively and/or iteratively leverage output from a generative output engine in a chain of prompts and responses. For example, a prompt may call for a summary of all documents related to a particular project. In this case, a prompt engineering service may coordinate and/or orchestrate several requests to a generative output engine to summarize a first document, a second document, and a third document, and then generate an aggregate response of each of the three summarized documents. In yet other examples, staging of requests may be useful for other purposes.

Authentication & Authorization

Still further embodiments reference systems and methods for maintaining compliance with permissions, authentication, and authorization within a software environment. For example, in some embodiments, a prompt engineering service can be configured to append to a prompt one or more contextualizing phrases that direct a generative output engine to draw insight from only a particular subset of content to which the requesting user has authorization to access.

In other cases, a prompt engineering service may be configured to proactively determine what data or database calls may be required by a particular user input. If data required to service the user's request is not authorized to be accessed by the user, that data and/or references to it may be restricted/redacted/removed from the prompt before the prompt is submitted as input to a generative output engine. The prompt engineering service may access a user profile of the respective user and identify content having access permissions that are consistent with a role, permissions profile, or other aspect of the user profile.

In other embodiments, a prompt engineering service may be configured to request that the generative output engine append citations (e.g., back links) to each page or source from which information in a generative response was based. In these examples, the prompt engineering service or another software instance can be configured to iterate through each link to determine (1) whether the link is valid, and (2)

whether the requesting user has permission and authorization to view content at the link. If either test fails, the response from the generative output engine may be rejected and/or a new prompt may be generated specifically including an exclusion request such as "Exclude and ignore all content at XYZ.url"

In yet other examples, a prompt engineering service may be configured to classify a user input into one of a number of classes of request. Different classes of request may be associated with different permissions handling techniques. For example, a class of request that requires a generative output engine to resource from multiple pages may have different authorization enforcement mechanisms or workflows than a class of request that requires a generative output engine to resource from only a single location.

These foregoing examples are not exhaustive. Many suitable techniques for managing permissions in a prompt engineering service and generative output engine system may be possible in view of the embodiments described herein.

More generally, as noted above, a generative output engine may be a portion of a larger network and communications architecture as described herein. This network can include input queues, prompt constructors, engine selection logical elements, request routing appliances, authentication handlers and so on.

Collaboration Platforms Integrated with Generative Output Systems

In particular, embodiments described herein are focused to leveraging generative output engines to produce content in a software platform used for collaboration between multiple users, such as documentation tools, issue tracking systems, project management systems, information technology service management systems, ticketing systems, repository systems, telecommunications systems, messaging systems, and the like, each of which may define different environments in which content can be generated by users of those systems. These types of platforms may be generally referred to herein as "collaboration platforms" or "content collaboration platforms."

In one example, a documentation system may define an environment in which users of the documentation system can leverage a user interface of a frontend of the system to generate documentation in respect of a project, product, process, or goal. For example, a software development team may use a documentation system to document features and functionality of the software product. In other cases, the development team may use the documentation system to capture meeting notes, track project goals, and outline internal best practices. In some implementations, Other software platforms store, collect, and present different information in different ways. For example, an issue tracking system may be used to assign work within an organization and/or to track completion of work, a ticketing system may be used to track compliance with service level agreements, and so on. Any one of these software platforms or platform types can be communicably coupled to a generative output engine, as described herein, in order to automatically generate structured or unstructured content within environments defined by those systems.

In some implementations, a content collaboration system may include a documentation system, also referred to herein as a documentation platform, which can leverage a generative output engine to provide a generative answer interface to provide synthesized or generated responses leveraging content items hosted by the system. The documentation system may also leverage a generative output engine to provide, without limitation: summarize individual documents; summarize portions of documents; summarize multiple selected documents; generate document templates; generate document section templates; generate suggestions for cross-links to other documents or platforms; generate suggestions for adding detail or improving conciseness for particular document sections; and so on. As described with respect to examples provided herein, a documentation system can store user-generated content in electronic documents or electronic pages, also referred to herein simply as documents or pages. The documents or pages may include a variety of user-generated content including text, images, video and links to content provided by other platforms. The documentation system may also save user interaction events including user edit action, content viewing actions, commenting, content sharing, and other user interactions. The document content in addition to select user interaction events may be indexed and searchable by the system. In some examples, the documentation system may organize documents or pages into a document space, which defines a hierarchical relationship between the pages and documents and also defines a permissions profile or scheme for the documents or pages of the space.

In some implementations, a content collaboration system may include an issue tracking system or task management system (also referred to herein as issue tracking platforms or issue management platforms). The issue tracking system may also leverage a generative output engine to provide a generative answer interface to provide synthesized or generated responses leveraging content items (e.g., issues or tasks) hosted by the system. The issue tracking system may also leverage a generative output engine to provide, without limitation: summarize issues; summarize portions of issues or fields of issues; summarize multiple selected issues, tasks, or events; generate issue templates; and so on. As described with respect to examples provided herein, an issue tracking system can manage various issues or tasks that are processed in accordance with an automated workflow. The workflow may define a series of states that the issue or task must traverse before being completed. The system may also track user interaction events, issue state transitions, and other events that occur over the lifecycle of the issue, which may be indexed and searchable by the system.

More broadly, it may be appreciated that a single organization may be a tenant of multiple software platforms, of different software platform types. Generally and broadly, regardless of configuration or purpose, a software platform that can serve as source information for operation of a generative output engine as described herein may include a frontend and a backend configured to communicably couple over a computing network (which may include the open Internet) to exchange computer-readable structured data.

The frontend may be a first instance of software executing on a client device, such as a desktop computer, laptop computer, tablet computer, or handheld computer (e.g., mobile phone). The backend may be a second instance of software executing over a processor allocation and memory allocation of a virtual or physical computer architecture. In many cases, although not required, the backend may support multiple tenancies. In such examples, a software platform may be referred to as a multitenant software platform.

For simplicity of description, the multitenant embodiments presented herein reference software platforms from the perspective of a single common tenant. For example, an organization may secure a tenancy of multiple discrete software platforms, providing access for one or more employees to each of the software platforms. Although other organizations may have also secured tenancies of the same software platforms which may instantiate one or more backends that serve multiple tenants, it is appreciated that data of each organization is siloed, encrypted, and inaccessible to, other tenants of the same platform.

In many embodiments, the frontend and backend of a software platform—multitenant or otherwise—as described herein are not collocated, and communicate over a large area and/or wide area network by leveraging one or more networking protocols, but this is not required of all implementations.

A frontend of a software platform, also referred to as a frontend or client application, may be configured to render a graphical user interface at a client device that instantiates frontend software. As a result of this architecture, the graphical user interface of the frontend can receive inputs from a user of the client device, which, in turn, can be formatted by the frontend into computer-readable structured data suitable for transmission to the backend for storage, transformation, and later retrieval. One example architecture includes a graphical user interface rendered in a browser executing on the client device. In other cases, a frontend may be a native application executing on a client device. Regardless of architecture, it may be appreciated that generally and broadly a frontend of a software platform as described herein is configured to render a graphical user interface to receive inputs from a user of the software platform and to provide outputs to the user of the software platform.

Input to a frontend of a software platform by a user of a client device within an organization may be referred to herein as "organization-owned" content. With respect to a particular software platform, such input may be referred to as "tenant-owned" or "platform-specific" content. In this manner, a single organization's owned content can include multiple buckets of platform-specific content.

Herein, the phrases "tenant-owned content" and "platform-specific content" may be used to refer to any and all content, data, metadata, or other information regardless of form or format that is authored, developed, created, or otherwise added by, edited by, or otherwise provided for the benefit of, a user or tenant of a multitenant software platform. In many embodiments, as noted above, tenant-owned content may be stored, transmitted, and/or formatted for display by a frontend of a software platform as structured data. In particular structured data that includes tenant-owned content may be referred to herein as a "data object" or a "tenant-specific data object."

In a more simple, non-limiting phrasing, any software platform described herein can be configured to store one or more data objects in any form or format unique to that platform. Any data object of any platform may include one or more attributes and/or properties or individual data items that, in turn, include tenant-owned content input by a user.

Example tenant-owned content can include personal data, private data, health information, personally-identifying information, business information, trade secret content, copyrighted content or information, restricted access information, research and development information, classified information, mutually-owned information (e.g., with a third party or government entity), or any other information, multi-media, or data. In many examples, although not required, tenant-owned content or, more generally, organization-owned content may include information that is classified in some manner, according to some procedure, protocol, or jurisdiction-specific regulation.

In particular, the embodiments and architectures described herein can be leveraged by a provider of multitenant software and, in particular, by a provider of suites of multitenant software platforms, each platform being configured for a different particular purpose. Herein, providers of systems or suites of multitenant software platforms are referred to as "multiplatform service providers."

In general, customers/clients of a multiplatform service provider are typically tenants of multiple platforms provided by a given multiplatform service provider. For example, a single organization (a client of a multiplatform service provider) may be a tenant of a messaging platform and, separately, a tenant of a project management platform.

The organization can create and/or purchase user accounts for its employees so that each employee has access to both messaging and project management functionality. In some cases, the organization may limit seats in each tenancy of each platform so that only certain users have access to messaging functionality and only certain users have access to project management functionality; the organization can exercise discretion as to which users have access to either or both tenancies.

In another example, a multiplatform service provider can host a suite of collaboration tools. For example, a multiplatform service provider may host, for its clients, a multitenant issue tracking system, a multitenant code repository service, and a multitenant documentation service. In this example, an organization that is a customer/client of the service provider may be a tenant of each of the issue tracking system or platform, a code repository system or platform (also referred to as a source-code management system or platform), and/or a documentation system or platform.

As with preceding examples, the organization can create and/or purchase user accounts for its employees, so that certain selected employees have access to one or more of issue tracking functionality, documentation functionality, and code repository functionality.

In this example and others, it may be possible to leverage multiple collaboration platforms to advance individual projects or goals. For example, for a single software development project, a software development team may use (1) a code repository to store project code, executables, and/or static assets, (2) a documentation platform to maintain documentation related to the software development project, (3) an issue tracking platform to track assignment and progression of work, and (4) a messaging service or platform to exchange information directly between team members. However, as organizations grow, as project teams become larger, and/or as software platforms mature and add features or adjust user interaction paradigms over time, using multiple software platforms can become inefficient for both individuals and organizations. Further, as described herein, it can be difficult to locate content or answer queries in a multiplatform system having diverse content and data structures used to provide the various content items. As described herein, a generative answer interface may be adapted to access multi-platform content and provide generative responses that bridge various content item types and platform structures.

These foregoing and other embodiments are discussed below with reference to FIGS. 1-16. The detailed description given herein with respect to these figures is for explanation only and should not be construed as limiting.

User Input Resulting in Generative Output

FIG. 1 depicts a simplified diagram of a system, such as described herein that can include and/or may receive input from a generative output engine as described herein. The system 100 is depicted as implemented in a client-server architecture, but it may be appreciated that this is merely one example and that other communications architectures are possible.

In particular the system 100 includes a set of host servers 102 which may be one or more virtual or physical computing resources (collectively referred in many cases as a "cloud platform"). In some cases, the set of host servers 102 can be physically collocated or in other cases, each may be positioned in a geographically unique location.

The set of host servers 102 can be communicably coupled to one or more client devices; two example devices are shown as the client device 104 and the client device 106. The client devices 104, 106 can be implemented as any suitable electronic device. In many embodiments, the client devices 104, 106 are personal computing devices such as desktop computers, laptop computers, or mobile phones.

The set of host servers 102 can be supporting infrastructure for one or more backend applications, each of which may be associated with a particular software platform, such as a documentation platform or an issue tracking platform. Other examples include ITSM systems, chat platforms, messaging platforms, and the like. These backends can be communicably coupled to a generative output engine that can be leveraged to provide unique intelligent functionality to each respective backend. For example, the generative output engine can be configured to receive user prompts, such as described above, to modify, create, or otherwise perform operations against content stored by each respective software platform.

By centralizing access to the generative output engine in this manner, the generative output platform can also serve as an integration between multiple platforms. For example, one platform may be a documentation platform and the other platform may be an issue tracking system. In these examples, a user of the documentation platform may input a prompt requesting a summary of the status of a particular project documented in a particular page of the documentation platform. A comprehensive continuation/response to this summary request may pull data or information from the issue tracking system as well.

A user of the client devices may trigger production of generative output in a number of suitable ways. One example is shown in FIG. 1. In particular, in this embodiment, each of the software platforms can share a common feature, such as a common centralized content service that is available for either platforms 108, 110.

Turning to FIG. 1, a portion of the set of host servers 102 can be allocated as physical infrastructure supporting a first platform backend 108 and a different portion of the set of host servers 102 can be allocated as physical infrastructure supporting a second platform backend 110. The two different platforms may be instantiated over physical resources provided by the set of host servers 102. Once instantiated, the first platform backend 108 and the second platform backend 110 can each communicably couple to the centralized content service 112. The centralized content service 112 may be used to provide content for a search interface, a generative content service, an entity card interface or a centralized editing service which may also referred to more simply as an "editor" or an "editor service."

In implementations in which the centralized content service 112 provides content and results for a search interface or generative content service, the service 112 may be instantiated or implemented in response to a user input provided to a frontend application in communication with one of the platform backends 108, 110. The service 112 may cause display of a search interface including or integrated with a generative answer interface. The service 112 may be configured to leverage authenticated user sessions between multiple platforms in order to access content and provide aggregated or composite results to the user. The service 112 may be instantiated as a plugin to the respective frontend application, may be integrated with the frontend application or, in some implementations, may be instantiated as a separate and distinct service or application instance.

In implementations in which the centralized content service 112 provides content and results for an entity card interface, the service 112 may be instantiated or implemented in response to a user selection of text or a selectable object in a page, document, issue, or other content items. The service 112 may be configured to access content from either platform 108, 110, and/or a third-party platform. As described in the examples provided herein, the service 112 may leverage a prompt management service 114 to provide generative content for the entity card interface, which may be synthesize content using content extracted from content related to the respective entity or topic.

In implementations in which this centralized content service 112 is an editing service, the centralized content service 112 may be referred to as a centralized content editing frame service 112. The centralized content editing frame service 112 can be configured to cause rendering of a frame within respective frontends of each of the first platform backend 108 and the second platform backend 110. In this manner, and as a result of this construction, each of the first platform and the second platform present a consistent user content editing experience.

More specifically, the centralized content editing frame service 112 may be a rich text editor with added functionality (e.g., slash command interpretation, in-line images and media, and so on). As a result of this centralized architecture, multiple platforms in a multiplatform environment can leverage the features of the same rich text editor. This provides a consistent experience to users while dramatically simplifying processes of adding features to the editor.

For example, in one embodiment, a user in a multiplatform environment may use and operate a documentation platform and an issue tracking platform. In this example, both the issue tracking platform and the documentation platform may be associated with a respective frontend and a respective backend. Each platform may be additionally communicably and/or operably coupled to a centralized content service 112 that can be called by each respective frontend whenever it is required to present the user of that respective frontend with an interface to edit text.

For example, the documentation platform's frontend may call upon the centralized content service 112 to render, or assist with rendering, a user input interface element to receive user text input in a generative interface of a documentation platform or system. Similarly, the issue tracking platform's frontend may call upon the centralized content service 112 to render, or assist with rendering, a user input interface element to receive user text input in a generative interface. In these examples, the centralized content service 112 can parse text input provided by users of the documentation platform frontend and/or the issue tracking platform backend, monitoring for command and control keywords, phrases, trigger characters, and so on. In many cases, for example, the centralized content service 112 can implement a slash command service that can be used by a user of either platform frontend to issue commands to the backend of the other system. As described herein, the centralized content service 112 may cause display of a generative answer interface having input regions and controls that can be used to receive user input and provide commands to the system.

In one example, the user of the documentation platform frontend can input a slash command to the content editing frame, rendered in the documentation platform frontend supported by the centralized content service 112, in order to type a prompt including an instruction to create a new issue or a set of new issues in the issue tracking platform. Similarly, the user of the issue tracking platform can leverage slash command syntax, enabled by the centralized content service 112, to create a prompt that includes an instruction to edit, create, or delete a document stored by the documentation platform.

As described herein, a "content editing frame" references a user interface element that can be leveraged by a user to draft and/or modify rich content including, but not limited to: formatted text; image editing; data tabling and charting; file viewing; and so on. These examples are not exhaustive; the content editing elements can include and/or may be implemented to include many features, which may vary from embodiment to embodiment. For simplicity of description the embodiments that follow reference a centralized content service 112 configured for rich text editing, but it may be appreciated that this is merely one example.

As a result of architectures described herein, developers of software platforms that would otherwise dedicate resources to developing, maintaining, and supporting content editing features can dedicate more resources to developing other platform-differentiating features, without needing to allocate resources to development of software components that are already implemented in other platforms.

In addition, as a result of the architectures described herein, services supporting the centralized content service 112 can be extended to include additional features and functionality-such as a user input field, selectable control, a slash command processor, or other user interface element-which, in turn, can automatically be leveraged by any further platform that incorporates a generative interface, and/or otherwise integrates with the centralized content service 112 itself. In this example, commands or input facilitated by the generative service can be used to receive prompt instructions from users of either frontend. These prompts can be provided as input to a prompt engineering/prompt preconditioning service (such as the prompt management service 114) that, in turn, provides a modified user prompt as input to a generative engine service 116.

The generative output engine service may be hosted over the host servers 102 or, in other cases, may be a software instance instantiated over separate hardware. In some cases, the generative engine service may be a third party service that serves an API interface to which one or more of the host services and/or preconditioning service can communicably couple.

The generative output engine can be configured as described above to provide any suitable output, in any suitable form or format. Examples include content to be added to user-generated content, API request bodies, replacing user-generated content, and so on.

In addition, a centralized content service 112 can be configured to provide suggested prompts to a user as the user types. For example, as a user begins typing a slash command in a frontend of some platform that has integrated with a centralized content service 112 as described herein, the centralized content service 112 can monitor the user's typing to provide one or more suggestions of prompts, commands, or controls (herein, simply "preconfigured prompts") that may be useful to the particular user providing the text input. The suggested preconfigured prompts may be retrieved from a database 118. In some cases, each of the preconfigured prompts can include fields that can be replaced with user-specific content, whether generated in respect of the user's input or generated in respect of the user's identity and session.

In some embodiments, the centralized content service 112 can be configured to suggest one or more prompts that can be provided as input to a generative output engine as described herein to perform a useful task, such as summarizing content rendered within the centralized content service 112, reformatting content rendered within the centralized content service 112, inserting cross-links within the centralized content service 112, and so on.

The ordering of the suggestion list and/or the content of the suggestion list may vary from user to user, user role to user role, and embodiment to embodiment. For example, when interacting with a documentation system, a user having a role of "developer" may be presented with prompts, content, or functionality associated with tasks related to an issue tracking system and/or a code repository system. Alternatively, when interacting with the same documentation system, a user having a role of "human resources professional" may be presented with prompts, content, or functionality associated with manipulating or summarizing information presented in a directory system or a benefits system, instead of the issue tracking system or the code repository system.

More generally, in some embodiments described herein, a centralized content service 112 can be configured to suggest to a user one or more prompts that can cause a generative output engine to provide useful output and/or perform a useful task for the user. These suggestions/prompts can be based on the user's role, a user interaction history by the same user, user interaction history of the user's colleagues, or any other suitable filtering/selection criteria.

In addition to the foregoing, a centralized content service 112 as described herein can be configured to suggest discrete commands that can be performed by one or more platforms. As with preceding examples, the ordering of the suggestion list and/or the content of the suggestion list may vary from embodiment to embodiment and user to user. For example, the commands and/or command types presented to the user may vary based on that user's history, the user's role, and so on.

More generally and broadly, the embodiments described herein refence systems and methods for sharing user interface elements rendered by a centralized content service 112 and features thereof (such as input fields or a slash command processor), between different software platforms in an authenticated and secure manner. For simplicity of description, the embodiments that follow reference a configuration in which a centralized content editing frame service is configured to implement user input fields, selectable controls, a slash command processor, or other user interface elements.

More specifically, the first platform backend 108 can be configured to communicably couple to a first platform frontend instantiated by cooperation of a memory and a processor of the client device 104. Once instantiated, the first platform frontend can be configured to leverage a display of the client device 104 to render a graphical user interface so as to present information to a user of the client device 104 and so as to collect information from a user of the client device 104. Collectively, the processor, memory, and display of the client device 104 are identified in FIG. 1 as the client devices resources 104a-104c, respectively.

As with many embodiments described herein, the first platform frontend can be configured to communicate with the first platform backend 108 and/or the centralized content service 112. Information can be transacted by and between the frontend, the first platform backend 108 and the centralized content service 112 in any suitable manner or form or format. In many embodiments, as noted above, the client device 104 and in particular the first platform frontend can be configured to send an authentication token 120 along with each request transmitted to any of the first platform backend 108 or the centralized content service 112 or the preconditioning service or the generative output engine.

Similarly, the second platform backend 110 can be configured to communicably couple to a second platform frontend instantiated by cooperation of a memory and a processor of the client device 106. Once instantiated, the second platform frontend can be configured to leverage a display of the client device 106 to render a graphical user interface so as to present information to a user of the client device 106 and so as to collect information from a user of the client device 106. Collectively, the processor, memory, and display of the client device 106 are identified in FIG. 1 as the client devices resources 106a-106c, respectively.

As with many embodiments described herein, the second platform frontend can be configured to communicate with the second platform backend 110 and/or the centralized content service 112. Information can be transacted by and between the frontend, the second platform backend 110 and the centralized content service 112 in any suitable manner or form or format. In many embodiments, as noted above, the client device 106 and in particular the second platform frontend can be configured to send an authentication token 122 along with each request transmitted to any of the second platform backend 110 or the centralized content editing frame service 112.

As a result of these constructions, the centralized content service 112 can provide uniform feature sets to users of either the client device 104 or the client device 106. For example, the centralized content service 112 can implement a user input field, selectable controls, a slash command processor, or other user interface element to receive prompt input and/or preconfigured prompt selection provided by a user of the client device 104 to the first platform and/or to receive input provided by a different user of the client device 106 to the second platform.

As noted above, the centralized content service 112 ensures that common features, such as user input interpretation, slash command handling, or other input techniques are available to frontends of different platforms. One such class of features provided by the centralized content service 112 invokes output of a generative output engine of a service such as the generative engine service 116.

For example, as noted above, the generative engine service 116 can be used to generate content, supplement content, and/or generate API requests or API request bodies that cause one or both of the first platform backend 108 or the second platform backend 110 to perform a task. In some cases, an API request generated at least in part by the generative engine service 116 can be directed to another system not depicted in FIG. 1. For example, the API request can be directed to a third-party service (e.g., referencing a callback, as one example, to either backend platform) or an integration software instance. The integration may facilitate data exchange between the second platform backend 110 and the first platform backend 108 or may be configured for another purpose.

As with other embodiments described herein, the prompt management service 114 can be configured to receive user input (provided via a graphical user interface of the client device 104 or the client device 106) from the centralized content service 112. The user input may include a prompt to be continued by the generative engine service 116.

The prompt management service 114 can be configured to modify the user input, to supplement the user input, select a prompt from a database (e.g., the database 118) based on the user input, insert the user input into a template prompt, replace words within the user input, preform searches of databases (such as user graphs, team graphs, and so on) of either the first platform backend 108 or the second platform backend 110, change grammar or spelling of the user input, change a language of the user input, and so on. The prompt management service 114 may also be referred to herein as herein as an "editor assistant service" or a "prompt constructor." In some cases, the prompt management service 114 is also referred to as a "content creation and modification service."

Output of the prompt management service 114 can be referred to as a modified prompt or a preconditioned prompt. This modified prompt can be provided to the generative engine service 116 as an input. More particularly, the prompt management service 114 is configured to structure an API request to the generative engine service 116. The API request can include the modified prompt as an attribute of a structured data object that serves as a body of the API request. Other attributes of the body of the API request can include, but are not limited to: an identifier of a particular LLM or generative engine to receive and continue the modified prompt; a user authentication token; a tenant authentication token; an API authorization token; a priority level at which the generative engine service 116 should process the request; an output format or encryption identifier; and so on. One example of such an API request is a POST request to a Restful API endpoint served by the generative engine service 116. In other cases, the prompt management service 114 may transmit data and/or communicate data to the generative engine service 116 in another manner (e.g., referencing a text file at a shared file location, the text file including a prompt, referencing a prompt identifier, referencing a callback that can serve a prompt to the generative engine service 116, initiating a stream comprising a prompt, referencing an index in a queue including multiple prompts, and so on; many configurations are possible).

In response to receiving a modified prompt as input, the generative engine service 116 can execute an instance of a generative output engine, such as an LLM. As noted above, in some cases, the prompt management service 114 can be configured to specify what engine, engine version, language, language model or other data should be used to continue a particular modified prompt.

The selected LLM or other generative engine continues the input prompt and returns that continuation to the caller, which in many cases may be the prompt management service 114. In other cases, output of the generative engine service 116 can be provided to the centralized content service 112 to return to a suitable backend application, to in turn return to or perform a task for the benefit of a client device such as the client device 104 or the client device 106. More particularly, it may be appreciate that although FIG. 1 is illustrated with only the prompt management service 114 communicably coupled to the generative engine service 116, this is merely one example and that in other cases the generative engine service 116 can be communicably coupled to any of the client device 106, the client device 104, the first platform backend 108, the second platform backend 110, the centralized content service 112, or the prompt management service 114.

In some cases, output of the generative engine service 116 can be provided to an output processor or gateway configured to route the response to an appropriate destination. For example, in an embodiment, output of the generative engine may be intended to be prepended to an existing document of a documentation system. In this example, it may be appropriate for the output processor to direct the output of the generative engine service 116 to the frontend (e.g., rendered on the client device 104, as one example) so that a user of the client device 104 can approve the content before it is prepended to the document. In another example, output of the generative engine service 116 can be inserted into an API request directly to a backend associated with the documentation system. The API request can cause the backend of the documentation system to update an internal object representing the document to be updated. On an update of the document by the backend, a frontend may be updated so that a user of the client device can review and consume the updated content.

In other cases, the output processor/gateway can be configured to determine whether an output of the generative engine service 116 is an API request that should be directed to a particular endpoint. Upon identifying an intended or specified endpoint, the output processor can transmit the output, as an API request to that endpoint. The gateway may receive a response to the API request which in some examples, may be directed to yet another system (e.g., a notification that an object has been modified successfully in one system may be transmitted to another system).

More generally, the embodiments described herein and with particular reference to FIG. 1 relate to systems for collecting user input, modifying that user input into a particularly engineered prompt, and submitting that prompt as input to a trained large language model. Output of the LLM can be used in a number of suitable ways.

In some embodiments, user input can be provided by text input that can be provided by a user typing a word or phrase into an editable dialog box such as a rich text editing frame rendered within a user interface of a frontend application on a display of a client device. For example, the user can type a particular character or phrase in order to instruct the frontend to enter a command receptive mode. In some cases, the frontend may render an overlay user interface that provides a visual indication that the frontend is ready to receive a command from the user. As the user continues to type, one or more suggestions may be shown in a modal UI window.

These suggestions can include and/or may be associated with one or more "preconfigured prompts" that are engineered to cause an LLM to provide particular output. More specifically, a preconfigured prompt may be a static string of characters, symbols and words, which causes—deterministically or pseudo-deterministically—the LLM to provide consistent output. For example, a preconfigured prompt may be "generate a summary of changes made to all documents in the last two weeks." Preconfigured prompts can be associated with an identifier or a title shown to the user, such as "Summarize Recent System Changes." In this example, a button with the title "Summarize Recent System Changes" can be rendered for a user in a UI as described herein. Upon interaction with the button by the user, the prompt string "generate a summary of changes made to all documents in the last two weeks" can be retrieved from a database or other memory, and provided as input to the generative engine service 116.

Suggestions rendered in a UI can also include and/or may be associated with one or more configurable or "templatized prompts" that are engineered with one or more fields that can be populated with data or information before being provided as input to an LLM. An example of a templatized prompt may be "summarize all tasks assigned to $ {user} with a due date in the next 2 days." In this example, the token/field/variable $ {user} can be replaced with a user identifier corresponding to the user currently operating a client device.

This insertion of an unambiguous user identifier can be performed by the client device, the platform backend, the centralized content editing frame service, the prompt management service, or any other suitable software instance. As with preconfigured prompts, templatized prompts can be associated with an identifier or a title shown to the user, such as "Show My Tasks Due Soon." In this example, a button with the title "Show My Tasks Due Soon" can be rendered for a user in a UI as described herein. Upon interaction with the button by the user, the prompt string "summarize all tasks assigned to user123 with a due date in the next 2 days" can be retrieved from a database or other memory, and provided as input to the generative engine service 116.

Suggestions rendered in UI can also include and/or may be associated with one or more "engineered template prompts" that are configured to add context to a given user input. The context may be an instruction describing how particular output of the LLM/engine should be formatted, how a particular data item can be retrieved by the engine, or the like. As one example, an engineered template prompt may be "$ {user prompt}. Provide output of any table in the form of a tab delimited table formatted according to the markdown specification." In this example, the variable $ {user prompt} may be replaced with the user prompt such that the entire prompt received by the generative engine service 116 can include the user prompt and the example sentence describing how a table should be formatted.

In yet other embodiments, a suggestion may be generated by the generative engine service 116. For example, in some embodiments, a system as described herein can be configured to assist a user in overcoming a cold start/blank page problem when interacting with a new document, new issue, or new board for the first time. For example, an example backend system may be Kanban board system for organizing work associated with particular milestones of a particular project. In these examples, a user needing to create a new board from scratch (e.g., for a new project) may be unsure how to begin, causing delay, confusion, and frustration.

In these examples, a system as described herein can be configured to automatically suggest one or more prompts configured to obtain output from an LLM that programmatically creates a template board with a set of template cards. Specifically, the prompt may be a preconfigured prompt as described above such as "generate a JSON document representation of a Kanban board with a set of cards each representing a different suggested task in a project for creating a new iced cream flavor." In response to this prompt, the generative engine service 116 may generate a set of JSON objects that, when received by the Kanban platform, are rendered as a set of cards in a Kanban board, each card including a different title and description corresponding to different tasks that may be associated with steps for creating a new iced cream flavor. In this manner, the user can quickly be presented with an example set of initial tasks for a new project.

In yet other examples, suggestions can be configured to select or modify prompts that cause the generative engine service 116 to interact with multiple systems. For example, a suggestion in a documentation system may be to create a new document content section that summarizes a history of agent interactions in an ITSM system. In some cases, the generative engine service 116 can be called more than once (and/or it may be configured to generate its own follow-up prompts or prompt templates which can be populated with appropriate information and re-submitted to the generative engine service 116 to obtain further generative output. More simply, in some embodiments, generative output may be recursive, iterative, or otherwise multi-step in some embodiments.

These foregoing embodiments depicted in FIG. 1 and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

For example, it may be appreciated that all software instances described above are supported by and instantiated over physical hardware and/or allocations of processing/memory capacity of physical processing and memory hardware. For example, the first platform backend 108 may be instantiated by cooperation of a processor and memory collectively represented in the figure as the resource allocations 108a.

Similarly, the second platform backend 110 may be instantiated over the resource allocations 110a (including processors, memory, storage, network communications systems, and so on). Likewise, the centralized content service 112 is supported by a processor and memory and network connection (and/or database connections) collectively represented for simplicity as the resource allocations 112a.

The prompt management service 114 can be supported by its own resources including processors, memory, network connections, displays (optionally), and the like represented in the figure as the resource allocations 114a.

In many cases, the generative engine service 116 may be an external system, instantiated over external and/or third-party hardware which may include processors, network connections, memory, databases, and the like. In some embodiments, the generative engine service 116 may be instantiated over physical hardware associated with the host servers 102. Regardless of the physical location at which (and/or the physical hardware over which) the generative engine service 116 is instantiated, the underlying physical hardware including processors, memory, storage, network connections, and the like are represented in the figure as the resource allocations 116a.

Further, although many examples are provided above, it may be appreciated that in many embodiments, user permissions and authentication operations are performed at each communication between different systems described above. Phrased in another manner, each request/response transmitted as described above or elsewhere herein may be accompanied by user authentication tokens, user session tokens, API tokens, or other authentication or authorization credentials.

Generally, generative output systems, as described herein, should not be usable to obtain information from an organization's datasets that a user is otherwise not permitted to obtain. For example, a prompt of "generate a table of social security numbers of all employees" should not be executable. In many cases, underlying training data may be siloed based on user roles or authentication profiles. In other cases, underlying training data can be preconditioned/scrubbed/tagged for particularly sensitive datatypes, such as personally identifying information. As a result of tagging, prompts may be engineered to prevent any tagged data from being returned in response to any request. More particularly, in some configurations, all prompts output from the prompt management service 114 may include a phrase directing an LLM to never return particular data, or to only return data from particular sources, and the like.

In some embodiments, the system 100 can include a prompt context analysis instance configured to determine whether a user issuing a request has permission to access the resources required to service that request. For example, a prompt from a user may be "Generate a text summary in Document123 of all changes to Kanban board 456 that do not have a corresponding issue tagged in the issue tracking system." In respect of this example, the prompt context analysis instance may determine whether the requesting user has permission to access Document123, whether the requesting user has written permission to modify Document123, whether the requesting user has read access to Kanban board 456, and whether the requesting user has read access to referenced issue tracking system. In some embodiments, the request may be modified to accommodate a user's limited permissions. In other cases, the request may be rejected outright before providing any input to the generative engine service 116.

Furthermore, the system can include a prompt context analysis instance or other service that monitors user input and/or generative output for compliance with a set of policies or content guidelines associated with the tenant or organization. For instance, the service may monitor the content of a user input and block potential ethical violations including hate speech, derogatory language, or other content that may violate a set of policies or content guidelines. The service may also monitor output of the generative engine to ensure the generative content or response is also in compliance with policies or guidelines. To perform these monitoring activities, the system may perform natural language processing on the monitored content in order to detect key words or phrases that indicate potential content violations. A trained model may also be used that has been trained using content known to be in violation of the content guidelines or policies.

Figure 2A:
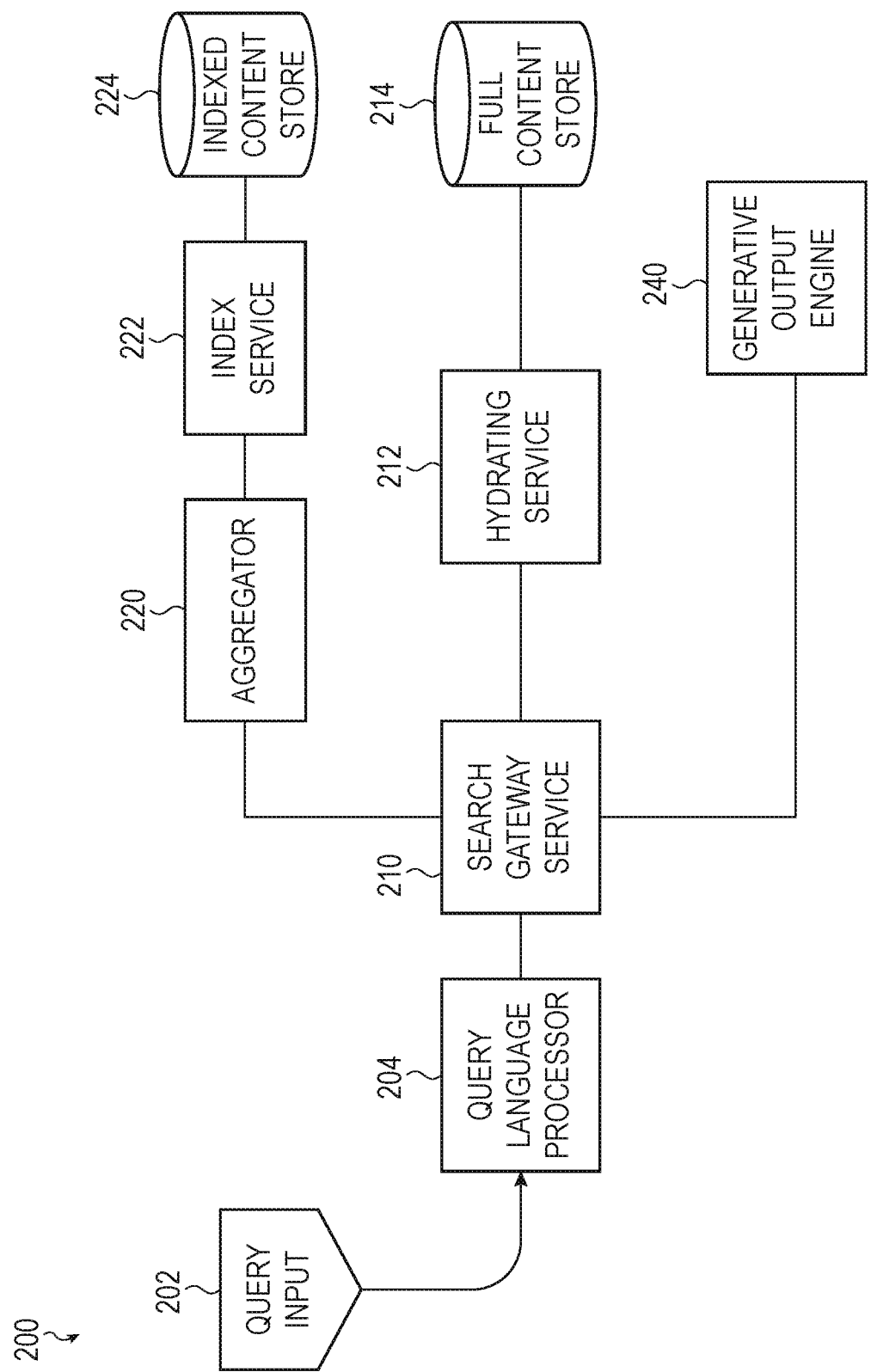
FIG. 2A depicts an example system for providing a generative answer interface for a content collaboration platform.

FIG. 2A depicts an example system 200 used to provide a generative answer interface, as described herein. Specifically, FIG. 2A depicts a system 200 that can be used to provide a generative response for a generative answer interface in response to a natural language query or other input provided to the generative answer interface. The system 200 may leverage both platform-specific content and off-platform content in order to synthesize a generative response that is responsive to the user input. Using the system 200 of FIG. 2A, the generative response may be more specifically tailored to the context and content generated by a content collaboration system and may assist the user in identifying content items that are predicted to be most relevant to the user's query.

Figure 5:
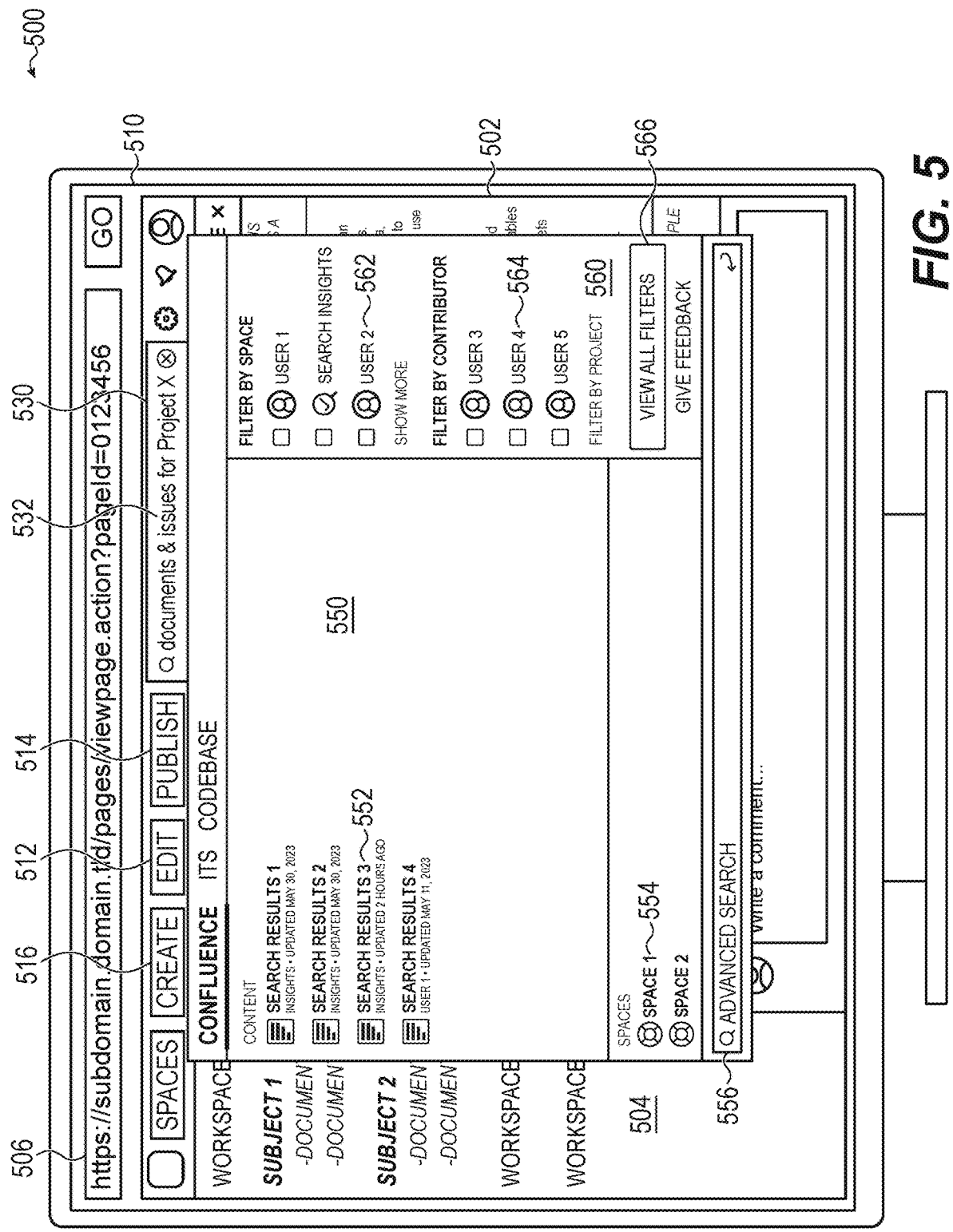
FIG. 5 depicts an example graphical user interface of a content collaboration platform having a search results interface.

The example system 200 may be used in accordance with an instantiation, initiation, or invocation of a generative service associated with a search interface. As shown in FIGS. 5 and 6, a graphical user interface may include a search input or a search interface that can be used to initiate search operations. As part of the search interface, the user may provide an express input (e.g., user selection), which invokes the generative service. Additionally or alternatively, the system may perform an intent analysis of the user input and, in response to the intent analysis output predicting a request for a generative output, the generative service may be invoked. For example, using an intent recognition module or model that has been trained using previous input queries, the system may determine that the user input is directed to a request for information in addition to or instead of a request for a list of content items. By way of non-limiting example, a user input that includes a general interrogatory like "what is project ABC?" may be determined to have an intent associated with a request for a generative response. In contrast, a user input that includes a more specific interrogatory like "what are the most recent pages mentioning project ABC?" may be determined to have an intent associated with a request for a content search. As described in more detail with respect to FIG. 2B, other intent recognition modules or models may be applied to the user input. In some cases, multiple intent recognition modules are applied or used to route the user input to the appropriate systems or sub-systems.

As shown in FIG. 2A, the system 200 may receive a query input 202 from the generative answer interface or other graphical interface operating on a client device. The query input 202 may include a natural language text input string that is provided to a search input field or other graphical interface element. In some cases, the query input 202 includes input provided by one or more selectable controls of the interface. For example, the query input 202 may include one or more selectable filters including date ranges, user constraints, content constraints, permissions constraints, or other input that may be provided by the interface. In some cases, the query input 202 includes a link or pointer to a content item or other source of content provided to the interface. In some implementations, content from the linked or referenced content item is extracted prior to being provided to the system 200 using an extraction service or similar service that is invoked in response to the user input containing a link or reference to a content item or other object.

The query input 202 may be routed to a query language processor 204. The query language processor 204 includes one or more natural language processing tools or services that may be applied to the query input 202. For example, the query language processor 204 may include a tokenizing service or other natural language processing service that removes common words and/or extracts words or phrases from the natural language input. In one example, the service removes stop words including articles, common verbs, and other words that are predicted to have a minimal impact on the substance of the query. The service may also extract identified tokens or segments of the input that may be subjected to a lemmatization or other service to determine a set of keywords or search terms. These techniques are provided by way of example and other natural language processing techniques can be used to obtain a set of keywords or search terms.

As shown in FIG. 2A, the keywords or search terms extracted or produced by the query language processor 204 may be sent to the search gateway service 210. The search gateway service 210 may perform multiple important operations in the system 200 including coordination of between indexing services 222 and hydrating services 212 in order to obtain content, pre-processing of the content, construction of prompts to be sent to generative output engines 240, and post processing or validation of generative responses received from the generative output engine 240, which may be returned to the generative answer interface or other aspect of the frontend application. In the current example, the search gateway service 210 is represented by a single service. However, depending on the implementation, the search gateway service 210 may include or be composed of multiple sub-services or modules.

Following the flow depicted in FIG. 2A, the search gateway service 210, may route the processed user input (keywords or search terms) to an aggregator 220, which is able to aggregate or coordinate the input and output with multiple index services 222. While only one representative index service 222 is depicted in the example system 200, multiple index services may be used which may enable parallel searching operations, geographical or location-based implementations, or other architectural implementations that may provide improved performance. Each of the index services 222 may be adapted to identify matching or corresponding content managed by one or more indexed content stores 224. In some implementations, the indexed content store 224 includes content identifiers or pointers to content managed by the collaboration platform. The indexed content store 224 may also include text snippets or full-text versions of the content of the respective content items. In many cases, the indexed content store 224 does not include the full content including images, video, and non-text content in order to improve the speed and operating performance of the index service 222.

Results obtained by the index service 222, including content identifiers and/or partial or full text content, may be sent back to the search gateway service 210 for further processing. In one implementation, the search gateway service 210 may communicate the content identifiers to a hydrating service 212. The hydrating service 212 is able to access a full content store 214 and retrieve text and other content associated with each of the content identifiers. In some cases, the content identifiers include an identifier that is unique, at least with respect to the particular platform. The hydrating service 212 is able to obtain at least text content from the full content store 214 and relay the text to the search gateway service 210. In some cases, a link to the respective content items, the content identifier, or content metadata is also returned to the search gateway service 210 by the hydrating service 212. In another example implementation, the index service 222 is able to return full-text results for a given content item or set of content items. In this case, it may not be necessary for the search gateway service 210 to use the hydrating service 212 to obtain document content. In some implementations, the results returned from the index service 222 may be a hybrid of full-text and content identifiers and the hydrating service is 212 utilized to obtain content for those results for which sufficient text content was not obtained by the index service 222.

Once text has been obtained by the search gateway service 210, the search gateway service 210 may prepare a prompt for sending to the generative output engine 240. In one example implementation, the search gateway service 210 estimates a size or amount of text included in the content identified by the index service 222. In accordance with the number or characters or number of words satisfying a length criteria (e.g., being less than a predetermined threshold), the search gateway service 210 may include all of the text in the prompt. In accordance with the number of characters or number of words exceeding or not satisfying the length criteria (e.g., greater than or equal to the predetermined threshold), the search gateway service 210 may select blocks of text for inclusion in the prompt. The text blocks may be defined, for example, using a content parsing service that is able to identify paragraphs, related sentences or other groups of text that are semantically and/or structurally related.

Blocks of text or snippets of the content may be selected based on a correlation with the user input. In some implementations, a correlation score may be computed for each block of text and those blocks of texts having a correlation score that satisfies a correlation criteria may be selected for inclusion in the prompt. In some cases, the correlation score must meet or be greater than a specified correlation threshold to be included in the prompt. In other cases, the text blocks are ranked based on correlation score and a subset of top-ranking text blocks are selected for inclusion. Other selection techniques may also be used based on a correlation score or other similar metric.

The correlation score may be computed using a language processing technique that is able to quantify a correlation between a given natural language input and the text of a particular block. In one example an input vector may be determined or constructed using the natural language input. The input vector may be constructed using a word vectorization service that maps words or phrases into a vector of numbers or other characters. A similar technique may be applied to the blocks of text to obtain a set of block vectors. A correlation score may be computed using a vector comparison or evaluation technique including a cosine similarity, Euclidian distance, Jaccard similarity, or other technique. In another example, a correlation model may be used to predict a correlation between the natural language input and blocks of text or snippets. For example, the correlation model may be trained using a set of prior or training user input and a set of example or training output predicted to be responsive or correlating to the query or input. In some cases, the responsive text does not necessarily include similar words or phrases such that a straight language correlation technique may fail to identify the most useful or responsive text. In one example, a transformer model may be trained using a set of example input text and corresponding snippets or text blocks that have been found to be responsive or answer an interrogatory in the input text. The training corpus may be based on content extracted from the full content store 214 or other platform content in order to adapt the transformer model to the language and context of the tenant or organization. The training corpus and/or the transformer model may also be dynamic and modified in response to user feedback or usage of the system. In particular, as depicted in some of the user interface examples provided, herein, a user may provide express positive or negative feedback through designated interface controls, which may be used to modify the training corpus and/or the transformer model used to select blocks of text for future queries.

The search gateway service 210 may combine at least a portion of the query input 202, the selected blocks of text (or all of the identified text), context data, and predetermined prompt text (also referred to as predetermine query prompt text, template prompt text, or simply prompt text) in order to generate or complete the prompt that will be transmitted to the generative output engine 240. The predetermined prompt text may include one of a number of predetermined phrases that provide instructions to the generative output engine 240 including, without limitation, formatting instructions regarding a preferred length of the response, instructions regarding the tone of the response, instructions regarding the format of the response, instructions regarding prohibited words or phrases to be included in the response, context information that may be specific to the tenant or to the platform, and other predetermined instructions. In some cases, the predetermined prompt text includes a set of example input-output data pairs that may be used to provide example formatting, tone, and style of the expected generative response. In some cases, the predetermined prompt text includes special instructions to help prevent hallucinations in the response or other potential inaccuracies. The predetermined prompt text may also be pre-populated with exemplary content extracted from the platform's content item representing an ideal or reference output, which may reflect a style and tone of the tenant or content hosted on the platform.

In some implementations, the search gateway service 210 may also obtain or extract context data that is used to improve or further customize the prompt for a particular user, current session, or use history. In one example, the search gateway service 210 may obtain a user profile associated with an authenticated user operating the frontend that produced the query input 202. The user profile may include information about the user's role, job title, or content permissions classification, which may indicate the type of content that the user is likely to consume or produce. The role classification may be used to construct specific prompt language that is intended to tailor the generative response to the particular user. For example, a user having a role or job title associated with a technical position, the search gateway service 210 add text like "provide an answer understandable to a level 1 engineer." Similarly, for a user having a non-technical role or job title, the search gateway service 210 may add text to the prompt like, "provide an answer understandable to person without a technical background." Additionally or alternatively, other context data may be obtained, which may be used to generate specific text designed to prompt a particular level of detail or tone of the generative response. Other context data includes content items that are currently or recently open in the current session, user event logs or other logs that indicate content that has been read or produced by the authenticated user, organizational information that indicates the authenticated user's supervisors and/or reporting employees and current role, and other similar context data. In some cases, a personalized query log is referenced, which includes the user's past queries or search history and an indication of successful (or non-responsive) results may be used as context data. Based on prior search results, the search gateway service 210 may further supplement to include language that improved past results or omit language that produced non-responsive or otherwise unsatisfactory results.

In some implementations, the search gateway service 210 may generate block-specific tags or text that is associated with each block of text inserted into the prompt. The tag may be string of numbers and/or letters and may be used to identify the content item from which the block of text or segment of text was extracted. The tag may be an unassociated string of characters that does not inherently indicate a source of the text but can be used by the system, via a registry or some other reference object, to identify the source of the text. In other cases, the tag may include at least a portion of the content identifier, name of the content item, or other characters from which the source of the text can be directly inferred without a registry or reference object. In either configuration, the prompt may include predetermined prompt text that includes instructions for maintaining a record of tags which are used to generate the generative response. Accordingly, the generative output engine 240 may include a corresponding set of tags in the generative response that indicate which text blocks or snippets of text were used to generate the body of the generative response. This second set or corresponding set of tags may be used by the search gateway service 210 or other aspect of the system, to generate links, selectable icons, or other graphical objects that are presented to the user. Selection of the generated objects may cause a redirection of the graphical user interface to the respective content item, whether on the same platform or on a different platform. By using a tagging technique, the user may easily select a generated link in order to review the source material or to perform more extensive research into the subject matter of the generative response. If permitted by the generative output engine 240, reference to the content items (e.g., a URL or other addressable location) may be passed to the generative output engine 240 using the prompt and the prompt may include instructions to maintain or preserve the reference to the content items, which can be used to generate the links displayed in the interface with the generative response.

In accordance with other examples described herein, the prompt generated by the search gateway service 210 may be communicated to the generative output engine 240. In implementations in which the generative output engine 240 is an external service, the prompt may be communicated to the external generative output engine 240 using an application programming interface (API) call. In some cases, the prompt is provided to the generative output engine 240 using a JSON file format or other schema recognized by the generative output engine 240. If the generative output engine 240 is an integrated service, other techniques may be used to communicate the prompt to the generative output engine 240 as provided by the architecture of the platform including passing a reference or pointer to the prompt, writing the prompt to a designated location, or other similar internal data transfer technique. As described throughout herein, the generative output engine 240 may include a large language model or other predictive engine that is adapted to produce or synthesize content in response to a given prompt. The generative response is unique to the prompt and different prompts, containing different prompt text, will result in a different generative response.

In response to the prompt, the generative output engine 240 sends a generative response to the search gateway service 210. The search gateway service 210 or a related service may perform post processing on the generative response including validation of the response, filtering operations to remove prohibited or non-preferred terms, eliminate potentially inaccurate phrases or terms, or perform other post-processing operations. As discussed above, the search gateway service 210 may also process any tags or similar items returned in the generative response that indicate the source of content that was used for the generative response. The search gateway service 210 or a related service may generate links, icons, or other selectable objects to be rendered/displayed in the generative answer interface. Subsequent to any post-processing operations, the generative response, or portions thereof, are communicated to the frontend application for display in the generative answer interface. In some implementations, the search gateway service 210 may also receive express feedback provided via the interface regarding the suitability or accuracy of the results. The search gateway service may also provide feedback that results from object selections, dwell time on the generative response, subsequent queries, and other user interaction events that may signal positive or negative feedback, which may be used to train intent recognition modules or other aspects of the system 200 to improve the accuracy and performance of subsequent responses.

The search gateway service 210 or a related service may receive feedback or user validation from user accounts that are identified as having a subject matter expertise related to the generative response. The service or system may, in response to receiving a positive feedback from an account flagged as having appropriate subject matter expertise (e.g., associated subject matter expertise has a threshold similarity to the subject matter of the generative response), the service or system may designate the generative response as verified or endorsed. In some cases, a graphical object corresponding to the verification or endorsement is displayed with the generative response in the corresponding interface. In some cases, verified or endorsed content is cached or saved and used for future responses or for use in subsequent prompts as an example input output pair or as an exemplary response.

In some instances, the search gateway service 210 may include instructions to provide a confidence metric, such as a confidence interval or confidence score, with any generative response. The confidence metric may indicate an estimated confidence in the accuracy or relevancy of the generative response. In response, the generative output engine 240, may provide the corresponding confidence metric along with the generative output. If the provided confidence metric falls below a threshold or fails to satisfy a confidence criteria, the search gateway service 210 may not cause the generative response to be displayed in the generative answer interface. In one example, a generative response having a confidence interval of less than 50% is not displayed. In some cases, a generative response having a confidence interval of less than 60% is not displayed. In some cases, a generative response having a confidence interval of less than 70% is not displayed. In some cases, a generative response having a confidence interval of less than 80% is not displayed. In some cases, the display of the response is suppressed or otherwise not displayed. In some cases, a message indicating that an answer or response is currently not available or other similar message may be displayed in the generative answer interface.

Figure 2B:
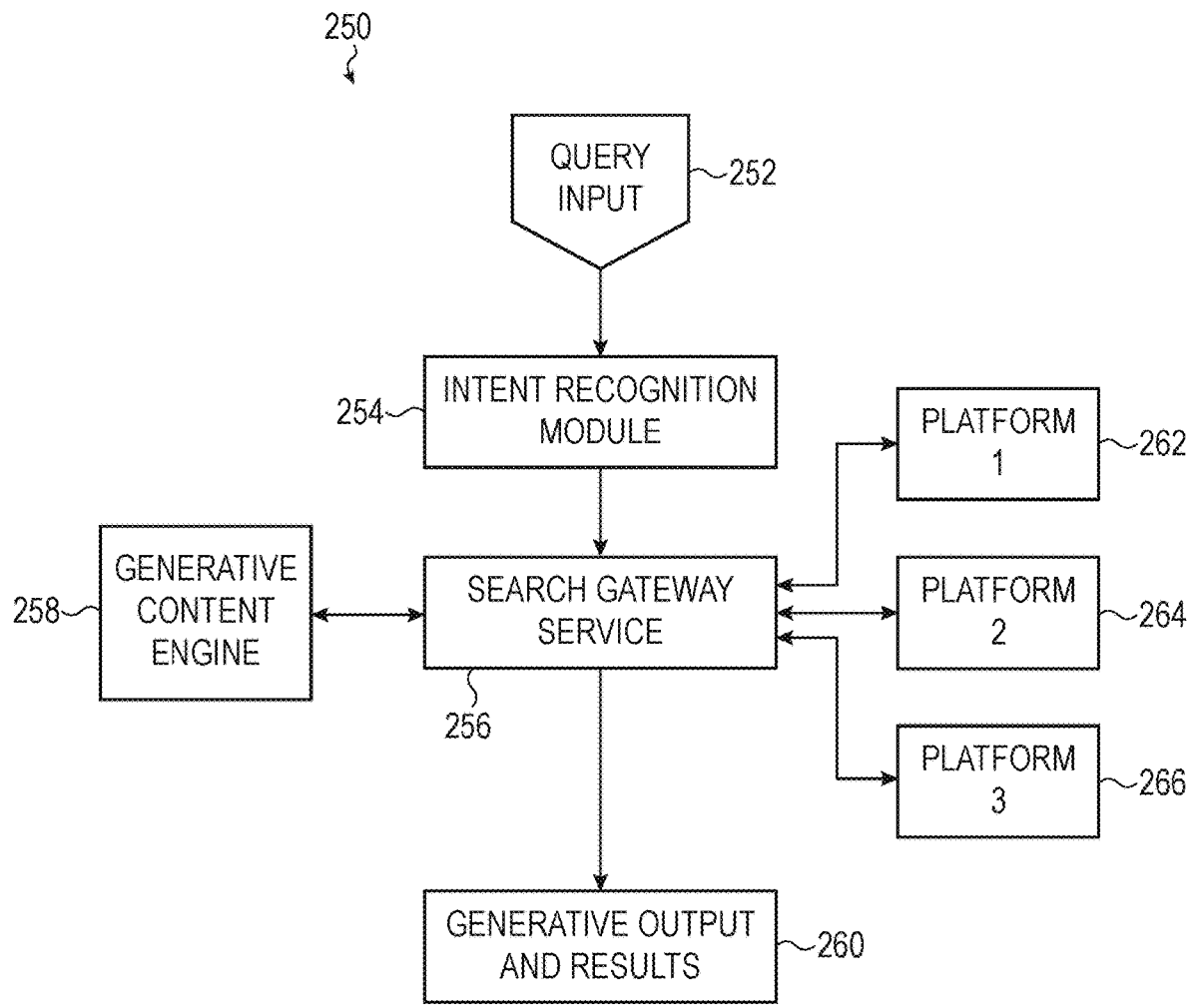
FIG. 2B depicts an example schematic flow for providing a generative answer interface for a content collaboration platform.

FIG. 2B depicts an example system 250 that can be used in conjunction with the generative answer interfaces or other graphical user interfaces described herein. In particular, the system 250 can be used to leverage content from multiple platforms to synthesize or generate a response to a query input 252. Specifically, the system 250 may be adapted to extract content from multiple platforms 262, 264, 266 that all may be accessible by a service like the search gateway service 256. Aspects of the system 250 that are similar to other examples described herein may not be described in full detail in order to reduce redundancy and improve clarity with regard to this example. Further, aspects of the system 250 may be combined with aspects of other systems, described herein, in order to provide a fully functional or operational service.

As shown in FIG. 2B, the system may be implemented in response to a query input 252 that is provided via a frontend application. As discussed with respect to other examples, the query input 252 may be a natural language user input that may include user-entered text and other user input, including filters, search constraints, and other user commands provided via the graphical user interface of the frontend application, which may include the generative answer interface.

In this example, the query input 252 is analyzed using an intent recognition module 254. The intent recognition module 254 is used to determine a type of response that may be best suited to the query input 252 and/or may select an appropriate platform or set of platforms to service the query input 252. Specifically, the intent recognition module 254 may analyze a natural language string of the query input 252 to determine an action intent. The action intent may classify the string as being directed to one of a number of different response types. In one example, the action intent corresponds to a request for content items, which may also be referred to as a search request type or search query request type. A search request type may be inferred based on a natural language string that includes a non-grammatical string or phrase or shortened sentence that indicates a request for content items. Example natural language phrases include "open issues for project Blackbird," or "product specifications for the Stealth initiative." In another example, the action intent corresponds to an interrogatory or a request for an answer or natural language response, which may also be referred to as an interrogatory request type or inquiry request type. An interrogatory or inquiry request type may be inferred based on a natural language string that includes a more complete grammatical structure that may include a more general inquiry regarding content or a topic. Example natural language phrases include "what is the current state project Blackbird," or "how many product teams are currently working on the Stealth initiative" or "what is the vacation policy at this company." In another example, the action intent corresponds to a request for an entity (e.g., a person, project, or defined object or term), which may also be referred to as an entity request type or term request type. An entity or term request type may be inferred based on a detection of a defined person, project, or other object with minimal or no interrogatory language or similar grammatical structure. Example natural language terms or phrases include "project Blackbird," or "the Stealth initiative" or "John Smith."

The action intent may be determined by analyzing the sentence structure or grammatical form of the query input 252 and/or using a trained model that can be used to identify a type of response based on the natural language user input or a pre-processed version of the natural language user input. In one example implementation, the intent recognition module 254 includes a transformer module that is trained using historical user inputs and training mappings to entities or classifiers. An example transformer module may include a bidirectional encoder representation transformer or other transformer that is able to predict an output given a set of words or phrases based on a training corpus. Other models include neural network models, vector models, and other models. A model may be particularly useful to accommodate highly specialized query language or enterprises that are prone to use unique jargon or phrasing that may mislead a more direct entity mapping technique. In some implementations, one or more preprocessing operations are performed on the natural language input before being passed to the trained model. For example, common words like articles and/or punctuation may be removed prior to being processed by the trained model. In some implementations, the natural language may be converted into a vector representation or other numerical representation before being processed by the trained model. Other preprocessing techniques may also be used.

The intent recognition module may also be used to identify one or more candidate platforms that can be used to service the query 252. In one example implementation, the intent recognition module 254 includes a language parsing service that segments the query input 252 into segments, which may include individual words or short phrases. For one or more of the segments, the intent recognition module 254 may perform an entity mapping operation in which the segment is associated with an entity or other classifier. For example, certain words or phrases like "project," "timeline," "assigned," "bug," or "issue" may be associated with an issue tracking entity or classifier. Similarly, words or phrases like "goals," "overview," "plan," or "strategy" may be associated with a documentation entity or classifier. Additionally, the intent recognition module 254 may define tenant-specific or enterprise-specific mappings that include project code names, team names, internal organizations, initiatives, or other enterprise-specific language. These names may be mapped to entities in which the most explanatory or descriptive content may be managed with respect to that particular project, initiative, or the like. The intent recognition module 254 may then associate one or more platforms with the mapped entities or classifications. In the present example, there are three candidate platforms 262, 264, 266 that may be associated with a given query input 252 but the system is not limited to three platforms and may include many additional platforms and/or external content sources.

Similar to the action intent, the platform intent may be determined using a trained model that can be used to identify a type of response and/or one or more candidate platforms based on user input. As discussed above, the intent recognition module 254 includes a transformer module that is trained using historical user inputs and training mappings to entities or classifiers. An example transformer module may include a bidirectional encoder representation transformer or other transformer that is able to predict a respective platform or data source given a set of words or phrases based on a training corpus.

The intent recognition module 254 may determine a platform intent based on the natural language input provided in the query input 252. The platform intent, including the entity or classification mappings may be used to select a set of candidate platforms from a set of registered or otherwise compatible platforms 262, 264, 266. As discussed above, each entity or classification may correlate to one or more platforms predicted to host content that is relevant to the corresponding portion of the query. The intent-to-platform mapping may be performed by the search gateway service 256 or the intent recognition module 254, depending on the implementation. In response to a selection of one or more candidate platforms, the search gateway service 256 may implement a content extraction operation with respect to each candidate platform. An example of a content extraction operation and the respective system components is described above with respect to FIG. 2A and is not repeated here to reduce redundancy. That is, similar to the previous example, the search gateway service 256 may engage one or more index services and content hydrating services in order to extract relevant content from each respective platform. As depicted and described below with respect to FIG. 15, each platform may have a dedicated and specialized content extraction engine 1512, 1522, 1533, which may be used to extract content from a respective platform 1510, 1520, 1530. Additionally, as shown in FIG. 15, each platform may also be operably coupled to a transformer module 1514, 1524, 1534, which may be used to transform queries into a form suitable for the respective platform and perform data normalization operations and validation before transmission to the search gateway service 256.

Returning to FIG. 2B, the search gateway service 256 may take portions of content extracted from respective content items obtained from respective platforms and generate a prompt that is provided to the generative output engine 258. Similar to the other examples provided herein, the search gateway service 256 may combine portions of the query input, excerpts from the respective content items, context data, and predetermined prompt text to construct the prompt. Similar to previous examples, the search gateway service 256 provides the prompt to the generative output engine 258 using an API or other technique and receives, in return a generative response. The search gateway service 256 may perform validation and other post-processing operations on the generative response before providing the response to the frontend application 260. While not expressly shown in the system 250 of FIG. 2B, the generative response may be communicated to the backend application or a generative interface service, which provides the generative response to the frontend application 260. Other communication schemes may also be used depending on the implementation.

As described below with respect to FIGS. 5-7 the result that is produced by the frontend application 260 may vary in accordance with the action intent. Specifically, a first response type like a set of search results or search interface may be generated in response to a determination that the query input 252 corresponds to a request for content items or a search request type. A second response type like a generative response type or generative interface may be generated in response to a determination that the query input 252 corresponds to an interrogatory or an inquiry request type. An example generative response type is depicted in the example graphical user interfaces of FIGS. 5 and 6. A third response type like an entity card interface may be generated in response to a determination that the query input 252 corresponds to a request for an entity or other defined object. An example entity card interface is depicted in the example graphical user interface of FIG. 7. In some examples, the different response types may be combined to produce a composite or integrated response. For example, as shown in the examples of FIGS. 5-7, each of the interfaces may include a search result interface, which includes a set of search result toward the bottom of the interface.

Figure 3A:
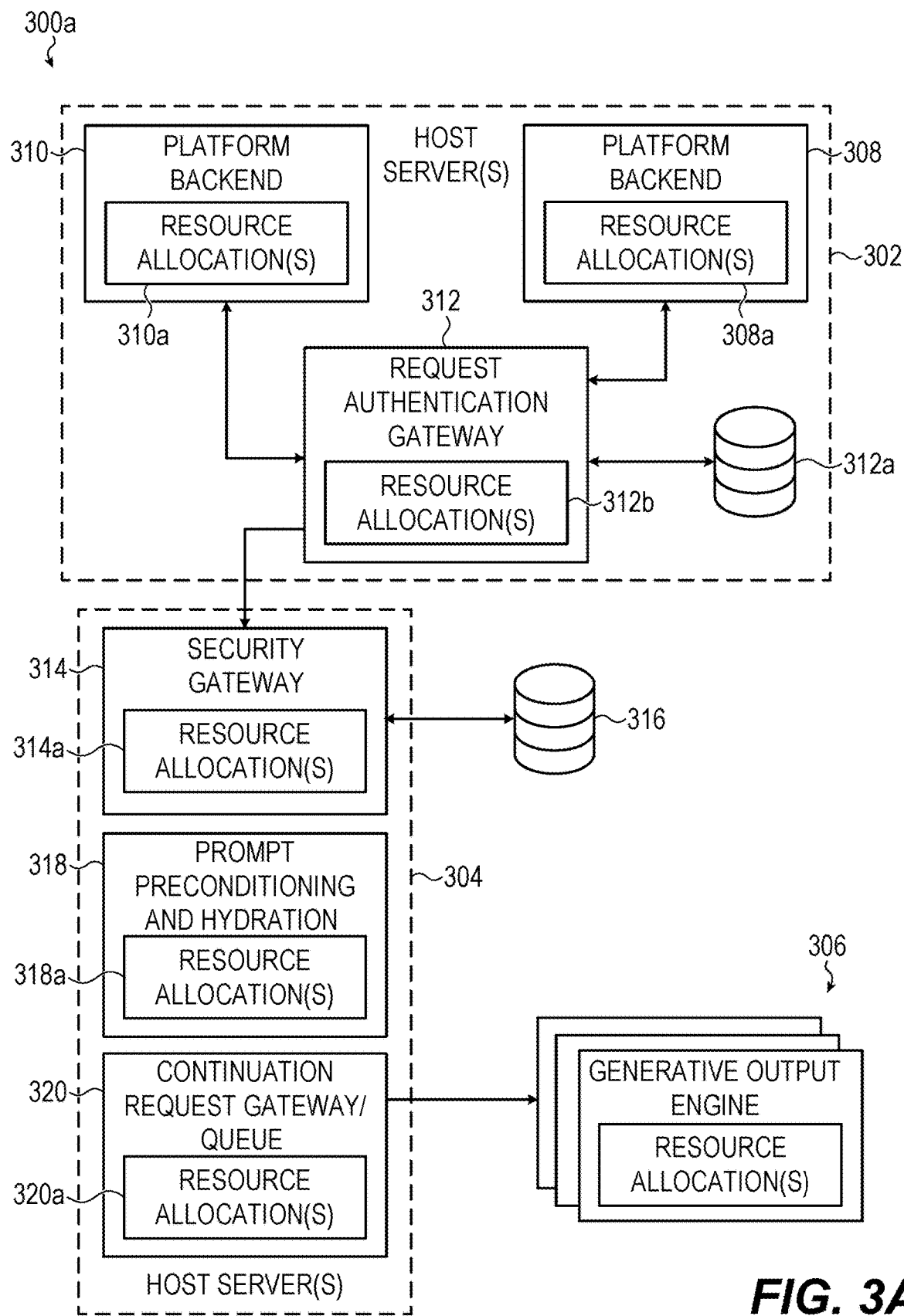
FIG. 3A depicts a simplified diagram of a system, such as described herein that can include and/or may receive input from a generative output engine.
Figure 3B:
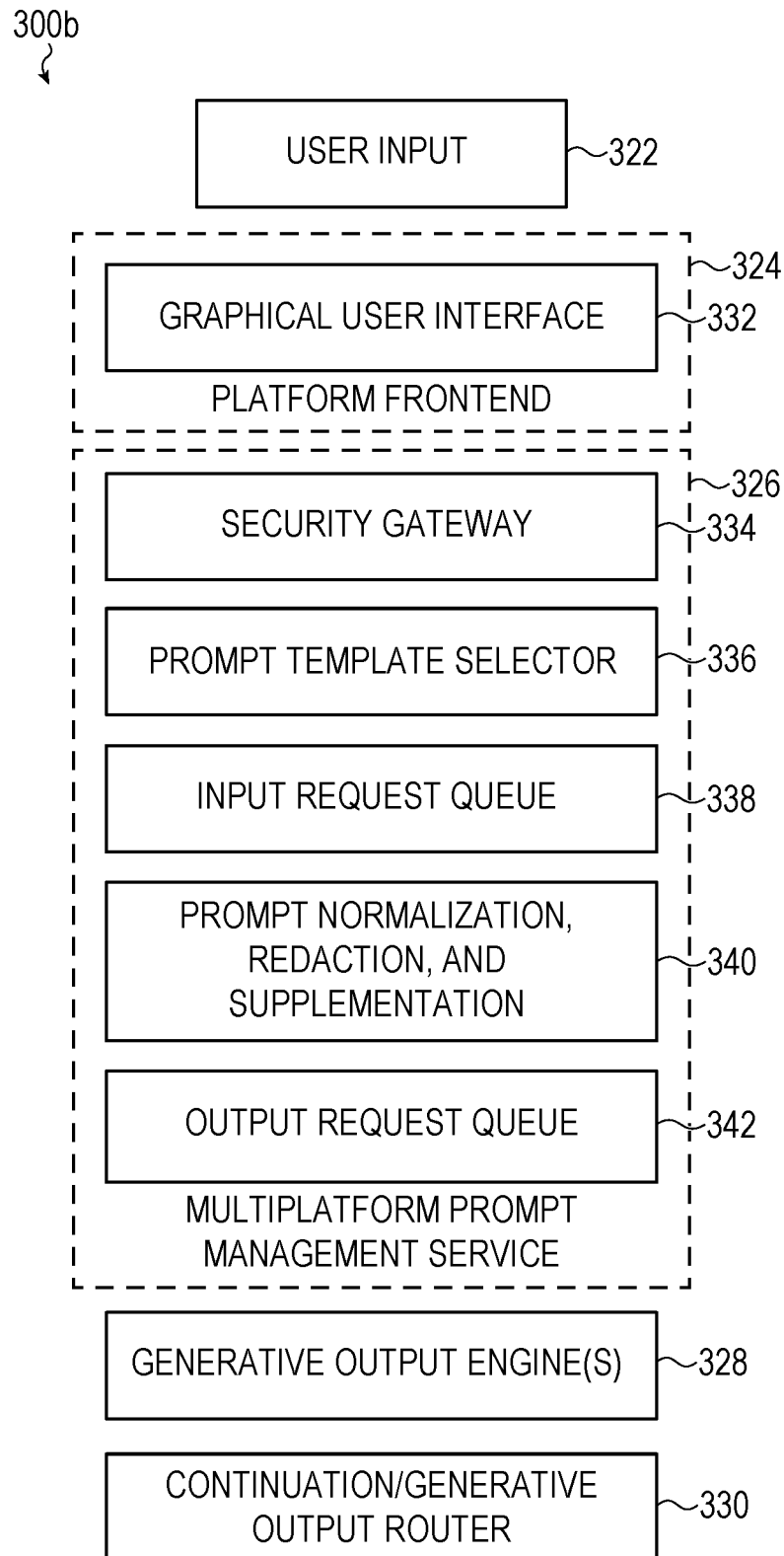
FIG. 3B depicts a functional system diagram of a system that can be used to implement a multiplatform prompt management service.

FIGS. 3A-3B depicts system diagrams and network/communication architectures that may support a system as described herein. Referring to FIG. 3A, the system 300a includes a first set of host servers 302 associated with one or more software platform backends. These software platform backends can be communicably coupled to a second set of host servers 304 purpose configured to process requests and responses to and from one or more generative output engines 306.

Specifically, the first set of host servers 302 (which, as described above can include processors, memory, storage, network communications, and any other suitable physical hardware cooperating to instantiate software) can allocate certain resources to instantiate a first and second platform backend, such as a first platform backend 308 and a second platform backend 310. Each of these respective backends can be instantiated by cooperation of processing and memory resources associated to each respective backend. As illustrated, such dedicated resources are identified as the resource allocations 308a and the resource allocations 310a.

Each of these platform backends can be communicably coupled to an authentication gateway 312 configured to verify, by querying a permissions table, directory service, or other authentication system (represented by the database 312a) whether a particular request for generative output from a particular user is authorized. Specifically, the second platform backend 310 may be a documentation platform used by a user operating a frontend thereof.

The user may not have access to information stored in an issue tracking system. In this example, if the user submits a request through the frontend of the documentation platform to the backend of the documentation platform that in any way references the issue tracking system, the authentication gateway 312 can deny the request for insufficient permissions. This example is merely one and is not intended to be limiting; many possible authorization and authentication operations can be performed by the authentication gateway 312. The authentication gateway 312 may be supported by physical hardware resources, such as a processor and memory, represented by the resource allocations 312b.

Once the authentication gateway 312 determines that a request from a user of either platform is authorized to access data or resources implicated in service that request, the request may be passed to a security gateway 314, which may be a software instance supported by physical hardware identified in FIG. 3A as the resource allocations 314a. The security gateway 314 may be configured to determine whether the request itself conforms to one or more policies or rules (data and/or executable representations of which may be stored in a database 316) established by the organization. For example, the organization may prohibit executing prompts for offensive content, value-incompatible content, personally identifying information, health information, trade secret information, unreleased product information, secret project information, and the like. In other cases, a request may be denied by the security gateway 314 if the prompt requests beyond a threshold quantity of data.

Once a particular user-initiated prompt has been sufficiently authorized and cleared against organization-specific generative output rules, the request/prompt can be passed to a preconditioning and hydration service 318 configured to populate request-contextualizing data (e.g., user ID, page ID, project ID, URLs, addresses, times, dates, date ranges, and so on), insert the user's request into a larger engineered template prompt and so on. Example operations of a preconditioning instance are described elsewhere herein; this description is not repeated. The preconditioning and hydration service 318 can be a software instance supported by physical hardware represented by the resource allocations 318a. In some implementations, the hydration service 318 may also be used to rehydrate personally identifiable information (PII) or other potentially sensitive data that has been extracted from a request or data exchange in the system.

One a prompt has been modified, replaced, or hydrated by the preconditioning and hydration service 318, it may be passed to an output gateway 320 (also referred to as a continuation gateway or an output queue). The output gateway 320 may be responsible for enqueuing and/or ordering different requests from different users or different software platforms based on priority, time order, or other metrics. The output gateway 320 can also serve to meter requests to the generative output engines 306.

FIG. 3B depicts a functional system diagram of the system 300a depicted in FIG. 3A. In particular, the system 300b is configured to operate as a multiplatform prompt management service supporting and ordering requests from multiple users across multiple platforms. In particular, a user input 322 may be received at a platform frontend 324. The platform frontend 324 passes the input to a prompt management service 326 that formalizes a prompt suitable for input to a generative output engine 328, which in turn can provide its output to an output router 330 that may direct generative output to a suitable destination. For example, the output router 330 may execute API requests generated by the generative output engine 328, may submit text responses back to the platform frontend 324, may wrap a text output of the generative output engine 328 in an API request to update a backend of the platform associated with the platform frontend 324, or may perform other operations.

Specifically, the user input 322 (which may be an engagement with a button, typed text input, spoken input, chat box input, and the like) can be provided to a graphical user interface 332 of the platform frontend 324. The graphical user interface 332 can be communicably coupled to a security gateway 334 of the prompt management service 326 that may be configured to determine whether the user input 322 is authorized to execute and/or complies with organization-specific rules.

The security gateway 334 may provide output to a prompt selector 336 which can be configured to select a prompt template from a database of preconfigured prompts, templatized prompts, or engineered templatized prompts. Once the raw user input is transformed into a string prompt, the prompt may be provided as input to a request queue 338 that orders different user request for input from the generative output engine 328. Output of the request queue 338 can be provided as input to a prompt hydrator 340 configured to populate template fields, add context identifiers, supplement the prompt, and perform other normalization operations described herein. In other cases, the prompt hydrator 340 can be configured to segment a single prompt into multiple discrete requests, which may be interdependent or may be independent.

Thereafter, the modified prompt(s) can be provided as input to an output queue at 342 that may serve to meter inputs provided to the generative output engine 328.

These foregoing embodiments depicted in FIGS. 3A-3B and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

Figure 4A:
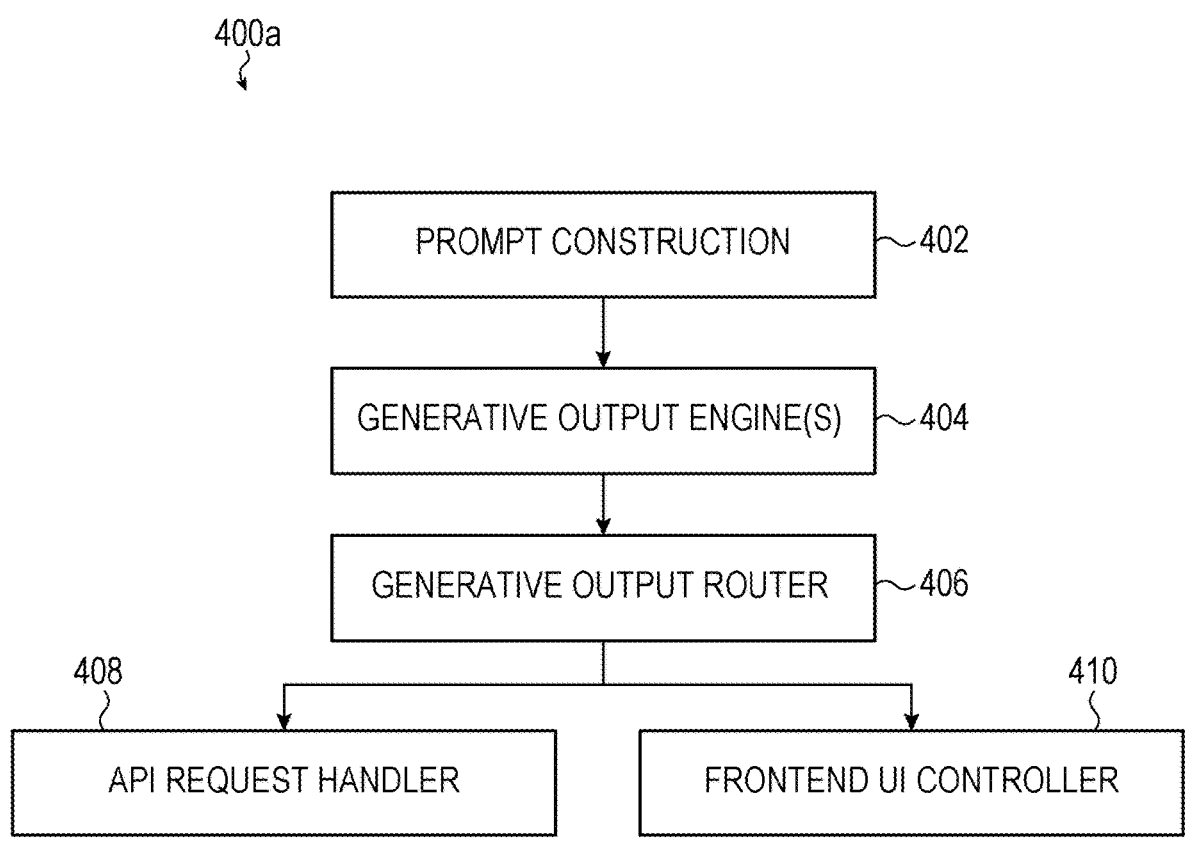
FIG. 4A depicts a simplified system diagram and data processing pipeline.

For example, although many constructions are possible, FIG. 4A depicts a simplified system diagram and data processing pipeline as described herein. The system 400a receives user input, and constructs a prompt therefrom at operation 402. After constructing a suitable prompt, and populating template fields, selecting appropriate instructions and examples for an LLM to continue, the modified constructed prompt is provided as input to a generative output engine 404. A continuation from the generative output engine 404 is provided as input to a router 406 configured to classify the output of the generative output engine 404 as being directed to one or more destinations. For example, the router 406 may determine that a particular generative output is an API request that should be executed against a particular API (e.g., such as an API of a system or platform as described herein). In this example, the router 406 may direct the output to an API request handler 408. In another example, the router 406 may determine that the generative output may be suitably directed to a graphical user interface/frontend. For example, a generative output may include suggestions to be shown to a user below a user's partial input, such as shown in FIGS. 2A-2B.

Figure 4B:
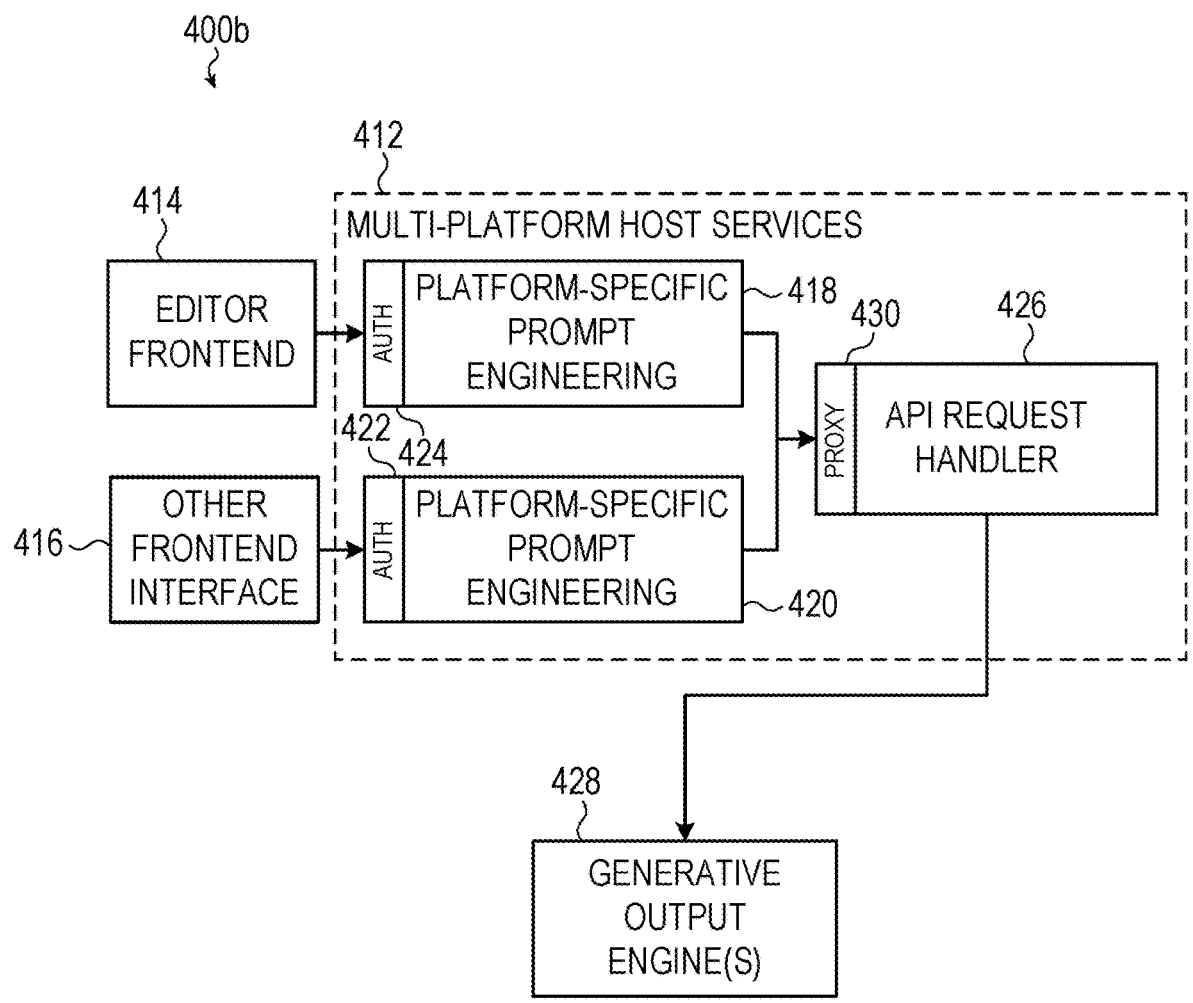
FIG. 4B depicts a system providing multiplatform prompt management as a service.

Another example architecture is shown in FIG. 4B, illustrating a system providing prompt management, and in particular multiplatform prompt management as a service. The system 400b is instantiated over cloud resources, which may be provisioned from a pool of resources in one or more locations (e.g., datacenters). In the illustrated embodiment, the provisioned resources are identified as the multi-platform host services 412.

The multi-platform host services 412 can receive input from one or more users in a variety of ways. For example, some users may provide input via an editor region 414 of a frontend, such as described above. Other users may provide input by engaging with other user interface elements 416 unrelated to common or shared features across multiple platforms. Specifically, the second user may provide input to the multi-platform host services 412 by engaging with one or more platform-specific user interface elements. In yet further examples, one or more frontends or backends can be configured to automatically generate one or more prompts for continuation by generative output engines as described herein. More generally, in many cases, user input may not be required and prompts may be requested and/or engineered automatically.

The multi-platform host services 412 can include multiple software instances or microservices each configured to receive user inputs and/or proposed prompts and configured to provide, as output, an engineered prompt. In many cases, these instances—shown in the figure as the platform-specific prompt engineering services 418, 420—can be configured to wrap proposed prompts within engineered prompts retrieved from a database such as described above.

In many cases, the platform-specific prompt engineering services 418, 420 can each be configured to authenticate requests received from various sources. In other cases, requests from editor regions or other user interface elements of particular frontends can be first received by one or more authenticator instances, such as the authentication instances 422, 424. In other cases, a single centralized authentication service can provide authentication as a service to each request before it is forwarded to the platform-specific prompt engineering services 418, 420.

Once a prompt has been engineered/supplemented by one of the platform-specific prompt engineering services 418, 420, it may be passed to a request queue/API request handler 426 configured to generate an API request directed to a generative output engine 430 including appropriate API tokens and the engineered prompt as a portion of the body of the API request. In some cases, a service proxy 430 can interpose the platform-specific prompt engineering services 418, 420 and the request queue/API request handler 426, so as to further modify or validate prompts prior to wrapping those prompts in an API call to the generative output engine 428 by the request queue/API request handler 426 although this is not required of all embodiments.

These foregoing embodiments depicted in FIGS. 3A-3B and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

More generally, it may be appreciated that a system as described herein can be used for a variety of purposes and functions to enhance functionality of collaboration tools. Detailed examples follow. Similarly, it may be appreciated that systems as described herein can be configured to operate in a number of ways, which may be implementation specific.

For example, it may be appreciated that information security and privacy can be protected and secured in a number of suitable ways. For example, in some cases, a single generative output engine or system may be used by a multiplatform collaboration system as described herein. In this architecture, authentication, validation, and authorization decisions in respect of business rules regarding requests to the generative output engine can be centralized, ensuring auditable control over input to a generative output engine or service and auditable control over output from the generative output engine. In some constructions, authentication to the generative output engine's services may be checked multiple times, by multiple services or service proxies. In some cases, a generative output engine can be configured to leverage different training data in response to differently-authenticated requests. In other cases, unauthorized requests for information or generative output may be denied before the request is forwarded to a generative output engine, thereby protecting tenant-owned information within a secure internal system. It may be appreciated that many constructions are possible.

Additionally, some generative output engines can be configured to discard input and output once a request has been serviced, thereby retaining zero data. Such constructions may be useful to generate output in respect of confidential or otherwise sensitive information. In other cases, such a configuration can enable multi-tenant use of the same generative output engine or service, without risking that prior requests by one tenant inform future training that in turn informs a generative output provided to a second tenant. Broadly, some generative output engines and systems can retain data and leverage that data for training and functionality improvement purposes, whereas other systems can be configured for zero data retention.

In some cases, requests may be limited in frequency, total number, or in scope of information requestable within a threshold period of time. These limitations (which may be applied on the user level, role level, tenant level, product level, and so on) can prevent monopolization of a generative output engine (especially when accessed in a centralized manner) by a single requester. Many constructions are possible.

Documentation Platforms & Shared Editors

FIGS. 5-6 are directed to example graphical user interfaces that demonstrate functionality of an editor and content viewer of a collaboration platform, as described herein. As described previously, a collaboration platform may include or be integrated with a content-creation and modification service that can be used to create, edit, or adapt content for use with the collaboration system. The content-creation and modification service may be operably coupled to or include a language model platform, as described herein, which may be used to automatically generate content in response to text-based prompts. As described in more detail below, the content creation and modification service may be used to (1) summarize existing user-generated content, (2) automatically edit or modify existing-user generated content to adjust for content length, content tone, or other content qualities, and (3) generate new user-generated content based on user-provided prompt or input. The content creation and modification service may also be adapted to pull content from other platforms, utilize user graphs, utilize project graphs, or utilize other cross-platform data in order to perform the various functions described herein.

As described herein, a collaboration platform or service may include an editor that is configured to receive user input and generate user-generated content that is saved as a content item. The terms "collaboration platform" or "collaboration service" may be used to refer to a documentation platform or service configured to manage electronic documents or pages created by the system users, an issue tracking platform or service that is configured to manage or track issues or tickets in accordance with an issue or ticket workflow, a source-code management platform or service that is configured to manage source code and other aspects of a software product, a manufacturing resource planning platform or service configured to manage inventory, purchases, sales activity or other aspects of a company or enterprise. The examples provided herein are described with respect to an editor that is integrated with the collaboration platform. In some instances, the functionality described herein may be adapted to multiple platforms or adapted for cross-platform use through the use of a common or unitary editor service. For example, the functionality described in each example is provided with respect to a particular collaboration platform, but the same or similar functionality can be extended to other platforms by using the same editor service. Also, as described above a set of host services or platforms may be accessed through a common gateway or using a common authentication scheme, which may allow a user to transition between platforms and access platform-specific content without having to enter user credentials for each platform.

FIG. 5 depicts an example graphical user interface of a frontend of a collaboration platform. The graphical user interface 500 may be provided by a client application (e.g., a fronted application) operating on a client device that is operably coupled to a backend of the collaboration platform using a computer network. The client application may be a dedicated client application or may be a browser application that accesses the backend of the collaboration platform using a web-based protocol. As described herein, the client application may operate a frontend of the collaboration platform and is operably coupled to a backend of the collaboration platform operating on a server. The following example includes an interface for providing generative services and, more particularly, providing an interface, which may include a generative answer interface, entity card interface or other similar interface that can be used to produce synthesized or generative content in response to a user input. The techniques and functionality described here can be applied to a variety of different collaboration platforms. In the following example, the collaboration platform is a documentation platform configured to manage content items like user-generated pages or electronic documents.

As shown in FIG. 5, the graphical user interface 500 includes an editor region 502 that includes user-generated content of the content item. The user-generated content may include text, images, audio and video clips, and other multi-media content. The user may transition the graphical user interface 500 into an editor mode by selecting the edit control 512 on the control bar 510. In the editor mode, the region 502 operates as an editor region and receives user input including text input from a keyboard, object insertions for images and other media, creation of embedded content, comments, labels, tags, and other electronic content. The user may transition the graphical user interface 500 into a content viewer mode by selecting the publish control 514 on the control bar 510. User selection of the publish control 514 may cause the content of the page or electronic document to be saved on the collaboration platform backend and the page or electronic document may be accessible to other users of the system having been authenticated and having a permissions profile that is consistent with a permissions profile of the page or electronic document. The user may also create new pages or documents by selecting the create control 516, which may initiate the creation of a new page or document which may be populated with user-generated text, links, images, audio, videos, and other content. As shown in the example control bar 510, other controls may also be provided in the graphical user interface including space selection, setting controls, user profile settings, notifications, and other control input for the frontend application.

In general, the user-generated content may be saved in accordance with a platform-specific markup language schema. An example of a platform-specific markup language schema is an Atlassian Document Format (ADF). The term platform-specific schema may be used to refer to a schema that is generally used with a particular platform but may also be used on other platforms having a similar rendering engine or editor functionality and may not be restricted to solely one platform. The user-generated content may be stored by the backend application and content may be indexed and a portion of the text content may be stored in an index store, as described above with respect to FIG. 2A. Indexing and storage of the user-generated content of the various pages managed by the platform allows for efficient and accurate content searching and extraction, as previously described with respect to FIG. 2A.

User-generated pages for a particular document space may be accessible via a navigational pane 504, which includes a hierarchical element tree of selectable elements, also referred to as a page tree or document tree. Each element of the hierarchical element tree may be selectable to cause to display of a respective page or document in the editor or content viewing pane 502. Additionally, each of the selectable elements may be dragged and dropped within the navigational pane 504 to a new location within the tree, thereby causing a change or modification in the dependency relationship between the pages or documents.

As shown in the example of FIG. 5, the graphical user interface includes a response interface 520, which may be displayed in response to a user input provided to the search control 530, which in this case is a search input or text input field or region. In this particular example, the search control 530 (search input field) receives natural language user input 532, which includes the natural language user input "documents and issues for Project X." In other examples, another search control or graphical element may be used to invoke the service used to cause display of the interface 520. Also, while the present example depicts the interface 520 as a floating window that overlaps or overlays the content panel 502 and a portion of the navigation panel 504, in other implementations the interface 520 may occupy an entirety of the content panel 502 or may occupy a substantial entirety of the graphical user interface.

As shown in FIG. 5, the interface 520 may include other graphical elements for receiving user input that may be used to tailor the search results and/or the generative input. Specifically, the interface 520 includes a query parameter interface 560 which includes groups of selectable controls that can be used to filter the results or target specific content to be used to service the user input 523. Specifically, the user may select specific users or content creators using a first set of controls 564 and/or may select specific document spaces or content types using a second set of controls 562. Additional controls may be accessed using control 566, which may expand the query parameter interface 560 or replace the currently displayed controls with additional controls or selections.

The type of response that is presented in the interface 520 may depend, at least in part, on an intent analysis performed with respect to the natural language user input. As described previously with respect to FIG. 2B, an intent recognition module may be used to analyze the natural language input and determine an action intent. In the present example, the natural language input "documents & issues for Project X" may correspond to a request for search results or content items, which may also be classified as a search request type or search query request type. As a result, in the present example, the interface 520 includes search results 552, which may be displayed in a search result region 550 of the interface 520. The search results 522 may be obtained by analyzing the natural language user input and identifying or extracting keywords or tokens. The extracted or analyzed content may be used to identify corresponding content using a content search technique similar to the process described with respect to FIG. 2A. In some cases, the search results are obtained using an elastic search technique in which portions of the natural language text input are used to located corresponding content items using one or more content indices or other structured storage and location scheme. In some cases, the search results are determined as part of the generative answer process, described in other examples herein.

Each of the search results 522 may be selectable to cause redirection of the graphical user interface to the respective content item and hosting platform. In the current example, the interface 520 also includes recommended document spaces 544 and an option to perform a more detailed or advanced search 556 via an input field or other control. The recommended document spaces 544 may be displayed in accordance with a threshold number of search results being located in the respective document space, a correlation score with respect to documents or other content provided in the document space, or other selection criteria that is evaluated with respect to the user input 532.

In the present example, the interface 520 also includes a platform selection interface 522, which allows the generative service and/or the content search to be directed to a selected platform or to use a selected platform as the primary resource. In this particular example, platform selection interface includes multiple selections or tabs including a first selection for a documentation platform, a second selection for an issue tracking platform, and a third selection for a codebase or source code management platform. Other platforms may also be included, such as task management platforms, email platforms, instant messaging platforms, knowledge base platforms, and others. As described previously with respect to FIG. 2B, an intent recognition module or similar tool may be used to determine a platform intent and automatically select and search one or more platforms based on an analysis of the user input 532. In such an implementation, selection of a particular platform may bias the selection of content items of the selected platform for use with the generative and/or search services but it may not restrict the process to only that selected platform. In the present example, the natural language user input "documents & issues for Project X" may correspond to a platform intent corresponding to a combination of a documentation platform and an issue tracking platform. As a result, the user input will trigger or cause a search of both the documentation platform and the issue tracking platform for responds that correspond to the natural language user input.

Figure 6A:
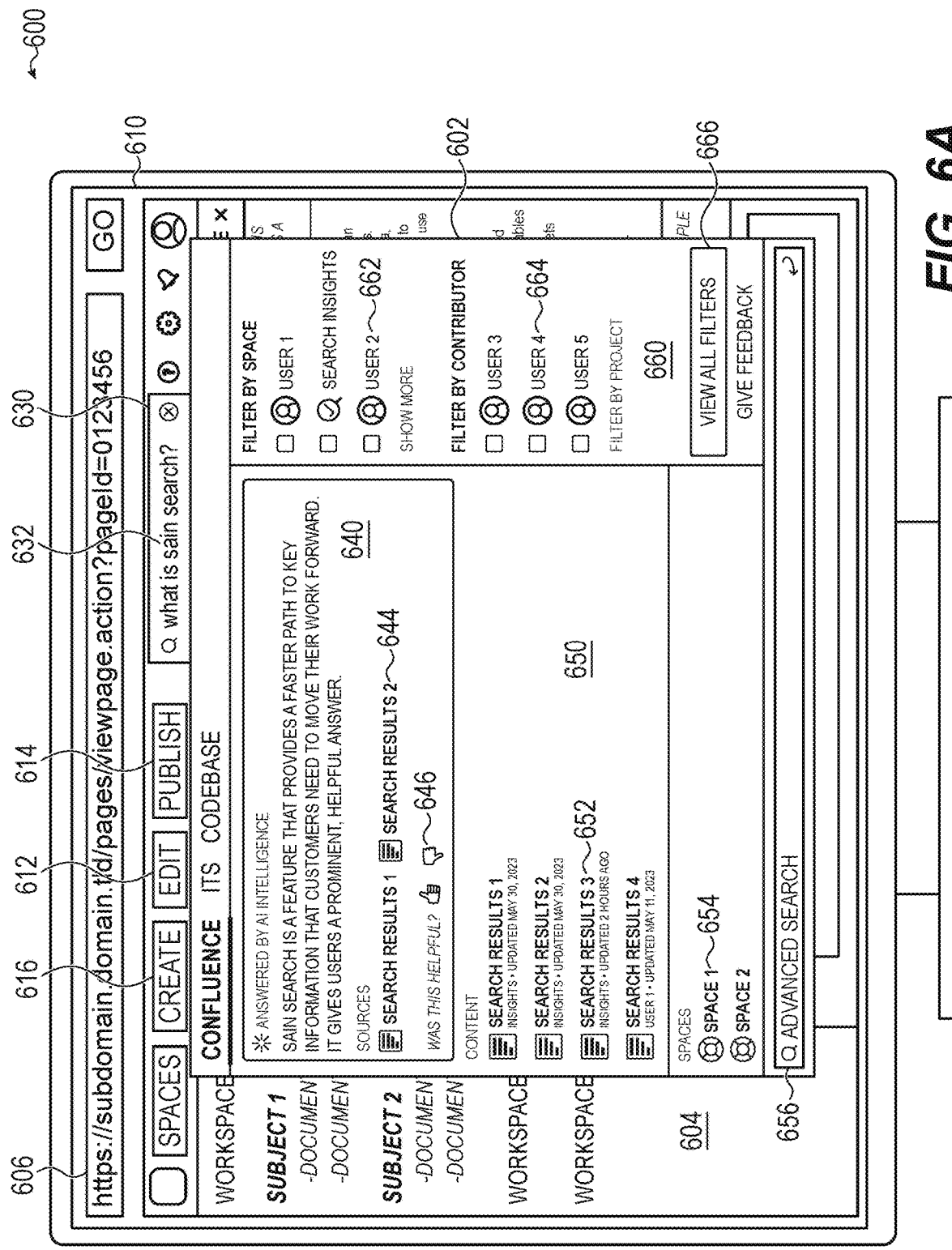

FIG. 6A depicts an example graphical user interface of a frontend of a collaboration platform. Similar to the previous example, the graphical user interface 600 may be provided by a client application (e.g., a fronted application) operating on a client device that is operably coupled to a backend of the collaboration platform using a computer network. The client application may be a dedicated client application or may be a browser application that accesses the backend of the collaboration platform using a web-based protocol. As described herein, the client application may operate a frontend of the collaboration platform and is operably coupled to a backend of the collaboration platform operating on a server. The following example includes an interface for providing generative services and, more particularly, providing a generative answer interface that can be used to produce synthesized or generative content in response to a user input. The techniques and functionality described here can be applied to a variety of different collaboration platforms. In the following example, the collaboration platform is a documentation platform configured to manage content items like user-generated pages or electronic documents.

As shown in FIG. 6A, the graphical user interface 600 includes an editor region 602 that includes user-generated content of the content item. The user may transition the graphical user interface 600 into an editor mode by selecting the edit control 612 on the control bar 610. The user may transition the graphical user interface 600 into a content viewer mode by selecting the publish control 614 on the control bar 610. User selection of the publish control 614 may cause the content of the page or electronic document to be saved on the collaboration platform backend and the page or electronic document may be accessible to other users of the system having been authenticated and having a permissions profile that is consistent with a permissions profile of the page or electronic document. The user may also create new pages or documents by selecting the create control 616, which may initiate the creation of a new page or document which may be populated with user-generated text, links, images, audio, videos, and other content. As shown in the example control bar 610, other controls may also be provided in the graphical user interface including space selection, setting controls, user profile settings, notifications, and other control input for the frontend application.

User-generated pages for a particular document space may be accessible via a navigational pane 604, which includes a hierarchical element tree of selectable elements, also referred to as a page tree or document tree. Each element of the hierarchical element tree may be selectable to cause to display of a respective page or document in the editor or content viewing pane 602. Additionally, each of the selectable elements may be dragged and dropped within the navigational pane 604 to a new location within the tree, thereby causing a change or modification in the dependency relationship between the pages or documents.

As shown in the example of FIG. 6A, the graphical user interface includes a generative answer interface 620, which may be displayed in response to an invocation or instantiation of a generative service or search service. In the present example, the generative service or other respective service may be invoked and the interface 620 displayed in response to a user input provided to the search control 630, which in this case is a search input or text input field or region. In this particular example, the search control 630 (search input field) receives natural language user input 632, which includes the interrogatory "what is sain search." In other examples, another search control or graphical element may be used to invoke the service used to cause display of the interface 620. Also, while the present example depicts the interface 620 as a floating window that overlaps or overlays the content panel 602 and a portion of the navigation panel 604, in other implementations the interface 620 may occupy an entirety of the content panel 602 or may occupy a substantial entirety of the graphical user interface.

As shown in FIG. 6A, the interface 620 may include other graphical elements for receiving user input that may be used to tailor the search results and/or the generative input. Specifically, the interface 620 includes a query parameter interface 660 which includes groups of selectable controls that can be used to filter the results or target specific content to be used to service the user input 623. Specifically, the user may select specific users or content creators using a first set of controls 664 and/or may select specific document spaces or content types using a second set of controls 662. Additional controls may be accessed using control 666, which may expand the query parameter interface 660 or replace the currently displayed controls with additional controls or selections.

As described previously, the natural language user input may be analyzed using an intent recognition module to determine the type of response or results interface that are predicted to be most relevant to the user input. Specifically, as described previously with respect to FIG. 2B, an intent recognition module may be used to analyze the natural language input and determine an action intent. In the present example, the natural language input "what is sain search" may correspond to an interrogatory or a request for an answer or natural language response, which may also be referred to as an interrogatory request type or inquiry request type. As a result, in the present example, the interface 620 includes a generative response 642 in a results region 640 of the generative interface 620. In the present example, the generative interface 620 includes search results 652, which may be displayed in a search result region 650 of the interface 620.

In accordance with the examples provided above, particularly with respect to FIGS. 2A-2B, a user input 632 provided to the search control 630 (search input control) may result in the display of a generative response 642, which may take the form of a generative answer responsive to an interrogatory of the user input 632. The generative response 642 may be synthesized using content extracted from content provided by one or more platforms, depending on the implementation and depending on the user input, content from external or other platforms may be used to generate the generative response 642. A detailed description of example techniques for producing the generative response are provided above and are not repeated with respect to this figure to reduce redundancy.

The generative response 642 is displayed in a response region 640 which may include other generative results and other related content. In this example the response region 640 also includes a set of selectable objects 644 (e.g., links, icons, or other graphical elements) that correspond to the generative response 642. As described previously, the selectable objects 644 may correspond to content items having content that was extracted and used to formulate or synthesize the generative response 642. Selection of the selectable objects 644 may cause the graphical user interface 600 to be redirected to a respective platform and content item that corresponds to the respective selectable object 644. The response region 640 also includes controls 646 that may be used to provide feedback on the quality or accuracy of the generative response 642. In some cases, the controls 646 include a text input field for correcting or editing the generative response 642, which may be used to improve future results. In some cases, the controls 646 may also include the ability to validate or verify the content by endorsing the answer. Validated or verified generative content may be stored and used for subsequent responses. In some cases, the reputation score or subject matter expertise of the validating or verifying user is referenced before the content is designated as validated or verified. In some cases, users must have a sufficient reputation score or designated subject matter expertise before validation controls are active or effectual on the answer.

In the present example, the interface 620 also includes search results 652, which may be displayed in a search result region 650 of the interface 620. The search results may include content that was identified in response to the user input 632 and, in some cases, includes content that was identified in the process of producing the generative response 640. Similar to the selectable objects 644, each of the search results 622 may be selectable to cause redirection of the graphical user interface to the respective content item and hosting platform. In the current example, the interface 620 also includes recommended document spaces 644 and an option to perform a more detailed or advanced search 656 via an input field or other control. The recommended document spaces 644 may be displayed in accordance with a threshold number of search results being located in the respective document space, a correlation score with respect to documents or other content provided in the document space, or other selection criteria that is evaluated with respect to the user input 632.

The interface 620 may also include one or more insertion controls 624 that allow insertion of all or a portion of the generative response 642 to be inserted into user generated content of an editor region 602 of a graphical user interface 600. The insertion controls 624 may also be selectable to cause the generative response 642 or a link to the generative content to be copied, which may be inserted or pasted into a region of the graphical user interface 600 or a graphical user interface of another platform. The interface 620 may also allow for selection of a portion of the generative response 642 to be selected and inserted using the insertion control 624 or other user-selectable object or control.

In the present example, the interface 620 also includes a platform selection interface 622, which allows the generative service and/or the content search to be directed to a selected platform or to use a selected platform as the primary resource. In this particular example, platform selection interface includes multiple selections or tabs including a first selection for a documentation platform, a second selection for an issue tracking platform, and a third selection for a codebase or source code management platform. Other platforms may also be included, such as task management platforms, email platforms, instant messaging platforms, knowledge base platforms, and others. As described previously with respect to FIG. 2B, an intent recognition module or similar tool may be used to automatically select and search one or more platforms based on an analysis of the user input 632. In such an implementation, selection of a particular platform may bias the selection of content items of the selected platform for use with the generative and/or search services but it may not restrict the process to only that selected platform.

Figure 6B:
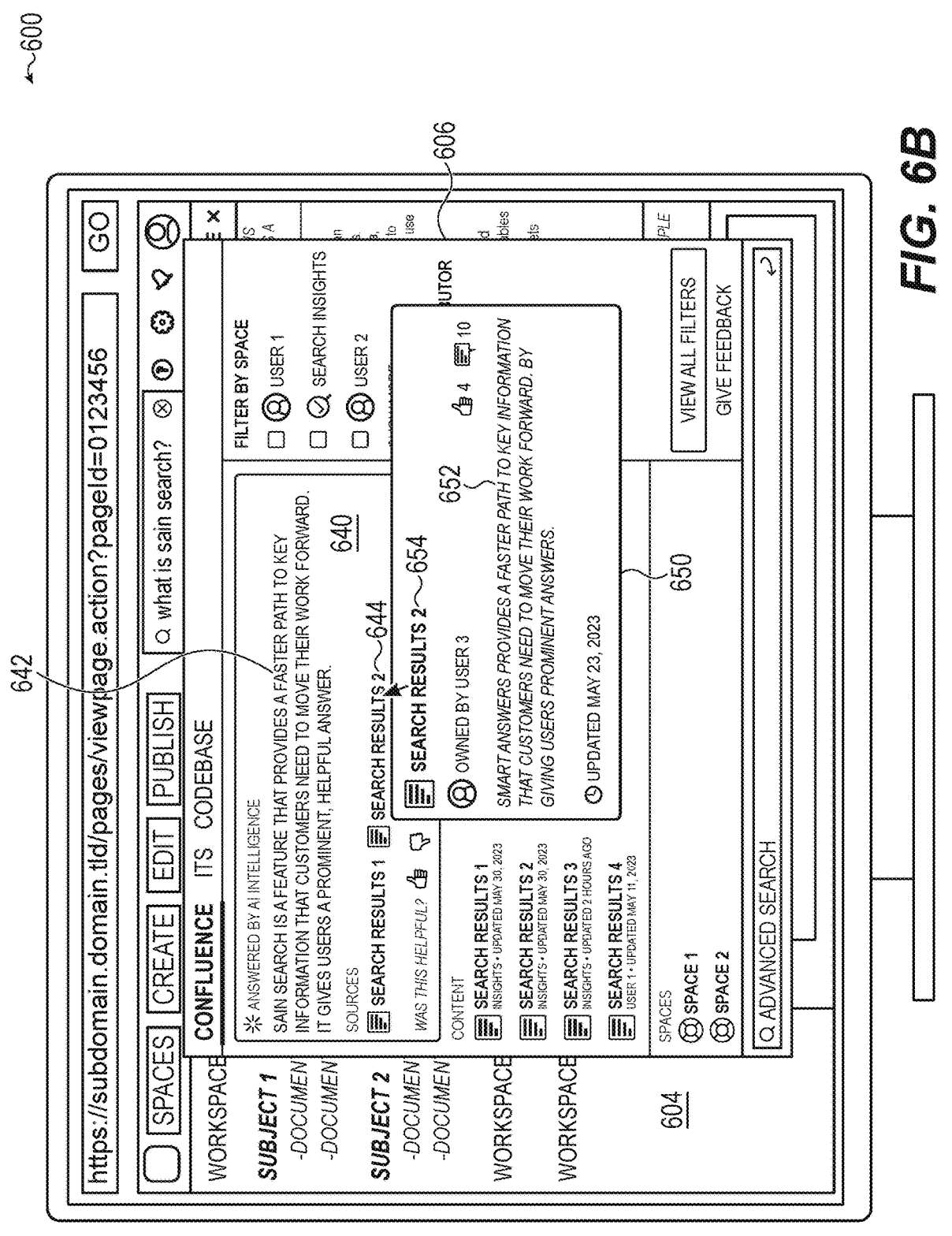

FIG. 6B depicts another view of example graphical user interface 600 having a generative answer interface 620 displaying a generative response 642 in a response region 640, similar to the previous example. A description of other elements of the graphical user interface 600 that are shared with the previous example are not repeated to reduce redundancy and improve clarity.

In this example, the selectable object 644 may be selected or other input may be provided (e.g., a cursor hover input) to cause display of a content information panel 650 corresponding to the respective content item associated with the selectable object 644. The panel 650 may include content 654 extracted from the respective content item, which may include content item content and/or content item metadata that is obtained from the content item at the hosting platform. Example metadata includes creation time, last edited time, author or content owner, and other similar data. Additionally, the panel 650 may include further generative content 652. The generative content 652 may be produced using the respective content extracted from the content item that is associated with the primary generative response 642. In other examples, the generative content 652 is generated using the generative response 642, or a portion thereof, in a subsequent prompt along with a command or instruction to provide a content summary relevant to the context of the generative response 642. Similar to previous examples, the generative content 652 may be generated using other context data including data obtained or determined using a user profile of the authenticated user, session data, user event history including content interaction events, and other context data. In response to additional user input provided to either the selectable object 644 or an element of the panel 650, the graphical user interface may be redirected to display the respective content item.

FIG. 7 depicts an example graphical interface of a content collaboration platform having an entity card interface. In particular, FIG. 7 depicts an example graphical user interface 700 of a content collaboration platform having an entity card interface 720 that is displayed in response to an entity request user input 732 in the search control 730. The graphical user interface 700 includes many shared elements with the examples of FIGS. 5, 6A, and 6B, a discussion of which is not repeated for clarity.

As shown in the example of FIG. 7, the graphical user interface 700 includes an entity card interface 720, which may be displayed in response to a user input provided to the search control 630, which in this case is a search input or text input field or region. In this particular example, the search control 730 (search input field) receives natural language user input 732, which includes the interrogatory "who is Jane Doe?" In other examples, another search control or graphical element may be used to invoke the service used to cause display of the interface 720. Also, while the present example depicts the interface 720 as a floating window that overlaps or overlays the content panel 702, in other implementations the interface 720 may occupy an entirety of the content panel 702 or may occupy a substantial entirety of the graphical user interface.

As described previously, the natural language user input may be analyzed using an intent recognition module to determine the type of response or results interface that are predicted to be most relevant to the user input. Specifically, as described previously with respect to FIG. 2B, an intent recognition module may be used to analyze the natural language input and determine an action intent. In the present example, the natural language input "who is Jane Doe?" may correspond to a request for an entity (e.g., a person, project, or defined object or term), which may also be referred to as an entity request type or term request type. As a result, in the present example, the interface 720 includes an entity card having content and a set of selectable objects related to the requested entity. Furthermore, the graphical user interface 700 includes a platform selection region 710 having a set of platform selection controls 712, each selectable to cause the system to use content from one or more of the selected platforms to produce the corresponding answer or result.

FIG. 7 depicts one example entity card interface 720, which includes an entity header region 722 which includes an entity title and other header content 723 that may be extracted from a user profile service, entity profile service, or respective platform. The header content 723 may include an entity role, entity location, electronic contact element or platform handle, and other information that may be extracted from the corresponding profile service or platform. As shown in other examples provided herein, the header region 722 or other region of the entity card interface 720 may include generative content that includes other content extracted from the corresponding profile service or platform. The interface 720 also includes selectable card elements that are related to, linked to, or otherwise associated with the respective entity. As described with respect to various examples described herein, the entity may be related to a set of platform-specific and external or off-platform objects and elements. Elements having a sufficiently strong correlation or relationship with the entity may be selected for display on the interface 720. In this specific example, the interface 720 includes a region 724 for common or frequent platforms that the entity (the user) as indicated under the heading "frequent locations." Selectable card elements shown under the region 724 may be determined by analyzing the user event history or a set of aggregated event logs extracted from or preserved from a set of platforms having a user account that corresponds to the selected entity. By extracting aggregated event logs or maintaining a current event record or use analytic data, the elements depicted in region 724 may be dynamically updated and may change over time as the user's interaction with different platforms change. The interface 720 also includes a region 726 for common or frequent collaborators that are associated with the respective entity. Similar to the region 724, the displayed elements may correspond to other system users in which collaboration has been predicted using aggregated event logs, which may be aggregated across multiple platforms. In one example, the event logs are analyzed to extract events that are classified as "content creation" or "content modification" events that involve two or more system users. Example events including co-authoring an electronic document or page, commenting on user-generated content, mentions, tags, or other system activity indicating two users may be using common system resources. Similar to the region 724, the elements in region 726 may be updated dynamically over time to reflect changes in user-system usage. The interface 720 also includes region 728 which may include selectable card elements that are related to the entity or may provide additional information for the user. In this example, the elements correspond to other potential matches for the natural language text 732 provided to the interface 700.

Figure 11:
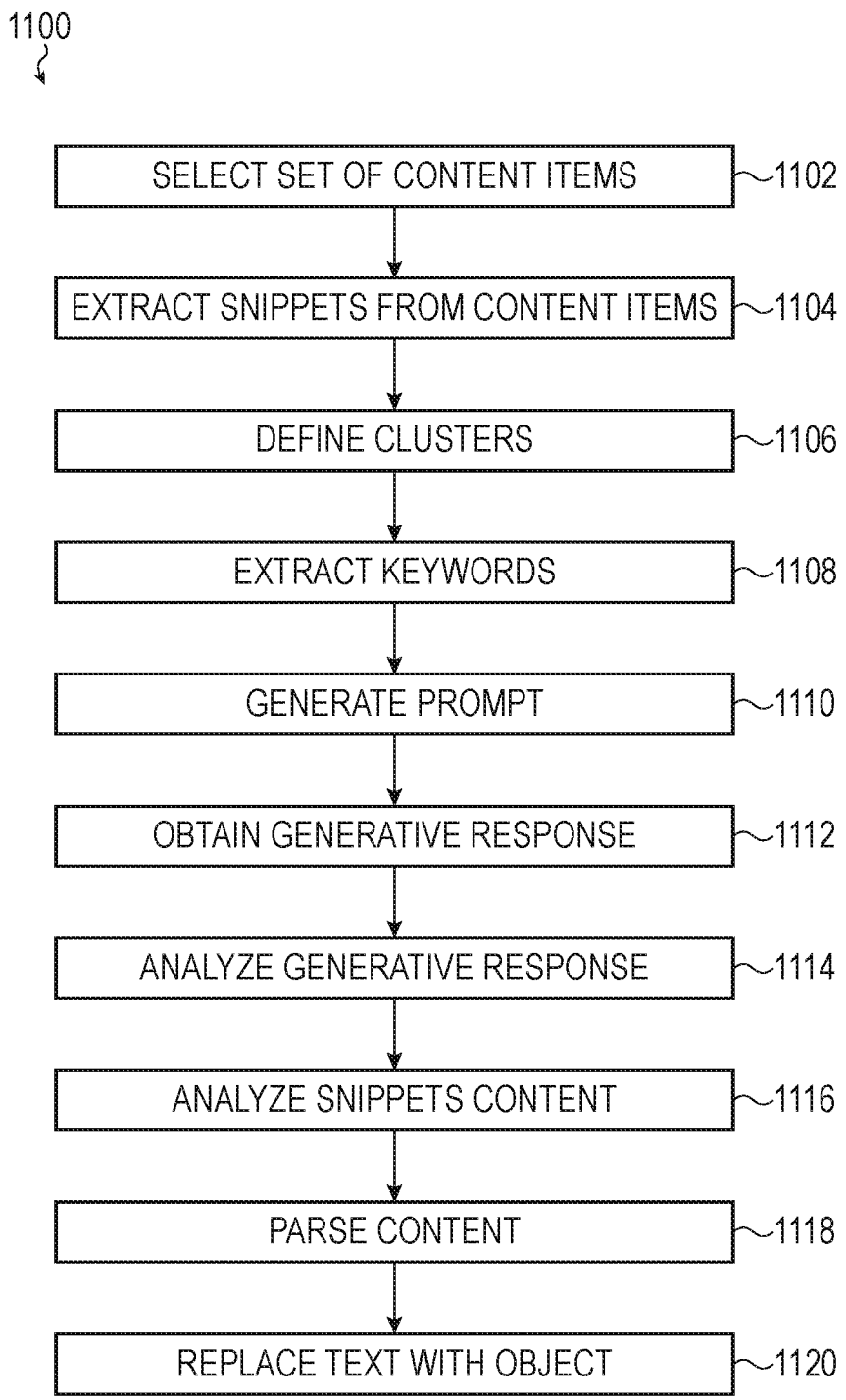
FIG. 11 depicts an example flow chart for generating topic-based data structures.

The platform may be configured to determine or construct relationships between the various elements and objects and elements depicted in the interface 720 and the respective entity by analyzing content managed by the various platform and may be maintained using an entity-based data structure. In some implementations, user activity, as recorded in event logs or user interaction logs is also used to generate and maintain relationships between an entity and various platform objects. As described in more detail below with respect to FIG. 11, the relationships between elements and objects that are related to a respective entity may be generated by processing snippets or text blocks extracted form content items. In the example of FIG. 11, the proposed technique is used to generate a topic-based data structure may be used to generate an entity-based data structure. In some cases, the topic-based data structure may be converted to or used to generate an entity-based data structure. In some platforms, the technique of FIG. 11 is used to define an object-to-entity graph having edges between respective objects and between objects and entities. The data graph and/or the respective data structures may include degrees of correspondence or a degree of relationship between objects and entities, which may be used to select the most closely related elements or objects for inclusion in the entity card interface 720.

FIGS. 8A-8C depict another example entity card interface (800*a*, 800*b*, 800*c*). The entity card interface (800*a*, 800*b*, 800*c*) may be generated and/or displayed in response to a search request or natural language user input, similar to the examples described above with respect to FIGS. 5-7. The entity card interface (800*a*, 800*b*, 800*c*) may also be generated and/or displayed in response to a user selection of a keyword, designated text, or other content in a content item, as described below with respect to FIGS. 12-14B. The entity card interface (800*a*, 800*b*, 800*c*) may also be displayed in response to other interactions with a platform or graphical user interface in which entity-based information may be required or may be useful for navigation.

As shown in FIG. 8A, the entity card interface 800*a* includes a header region 810 that includes header content 812 that may be extracted from a respective user profile or entity-based data structure. The header content 812 may include the entity title (user name), entity or user role, and other content stored for the respective entity. In this example, the header region also includes topic elements 831, which correspond to the topic strings or topic-based data structures that are associated with the respective entity. Generation and association of topic strings and topic-based data structures are described in more detail below with respect to FIG. 11.

The entity card interface 800*a* also includes a panel selection region 811, which includes a set of selectable elements or tabs that can be used to cause display of respective panels in the panel region 814. In the present example, a first selectable element 813*a* ("worked on") is selected, which results in display of selectable card elements 815*a* in the panel region 814. Each selectable card element 815*a* corresponds to a different object (e.g., content item) that is associated with the entity. In this specific example, the selectable card elements 815*a* correspond to content items which the user has created, edited, or otherwise provided content for. As shown in this example, the selectable card elements 815*a* may correspond to on-platform or same platform objects and also off-platform or external objects managed by an external platform. Selection of a particular selectable card element 815a may cause the graphical user interface to be redirected to a detail view of the respective object or content item within the respective platform. In some cases, each of the selectable card elements 815a includes path information that enables user selection and redirection of the graphical user interface. The path information may also be used by the system to access and/or construct an application programming interface call to the platform to extract object data for display in the entity card interface 800a. As a result, the extracted data depicted in the selectable card elements 815a reflects updated or current object data and include content like a current title, author or object creator, date last updated or accessed, embedded graphics, brief summaries, and other extracted object data.

In some cases, the user operating the graphical user interface must have appropriate permissions in order to view respective selectable card elements 815a and/or respective object content. For on-platform or native objects, the permissions profile (e.g., role or access level) of an authenticated user may be check with respect to the permissions of the respective native object and, in accordance with a successful authentication and the user account having appropriate permissions with respect to the object, the respective selectable card element 815a is displayed or rendered. In accordance with the user account not having appropriate permissions or a permissions profile not consistent with the respective object, the respective selectable card element 815a may be suppressed from display or otherwise not rendered in the entity card interface 800a. For non-native, off-platform, or external objects, the system may cause a check of user authentication with respect to the external platform and ensure that the permissions profile of the respective external user account is consistent with the permissions of the external object before rendering or displaying the respective selectable card element 815a. In accordance with an unsuccessful authentication or if the external user account does not have a permissions profile (e.g., role or access level) that is inconsistent with the respective object, display of the respective selectable card element 815a may be suppressed. In this way, the display of the entity card interface 800a may not be used to breach permissions or access requirements of each respective platform.

In other implementations, the entity card interface 800a may also include an entity summary, which may be displayed in the header region 810. The entity summary may be obtained from an entity profile (e.g., user profile) or may be dynamically generated. Either the stored entity summary or the dynamically generated summary may be generated using a generative output engine. For example, as described in more detail below with respect to FIG. 10, a summary may be generated by extracting content from top-ranking or closely related content items and inserting the extracted content in a prompt with predetermined prompt text adapted to generate a description of the respective entity. The prompt may be provided to a generative output engine, which produces a generative response. The entity summary may be generated using the generative response produced by the generative output engine can be dynamically displayed with the entity card interface 800a and/or stored with the entity profile for future use.

FIG. 8B depicts another view of the entity card interface 800b in which a different tab panel has been selected. Specifically, in response to selection of the selectable element 813b, the panel 814 depicts another set of categories of selectable card elements 815b, 816b. As shown in FIG. 8B, selectable card elements 815b, 816b include elements that correspond to external objects managed by an external platform, specifically issues managed by an issue tracking platform. As shown in this example, the selectable card elements 815b, 816b include object data (issue data) that has been extracted from the corresponding issues. As a result, the object data displayed for the selectable card elements 815b, 816b may be dynamically updated and refreshed in response to display of the entity card interface 800b, selection of the respective tab or control, or in accordance with a predetermined time interval.

In the example of FIG. 8B, the selectable card elements 815b, 816b are arranged by category or attribute. The first category (for elements 815b) are objects associated with "current goals," which may depend from an epic or parent issue assigned to the entity. The second category (for elements 816b) are objects associated with "current projects," which may include issues for which the entity may be assigned.

FIG. 8C depicts another view of the entity card interface 800c in which a different tab panel has been selected. Specifically, in response to selection of the selectable element 813c, the panel 814 depicts another set of categories of selectable card elements 815c. As shown in FIG. 8C, selectable card elements 815c include elements that correspond to other entities that are associated with the current entity of the entity card interface 800c. Each of the selectable card elements 815c may be selectable to cause redirection of the graphical user interface to an entity profile (e.g., a project profile or a user profile) associated with the respective element. Each entity associated with the current entity may have a relationship defined by either or both of the entity-based data structure or the topic-based data structure. The relationship may be based on a common or shared set of objects on which the entities are referenced and/or may be based on content items in which both users (if the entities are users) have interacted with. Thus, the relationship may be defined by explicit references defined with respect to system objects or content items and/or defined by system activity, as stored or recorded in user event log data.

FIGS. 9A-9D depict another example entity card interface (900a, 900b, 900c, 9d). The entity card interface (900a, 900b, 900c, 900d) may be generated and/or displayed in response to a search request or natural language user input, similar to the examples described above with respect to FIGS. 5-7. The entity card interface (900a, 900b, 900c, 900d) may also be generated and/or displayed in response to a user selection of a keyword, designated text, or other content in a content item, as described below with respect to FIGS. 12-14B. The entity card interface (900a, 900b, 900c, 900d) may also be displayed in response to other interactions with a platform or graphical user interface in which entity-based information may be required or may be useful for navigation.

While the examples of FIGS. 8A-8C are directed to an entity card in which the entity is a system user, the examples of FIGS. 9A-9D are directed to an entity are in which the entity is a project or other platform entity. Features and functionality described with respect to FIGS. 8A-8C that are shared with the examples of FIGS. 9A-9D are not repeated to improve clarity and reduce redundancy.

As shown in FIGS. 9A-9D, the entity card interface (900a, 900b, 900c, 900d) includes a header region 910 that includes header content 912 that may be extracted from a respective project profile or entity-based data structure. The header content 912 may include the entity title, entity status, and other content stored for the respective entity. In this example, the header region also includes topic elements 931, which correspond to the topic strings or topic-based data structures that are associated with the respective entity. Generation and association of topic strings and topic-based data structures are described in more detail below with respect to FIG. 11.

The entity card interface 900a also includes a panel selection region 911, which includes a set of selectable elements or tabs that can be used to cause display of respective panels in the panel region 914. In the present example, a first selectable element 913a is selectable to cause display of an overview of the entity in the panel region 914. As discussed with respect to other examples, the overview may be obtained from the entity profile or it may be dynamically generated. As also described with respect to other examples, whether stored in the entity profile (as part of the entity-based data structure) the overview or summary may be automatically generated using content extracted from respective content items and providing the extracted content to a generative output engine to produce a generative response. The panel region 914 also includes selectable card elements 915a that correspond to external objects (e.g., issues) managed by an external platform. Detailed descriptions of the summary generation process and selectable card elements for external objects are not repeated here to reduce redundancy.

FIG. 9B depicts another view of the entity card interface 900b in which a different tab panel has been selected. Specifically, in response to selection of the selectable element 913b ("updates"), the panel 914 depicts selectable card elements 915b. The content and selectable card elements 915b may be directed to recently edited documents and/or issues or other objects that have recently changed state or status. As shown in FIG. 9B, selectable card elements 915b include elements that correspond to external objects managed by an external platform (e.g., issues from an issue tracking platform) and elements that correspond to native knowledge based documents hosted by the current platform.

Figures 9C, 9D:
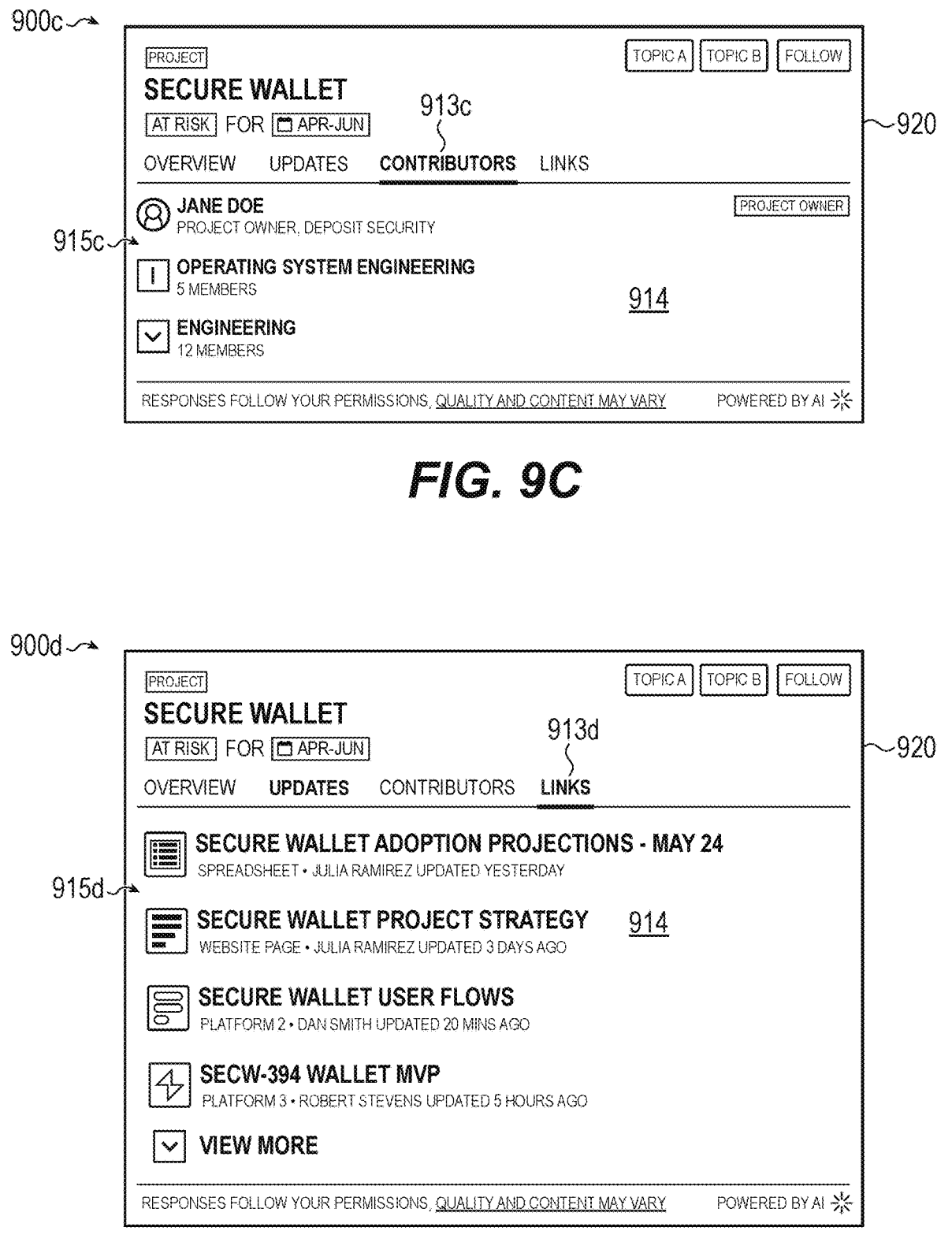

FIG. 9C depicts another view of the entity card interface 900c in which a different tab panel has been selected. Specifically, in response to selection of the selectable element 913c ("contributors"), the panel 914 depicts selectable card elements 915c. The content and selectable card elements 915b may be directed to user accounts, teams, or other entities that have edited documents and/or issues or other objects related to the respective entity. As shown in FIG. 9C, selectable card elements 915c include elements that correspond to user accounts (selectable to cause redirection to a user profile) and defined teams (selectable cause redirection to a team document or team profile).

FIG. 9D depicts another view of the entity card interface 900d in which a different tab panel has been selected. Specifically, in response to selection of the selectable element 913d ("links"), the panel 914 depicts selectable card elements 915d. The content and selectable card elements 915d may be directed to documents, issues, or other objects that are related to the current entity. As shown in FIG. 9D, selectable card elements 915d include elements that correspond to external objects managed by an external platform (e.g., issues and epics from an issue tracking platform, spreadsheets, design layout objects) and elements that correspond to native documents hosted by the current platform.

Figure 10:
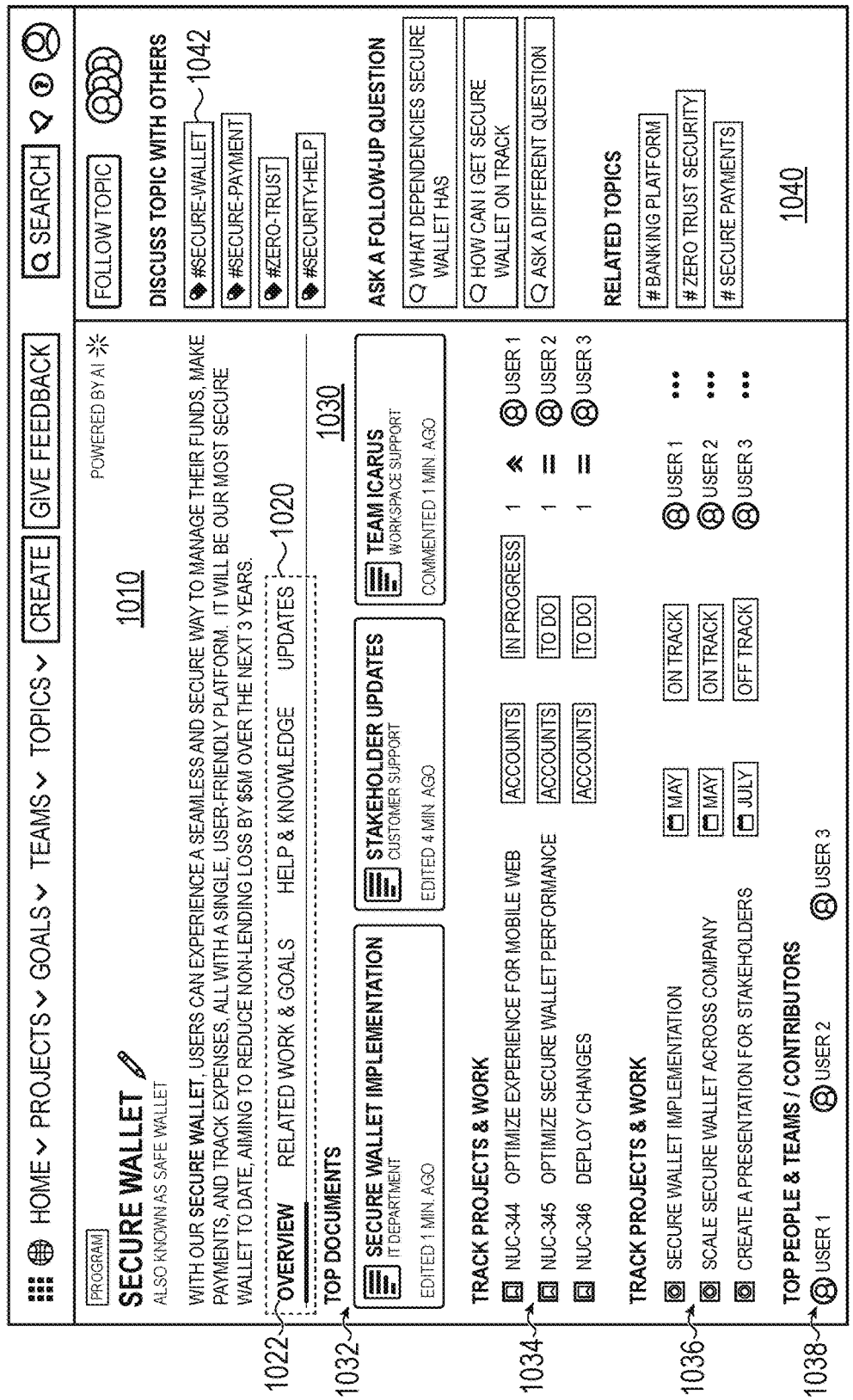
FIG. 10 depicts a detail view of an example entity.

FIG. 10 depicts a detail view of an example entity. Specifically, FIG. 10 depicts a graphical user interface having an example detail view interface 1000 for an example project entity. The objects and content depicted in the interface 1000 may be associated with the entity using an entity-based data structure. As described previously, the entity-based data structure may be based on or generated using a topic-based data structure, described in more detail below with respect to FIG. 11. The entity-based data structure may be generated based on an object graph or other similar data structure that was generated using a technique similar to the technique described with respect to FIG. 11. The entity-based data structure may also be generated based on user event logs, which may indicate user activity with respect to a project or content items that can be related to the entity. For example, a user account or team that is associated with a project may interact with content items (documents or issues) having keywords associated with the project. Based on that activity (as indicated in the event log data or user interaction logs) satisfying a criteria or threshold amount, those content items may be associated with the respective entity and elements corresponding to those content items may be included in the detail view interface 100. Furthermore, a degree or strength of each relationship may also be maintained as part of the entity-based data structure. For example, a content item having more user interactions, more closely related content as indicated through the use of more keywords, and/or having multiple relations to multiple other entity-related objects may result in an increase in the degree or strength of the relationship between the respective object and the entity. The strength of the relationship may be stored as a numerical value and referred to as a relation score or correlation score.

In the example of FIG. 10, the interface 1000 includes a header region 1010 having header content including entity title, entity type, entity summary, and other high-level entity content. As described previously, the entity content may be automatically generated using content extracted from content items or objects that are most closely related to the entity (e.g., having a threshold relation score or correlation score) may be used to generate a prompt, which is provided to a generative output engine in order to produce a generative response. The generative response may be used to create an automatically updated or automatically generated summary for the entity.

As shown in the interface 1000, includes a content region 1030, which includes selectable elements to related objects (e.g., documents, issues, entities, and other objects) and other content related to the respective entity. In this example, the region 1030 includes selectable elements 1032, which include documents, pages, and other similar content items that have at least a threshold relationship correlation with the respective entity. Region 1030 also includes selectable elements 1034 and 1036, which are directed to issues, stories, epics, or other objects of an issue tracking system that have at least a threshold relationship correlation to the respective entity. the region 1030 also includes selectable elements 1038 directed to other entities (e.g., users, projects, teams) that have a threshold relationship correlation to the respective entity.

In some cases, the depicted selectable elements represent only the highest scoring or most highly correlated items and other items may be related to the respective entity and not displayed in order maintain an efficient or usable interface. As discussed previously, only the most relevant or most highly correlated objects may be selected for use on a respective entity card interface, which typically has a reduced interface area as compared to the detail view interface 1000. In some implementations, additional tabs or screens may be accessed using the panel selection region 1020, which includes a set of selectable elements or tabs 1022 that can be used to cause display of respective panels in the panel region 1030. This allows for a large number of object or selectable elements to be associated with the respective entity, while facilitating more organized presentation and easier navigation using the interface 1000.

In the present example, the interface 1000 also includes a topic panel 1040, which includes topics and other content that is associated with or related to the respective topic. As shown in this example, topic strings or topic elements 1042 are included in the region 1040 and may be selectable to cause display of a topic detail view interface. The topic detail view interface may be organized similar to the entity detail view interface and may include similarly organized selectable elements that have at least a threshold relationship correlation with the respective topic. FIG. 11, described in more detail below, describes an example process for determining relationships between objects for a given topic. As discussed previously, the topics associated with a particular entity may be used to identify related objects, which can be used to generate an entity-based data structure and populate the interface 1000.

FIG. 11 depicts an example flow chart for generating topic-based data structures. In particular, FIG. 11 depicts an example process 1100 for generating a topic-based data structure, which may be used to related entities, content items, and other objects across a set of platforms. The operations of process 1100 may be performed on a backend of a content collaboration platform or using a service operating on the backend of the content collaboration platform. As described throughout the specification, the process 1100 may be used to generate topic-based data structures and/or entity-based data structures for use with one or more of the interfaces described herein, which may be operated using a frontend application of the content collaboration platform operably coupled to the backend. In general, the process 1100 enables the system to automatically determine relationships between objects that may be managed by a set of separate platforms and store the relationships as a data structure or as part of a data graph for use by one or more of the platforms.

In operation 1102, a set of documents or other content items are selected. The set of documents are predicted to have authoritative or accurate content and an event history log associated with use of the documents may be used in this determination. Specifically, the event history log for a particular content item may be evaluated to determine a number of interactions indicating consistent and use of a particular nature that indicates authoritative and/or accurate content. A quantitative measure of a sufficient level of authoritativeness or accuracy may be referred to as an authoritative criteria. In one example, a threshold number of interactions having a particular classification are used alone or in combination with a number of interactions having a particular classification with respect to a user having a sufficient reputation score or verified subject matter expertise, as stored in their respective user profile. One example classification may be a content creation event type of classification, which may include object creation events, object modification or revision events, object publication events, object commenting or other content creation activity. If a threshold number of content creation type of events are performed by users having a sufficiently high reputation score or subject matter expertise, the document or object may be selected for use in operation 1102. Another example classification may be a content consumption event type of classification, which may include object viewing events, object sharing events, object linking events. If a threshold number of content consumption events are performed with respect to a particular document or object, the document or object may be selected for use in operation 1102. In some cases, an aggregate of different types of events is used to evaluate a particular object's user history with respect to an authoritative criteria. In some cases, a sufficient number of documents or other objects satisfying the selection criteria must be identified before the process continues to further operations.

In operation 1104, text snippets or text blocks are extracted from the set of documents and a vector representation is determined for each extracted text snippet or text block. In one example implementation, text snippets having a threshold length or range of lengths are extracted. The text snippets may be arranged as blocks of text, as defined in a structured or formatted document. For example, in one specific use case, the text snippets may correspond to nodes of a document object module (DOM) or other similar structure. Each of the text snippets may be converted into (or used to determine) a numerical representation, such as a vector or other similar representation. As part of a vectorization process, word embedding and other techniques may be used to help normalize the vectors across different writing styles or word usage. Other language processing techniques may also be used to analyze and represent the content of the text snippets.

In operation 1106, a set of multiple clusters of text snippets satisfying a clustering criteria are defined based on the vector representation. In one example, similarity analysis is performed between vectors or other representations of the text snippets in order to determine groups or clusters of snippets that satisfy a similarity criteria. In some cases, the similarity criteria is a similarity threshold or other measure of a degree of similarity between the snippets and/or the representations of the snippets. Potential techniques for determining a similarity may include computing a cosine similarity, Euclidian distance, Jaccard similarity, Manhattan distance, or other similar technique. Other techniques for performing the clustering include K-means clustering or other similar technique. A cluster score may be computed using a silhouette score or other similar technique to select clusters having a sufficient degree of relatedness before further processing the clusters in subsequent operations.

In operation 1108, a set of representative keywords are extracted for a particular cluster of text snippets of the set of multiple clusters of text snippets. For each cluster or for a set of clusters defined in operation 1106, a set of representative keywords may be extracted from corresponding text snippets. Keywords may be extracted after the text snippets have been processed to remove potentially noisy or common words that tend to not be indicative of a particular subject matter. For example, a term frequency-inverse document frequency technique may be used to identify potentially important words in a snippet of text or document. In some cases, the keywords are determined using the context of other portions of the content item or object. Text ranking, lemmatization and other natural-language processing techniques may also be used to determine a set of representative keywords for each cluster of text snippets.

In operation 1110 a prompt is generated comprising the set of representative keywords and predetermined prompt text including a topic query portion. Similar to as described above with respect to the examples of FIGS. 1-4B, a prompt may be generated for use with a generative output engine, which may include a large-language model. The keywords for a particular cluster of text snippets may be added to the prompt along with predetermined prompt text, which may include instructions to produce a topic string that relates as many of the keywords as possible. Example input keywords and output topics may also be provided for context. Additional information may be a list of existing keywords and a criteria for either creating a new topic or relating the text snippets to an existing topic.

In operation 1112 a generative response is obtained from a generative output engine using the generated prompt. Similar to as described above with respect to the examples of FIGS. 1-4B a generative response is obtained from a generative output engine, which was generated in response to receiving the prompt produced in operation 1110. In operation 1114, the generative response is analyzed to obtain a topic text string associated with the set of representative keywords. Specifically, in accordance with the instructions and predetermined prompt text, the generative output may include one or more candidate topic text strings, which may be selected in operation 1120. In some cases, operation 1120 associates the text snippets with an existing topic string if the generative results indicate that the candidate topic string matches or is substantially similar to a topic string already defined by the system. In one example, keywords like "Python," "codebase," and "branch," may result in the generation of a topic string "Python code development."

In operation 1116, the particular cluster of text snippets is analyzed to identify at least one system user and a set of content items associated with the particular cluster of text snippets. Once a topic string is generated or an existing topic string is selected corresponding to the extracted keywords, the original text snippets are analyzed to identify objects (content items, entities, and other objects) that are referenced by the text snippets or original content. In some cases, if the text snippets include links or reference to external objects, content for those objects may be obtained using an application programming interface for the purposes of operation 1116. The result of operation 1116 is a set of objects or elements that may be related to the topic string are identified, which may extend across multiple platforms and/or types of objects. The resulting object set may be used to generate the topic-based data structure, an entity-based data structure, an object graph, or another data representation of the relationships between the various objects and the topic, entity or other item of interest. As described previously, a degree of correlation or relatedness may also be computed as part of this operation or set of operations.

Operations 1102-1116 may be performed as a set of grouped operations that are performed sequentially or over an expected time period. Some of the operations may be skipped or may be performed in parallel or at least partially overlapping in time with other operations, as permitted. Operations 1120 and 1122, discussed below, may be optional and may be performed asynchronously with respect to operations 1102-1116. For example, the previous operations 1102-1116 may be performed in accordance with a particular time interval or synchronous schedule and operations 1120 and 1122 may be performed in accordance with a different time interval or in response to a page viewing or page processing operation as the operations are primarily directed to processing the content of a content item. Generally, it may be beneficial to have at least some topics and/or keywords defined using operations 1102-1116 or via another process prior to performing operations 1120 and 1122.

Figure 12:
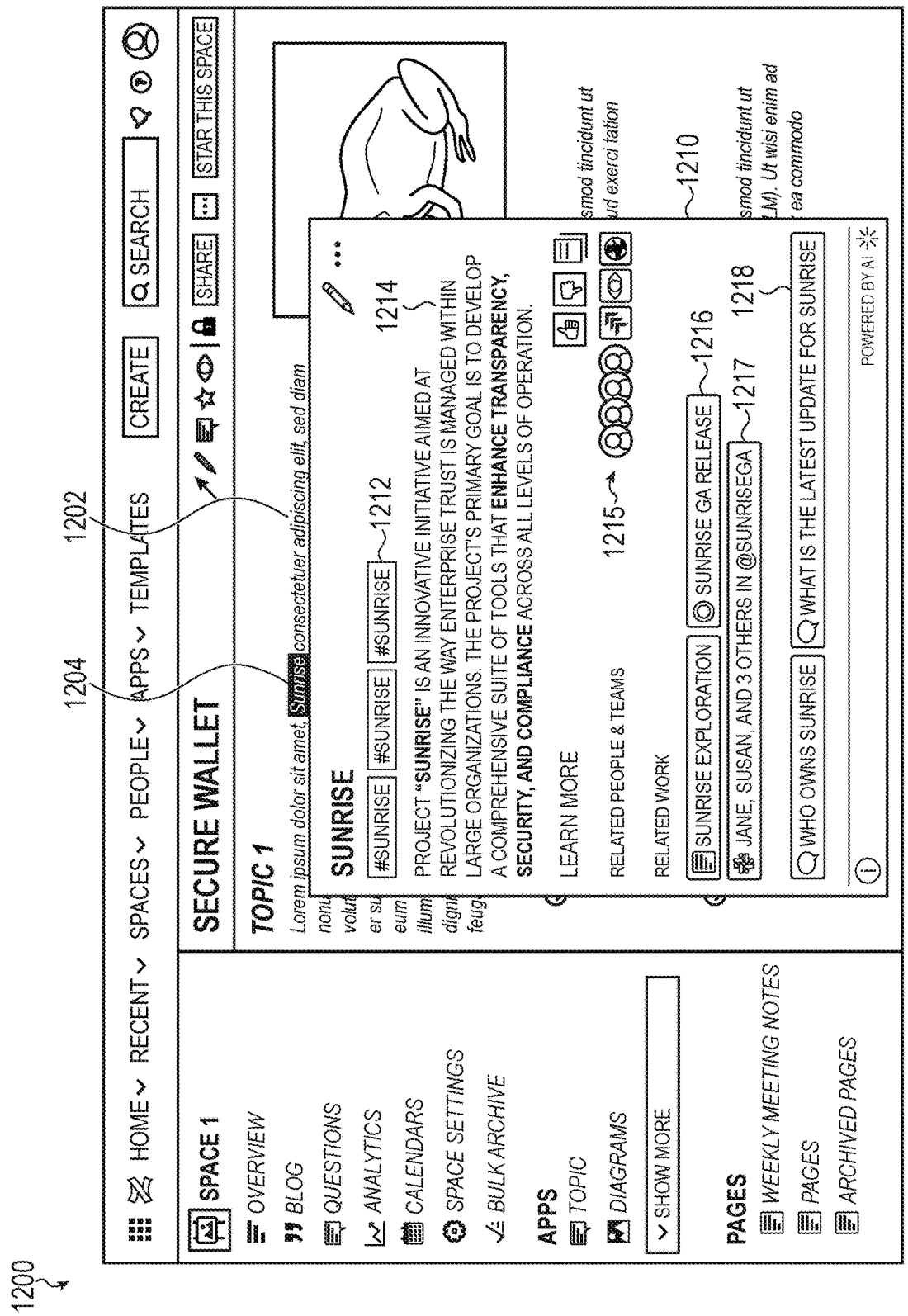

In operation 1120, content is parsed for occurrences of text matching a keyword of the set of representative keywords. Generally, operation 1120 is performed subsequent to a content item of a content collaboration platform being loaded onto a client application or frontend operating on a client device. The content of a page, document, or other content item may be parsed and keywords that are defined via operations 1102-1116 may be selected or identified. FIG. 12 depicts an example graphical user interface 1200 in which a keyword 1204 ("sunrise") is identified as a result of parsing user-generated content 1202. While only one keyword is demonstrated in this specific example, multiple keywords may typically be identified in a single content item. Also, this example is being provided with respect to a content item that is currently rendered. However, in some implementation, operations 1126 and 1128 are performed "offline" while the content item is not being rendered or displayed.

In operation 1122, the matching text is replaced with a selectable object. The selectable object may be a selectable control or other type of object positioned in-line with the user-generated text. In some implementations, identified keywords are rendered in a visually distinct fashion with respect to surrounding text. For example, the identified keywords may be displayed as bolded, underlined, highlighted, surrounded by a rectangle, or otherwise formatted in a visually distinct manner.

Selection of the selectable object causes display of an entity card (entity card interface) including a first selectable card element corresponding to at least one topic text string, a second selectable card element corresponding to the at least one system user, and a third selectable card element corresponding to the content item of the set of content items associated with the particular cluster of text snippets. As show in the example of FIG. 12, an entity card interface 1210 may be displayed in response to a user selection of the selectable object (keyword) 1204. As shown in the example of FIG. 12, the interface includes topic text strings or topic elements 1212, selectable card elements that correspond to at least one system user 1215 and 1217, and selectable card elements 1216 that correspond to respective content items that may be associated with one or more of the topic strings 1212. In this example, the selectable elements corresponding to a system user include profile icons or avatars 1215 that are selectable to cause display of a corresponding entity profile or other similar interface. Additionally, the interface 1210 includes selectable elements 1217 that are directed to a messaging channel or other platform that can be used to communicate with one or more of the respective users. The interface 1210 also includes additional selectable elements which include elements 1218 associated with one or more follow-up questions that may be submitted to a generative output engine via a prompt or may have a previously formulated answer that is cached or stored by the system. Also, as previously discussed, the interface 1210 may include an entity summary 1214, which may be generated using a generative output engine using a prompt containing text extracted from related documents or other content items.

Figure 13:
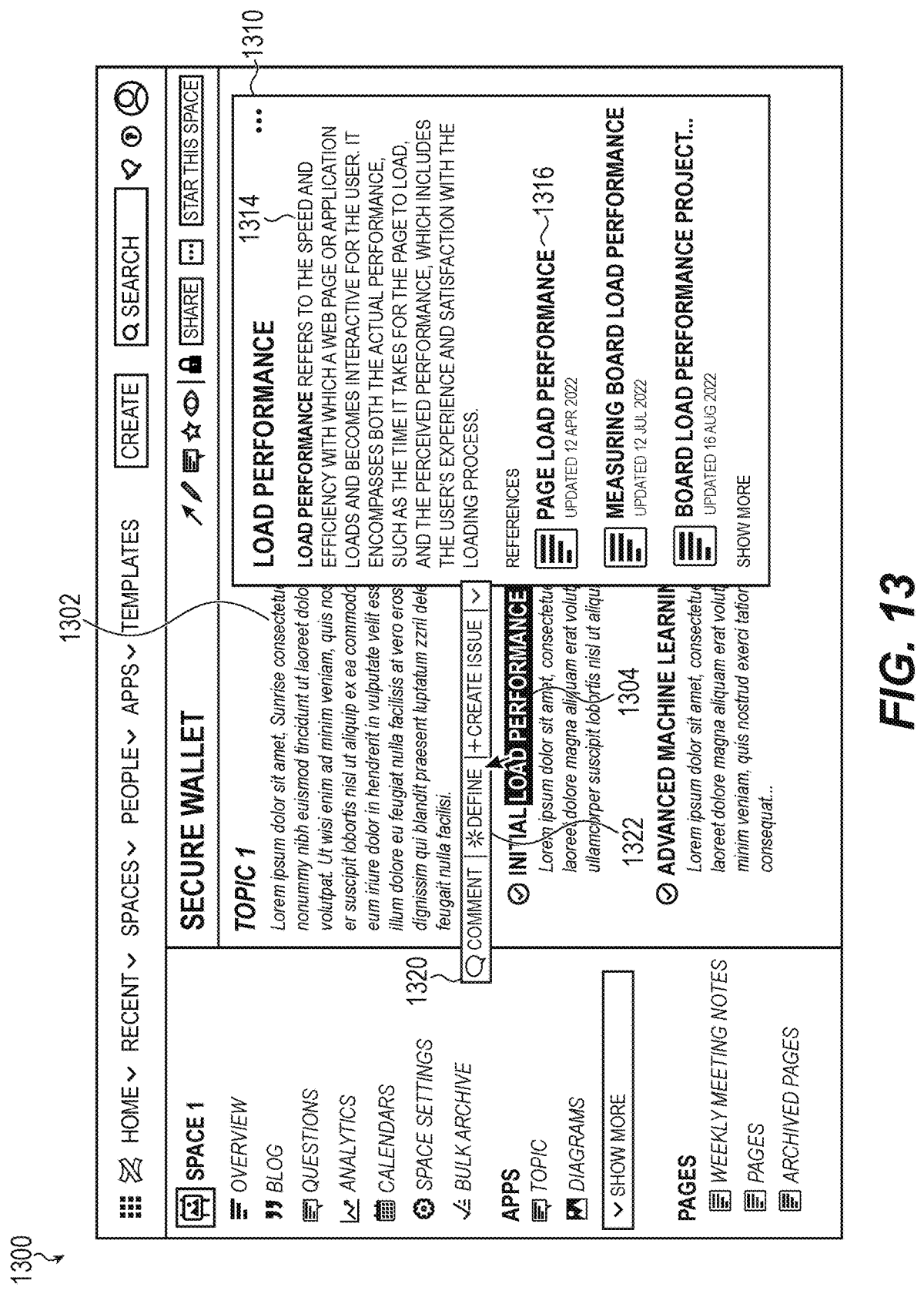

FIG. 13 depicts another example graphical user interface 1300 in which an entity card interface 1310 is displayed in response to a user selection of text 1304 that may not have been designated as a predefined keyword, as shown in the previous example. This allows users to leverage some of the entity definition functionality to obtain definitions, related content items, and other objects for any word or phrase that they choose. In the present example, the user may select the text 1304 "load performance" in line with other user-generated content 1302. In response to user selection of ordinary text (e.g., a non-predefined term), a menu interface 1320 may be displayed with an array of selectable controls. One of the controls 1322 (e.g., "define") includes an option to cause display of an entity card interface 1310. As shown in FIG. 13, the interface 1310 includes a term summary 1314 and selectable card elements 1316 which include objects related to the selected text. The content of the interface 1310 may be generated using one or more of the techniques described herein. In one example, the operations similar to those described with respect to FIG. 2A, which locates and summarizes snippets of text associated with an input, may be used to generate both the entity summary 1314 and the list of associated content items represented by elements 1316. Specifically, the input to the process described with respect to FIG. 2A may be generated by the system to be "define the term 'load performance' as used in the current platform." A result similar to the generative interface of FIG. 6A may be produced as a result. In another example, the object graph or topic- or entity-based data structures produced using the process of FIG. 11 may be traversed for content that is similar or references the selected text. In response to identifying content referencing the selected text, the respective data graph or topic- or entity-based data structures may be used to identify content items having a correlation or relationship with content that is predicted to be authoritative content referencing the selected text. A hybrid of these techniques or other techniques may also be used to generate the content of the interface 1310.

Figure 14A:
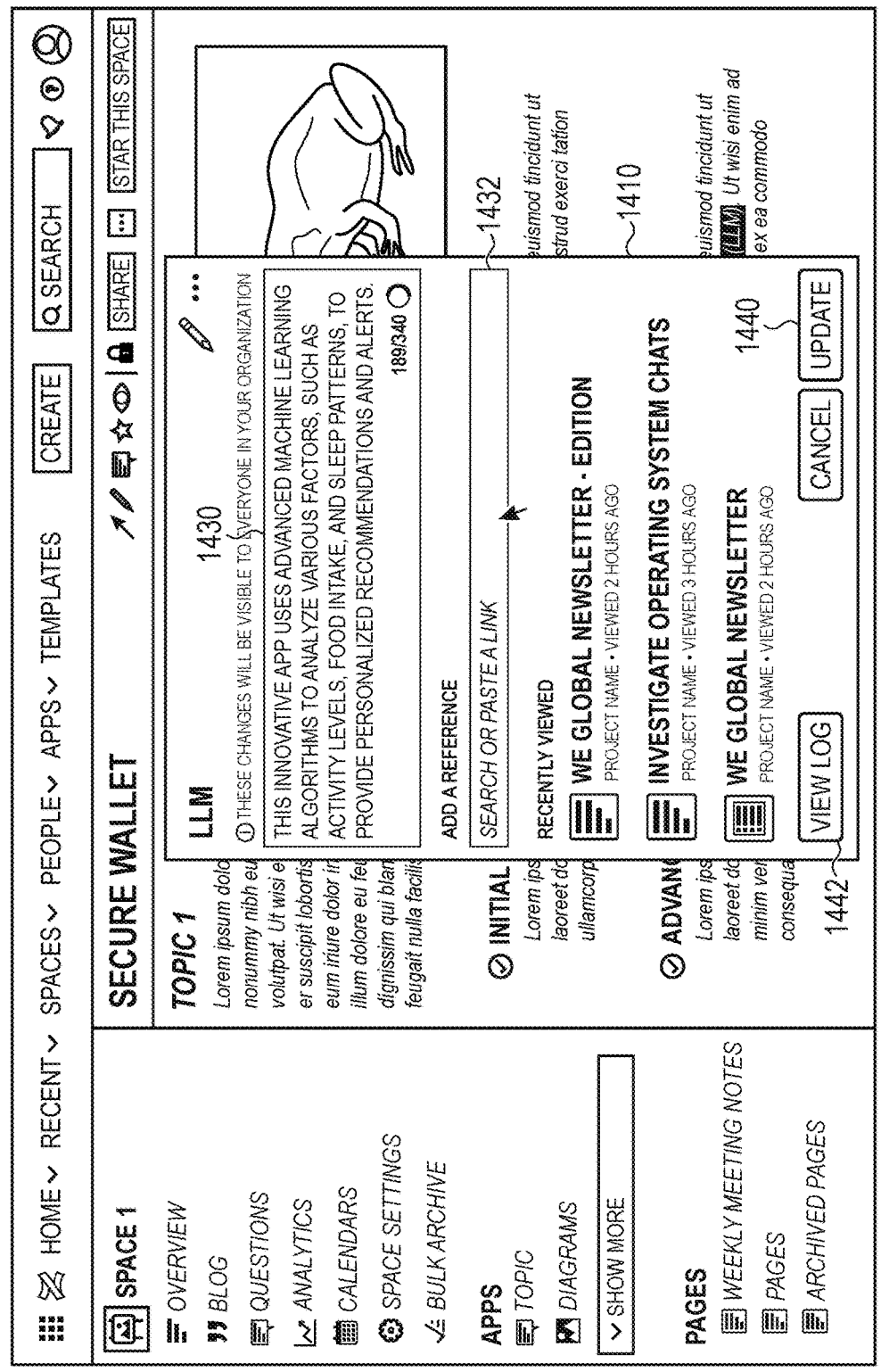
FIG. 14A depicts an example of an edit mode an entity card interface.

In some implementations, the continent of an entity card interface may be edited by a user having appropriate permissions. FIG. 14A depicts an example of an edit mode an entity card interface. This allows system users having the appropriate permissions with respect to a certain entity or class of content to edit the automatically generated content for a more complete explanation, accuracy, or to provide additional context. As shown in FIG. 14A, the interface 1410 may render the entity description and/or other text in an editable field 1430, which may operate a content editor and allow the user to modify the text or other content using a keyboard, mouse, or other input device. Additional content items or other objects may also be associated with the respective entity using control 1332. A path or link to the respective object may be provided to the field of the control 1332. In some instances, a content browser may be invoked and allow the user to navigate, browse, and select content items or other objects. In response to a user selection of the save or update control 1440, the edits may be saved as part of the entity-based data structure so that the edits are preserved for future use. In some cases, the content may be displayed with an indicia or note that indicated that the content was reviewed, edited, and/or approved by a particular user, which may help inform subsequent users of the respective content.

Figure 14B:
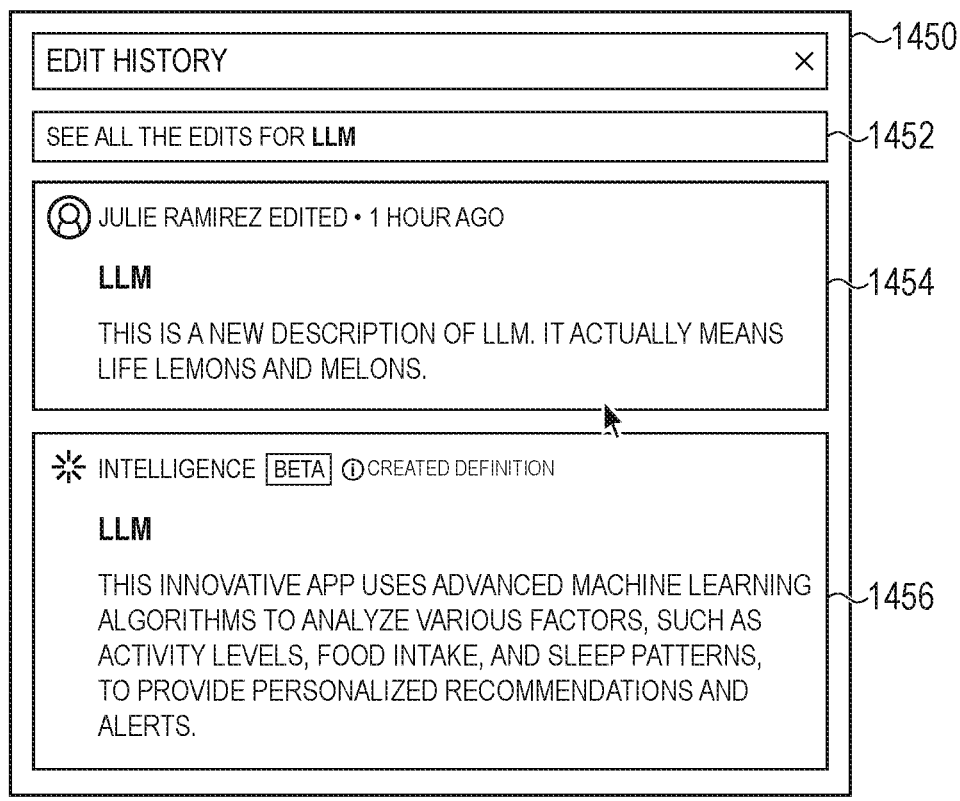
FIG. 14B depicts an example edit log or transaction log with respect to an edit card interface.

FIG. 14B depicts an example edit log or transaction log with respect to an edit card interface 1450. Specifically, the interface 1450 may be displayed in response to a selection of a control (e.g., control 1442 of FIG. 14A) on a respective entity card interface or other control provided in a graphical user interface. As shown in FIG. 14B, the interface includes entries 1454, 1456 for editing and content creation activity. The entries 1454, 1456 may indicate the user that performed the operations, a summary of what operations were performed and a timestamp or other timing indicia corresponding to the occurrence of the respective event. As shown in FIG. 14B, the interface 1450 may also include controls 1452 for causing display of additional event information or details about the edit history of the respective entity content. This enables users to quickly determine what content was automatically generated (using one or more of the techniques described herein) and what content was generated in response to explicit user activity or input. This may help identify the source of potential inaccuracies or audit the ongoing evolution of the respective content.

FIG. 15 depicts an example multi-platform system 1500 for extracting content from multiple platforms 1510, 1520, 1530. Each platform may host respective content items having content that may be extracted using a respective content extraction engine 1512, 1522, 1532 and processed using a respective transformer module 1514, 1524, 1534, which may be used to transform queries into a form suitable for the respective platform and perform data normalization operations. The system 1500 may be accessed by a generative service similar to as described above with respect to FIGS. 2A-2B or in other examples described herein.

In the example of FIG. 15, the system 1500 can be used to access content from a task management platform 1510. An example graphical use interface of a frontend application of a task management platform 1510 is depicted in FIG. 15 and includes an example view of content items managed by the task management platform 1510. Specifically, the task management platform 1510 includes a set of task objects that are being processed in accordance with a task workflow or series of states. The tasks may be managed under a project or task board, which may be arranged as a Kanban board. Using a content extraction engine 1512 that is adapted for use with the task management platform 1510, content may be extracted from platform-specific content items including tasks, boards, projects, task categories or lists, and other platform objects. The content extraction engine 1512 may include a schema mapping that indicates object attributes or elements that contain user-generated content that may be used to service search requests or may be extracted for use in a generative engine prompt. The content extraction engine 1512 may, in some cases, also provide index information and corresponding text that can be used by an index service for rapid identification and retrieval in response to a user query.

Similarly, the system may be used to access content from an issue tracking platform 1520, depicted with an example graphical user interface of a frontend application. The issue tracking platform 1520 may include a set of issues that are used to track tasks or projects of a product development and/or bugs or issues identified in released or deployed software. Each issue may be processed by the issue tracking platform 1520 in accordance with a programmed or predetermined workflow for which the issue transitions through a series of issue states. Each issue includes content data including, for example, issue description, assignee, reviewer, project, comments, issue events, issue subtasks, and other issue data. The content data may be extracted from respective fields including, for example, an issue description field, assignee field, reviewer, field, comment fields, and other similar fields or attributes of an issue object managed by the issue tracking platform 1520. Similar to the previous example, the content extraction engine 1522 may include a schema mapping that indicates object attributes or elements that contain user-generated content that may be used to service search requests or may be extracted for use in a generative engine prompt. The content extraction engine 1522 may, in some cases, also provide index information and corresponding text that can be used by an index service for rapid identification and retrieval in response to a user query.

The system 1500 can also be used to extract content from other platforms including documentation platforms 1530, as described with respect to other examples provided herein. In general, the documentation platform 1530 may manage content items including, electronic pages, documents, blogs, calendars, project overviews, and other electronic content. Similar to the other examples, the content extraction engine 1532 may include a schema mapping that indicates object attributes or elements that contain user-generated content that may be used to service search requests or may be extracted for use in a generative engine prompt. The content extraction engine 1532 may, in some cases, also provide index information and corresponding text that can be used by an index service for rapid identification and retrieval in response to a user query.

As shown in FIG. 15, the system also includes transformer modules 1514, 1524, 1534 that are adapted to pre-process content requests or performing post-processing actions in order to normalize or standardize output from the system 1500 for use with other system elements or systems like the examples provided above with respect to FIGS. 1-5. Example transforming module operations include data transformations from platform-specific schema to a standard or platform-agnostic schema, translation of platform-specific context data to a standard or platform-agnostic context data scheme or format, and other data transformations. In some implementations, the transformer modules 1514, 1524, 1534 or other aspects of the system 1500 may manage user authentication and ensure that content that is accessible using the content extraction engines 1512, 1522, 1524 is content that the authenticated user is authorized to view. In many cases, each platform 1510, 1520, 1530 manages a separate, respective user account having a user profile for each user and, thus, the transformer modules 1514, 1524, 1534 or other aspects of the system may perform an account mapping operation to synchronize a user account of an incoming request with a user account of the respective platform and obtain permissions data for the platform-specific account and content in order to ensure that platform-specific content controls and data security schemes are maintained.

In some cases, the transformer modules 1514, 1524, 1534 or other aspects of the system may be adapted to handle query transformations and use platform-specific calls or commands to construct a platform-specific query. In some cases, the transformer modules 1514, 1524, 1534 or other aspects of the system are able to construct portions of a prompt that can be provided to a generative output engine. An example prompt may include:

{
　"input_prompt": "List all changes to this document since I last visited.",
　"prompt_with_embedded_command": "$ {SELECT description FROM TABLE edit_log WHERE date_added<User123.ThisPage.LastVisit}"
}

In some cases, the pseudo-query language translation of the input prompt may be, itself, a generative output of a generative output engine. In these examples, a first request may be submitted to a generative output engine such as:

{
　"input_prompt": "List all changes to this document since I last visited.",
　"modified_prompt": "Convert the following phrase [list all changes to this document since I last visited] into a Query Language query against a table named 'edit_log' with columns: id, description, date, user.id. Consider 'this document' to be Page123 or by the variable name ThisPage, which is an attribute of the user User123."
}

In response to receiving this modified prompt, the generative output engine may generate the previous example pseudo-query language query.

In some cases, a prompt or request may include links to respective content or may include content that has been extracted and inserted into the prompt. In another example, the prompt may include an embedded command or API call to the other platform or system hosting the data. The embedded command or API call may be processed by the generative output engine or may be processed in advance of providing the prompt to the generative output engine.

An embedded command can be explicit or implicit. For example, an explicit command may be a HTTP request, TCP request, and the like. In other cases, an explicit command may be a command word or phrase associated with a specific action in the target platform. In other cases, a command may be implicit. An implicit command may be a word or phrase that is associated with a particular operation in the target platform, such as "create new document in document platform" or "create new task in task platform." These commands may be executed prior to and/or in parallel with remaining portions of prompts provided as input to a generative output engine. In other cases, an embedded call may be expressly performed before any call to a generative output engine is made. For example, an explicit or implicit command may be a field identifier, such as "${task(id=123) .name.asString( )}" that requires a request to retrieve a name attribute of a specified task, cast as a string. This command may be executed before, and the response from it may be replaced within, a prompt submitted to a generative output engine.

Figure 16:
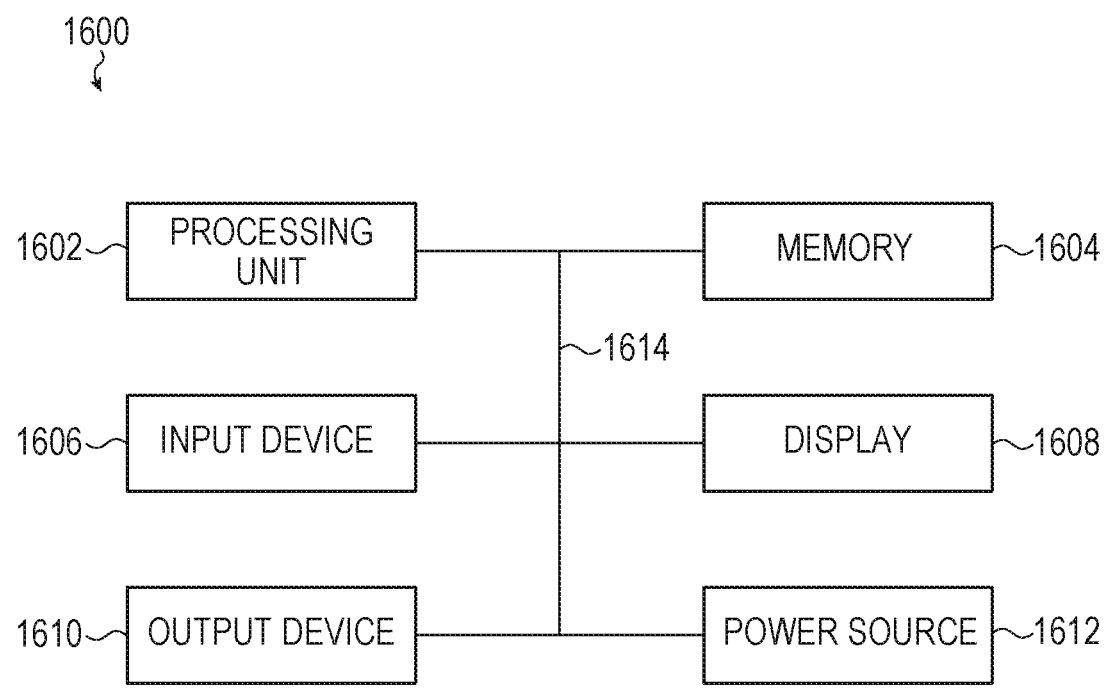
FIG. 16 shows a sample electrical block diagram of an electronic device that may perform the operations described herein.

FIG. 16 shows a sample electrical block diagram of an electronic device 1600 that may perform the operations described herein. The electronic device 1600 may in some cases take the form of any of the electronic devices described with reference to FIGS. 1-15, including client devices, and/or servers or other computing devices associated with the collaboration system 100. The electronic device 1600 can include one or more of a processing unit 1602, a memory 1604 or storage device, input devices 1606, a display 1608, output devices 1610, and a power source 1612. In some cases, various implementations of the electronic device 1600 may lack some or all of these components and/or include additional or alternative components.

The processing unit 1602 can control some or all of the operations of the electronic device 1600. The processing unit 1602 can communicate, either directly or indirectly, with some or all of the components of the electronic device 1600. For example, a system bus or other communication mechanism 1614 can provide communication between the processing unit 1602, the power source 1612, the memory 1604, the input device(s) 1606, and the output device(s) 1610.

The processing unit 1602 can be implemented as any electronic device capable of processing, receiving, or transmitting data or instructions. For example, the processing unit 1602 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 1600 can be controlled by multiple processing units. For example, select components of the electronic device 1600 (e.g., an input device 1606) may be controlled by a first processing unit and other components of the electronic device 1600 (e.g., the display 1608) may be controlled by a second processing unit, where the first and second processing units may or may not be in communication with each other.

The power source 1612 can be implemented with any device capable of providing energy to the electronic device 1600. For example, the power source 1612 may be one or more batteries or rechargeable batteries. Additionally, or alternatively, the power source 1612 can be a power connector or power cord that connects the electronic device 1600 to another power source, such as a wall outlet.

The memory 1604 can store electronic data that can be used by the electronic device 1600. For example, the memory 1604 can store electronic data or content such as, for example, audio and video files, documents and applications, device settings and user preferences, timing signals, control signals, and data structures or databases. The memory 1604 can be configured as any type of memory. By way of example only, the memory 1604 can be implemented as random access memory, read-only memory, flash memory, removable memory, other types of storage elements, or combinations of such devices.

In various embodiments, the display 1608 provides a graphical output, for example associated with an operating system, user interface, and/or applications of the electronic device 1600 (e.g., a chat user interface, an issue-tracking user interface, an issue-discovery user interface, etc.). In one embodiment, the display 1608 includes one or more sensors and is configured as a touch-sensitive (e.g., single-touch, multi-touch) and/or force-sensitive display to receive inputs from a user. For example, the display 1608 may be integrated with a touch sensor (e.g., a capacitive touch sensor) and/or a force sensor to provide a touch- and/or force-sensitive display. The display 1608 is operably coupled to the processing unit 1602 of the electronic device 1600.

The display 1608 can be implemented with any suitable technology, including, but not limited to, liquid crystal display (LCD) technology, light emitting diode (LED) technology, organic light-emitting display (OLED) technology, organic electroluminescence (OEL) technology, or another type of display technology. In some cases, the display 1608 is positioned beneath and viewable through a cover that forms at least a portion of an enclosure of the electronic device 1600.

In various embodiments, the input devices 1606 may include any suitable components for detecting inputs. Examples of input devices 1606 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 1606 may be configured to detect one or more particular types of input and provide a signal (e.g., an input signal) corresponding to the detected input. The signal may be provided, for example, to the processing unit 1602.

As discussed above, in some cases, the input device(s) 1606 includes a touch sensor (e.g., a capacitive touch sensor) integrated with the display 1608 to provide a touch-sensitive display. Similarly, in some cases, the input device(s) 1606 includes a force sensor (e.g., a capacitive force sensor) integrated with the display 1608 to provide a force-sensitive display.

The output devices 1610 may include any suitable components for providing outputs. Examples of output devices 1610 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 1610 may be configured to receive one or more signals (e.g., an output signal provided by the processing unit 1602) and provide an output corresponding to the signal.

In some cases, input devices 1606 and output devices 1610 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 1602 may be operably coupled to the input devices 1606 and the output devices 1610. The processing unit 1602 may be adapted to exchange signals with the input devices 1606 and the output devices 1610. For example, the processing unit 1602 may receive an input signal from an input device 1606 that corresponds to an input detected by the input device 1606. The processing unit 1602 may interpret the received input signal to determine whether to provide and/or change one or more outputs in response to the input signal. The processing unit 1602 may then send an output signal to one or more of the output devices 1610, to provide and/or change outputs as appropriate.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described, and whether or not such features are presented as being a part of a described embodiment. Thus, the breadth and scope of the present invention should not be limited by any of the above-described exemplary embodiments but is instead defined by the claims herein presented.

Furthermore, the foregoing examples and description of instances of purpose-configured software, whether accessible via API as a request-response service, an event-driven service, or whether configured as a self-contained data processing service are understood as not exhaustive. The various functions and operations of a system, such as described herein, can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, which are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference to an implementation in which discrete functions of the system are implemented as discrete microservices. It is appreciated that this is merely one possible implementation.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

What is claimed is:

1. A computer-implemented method for providing an entity card interface in a content collaboration platform, the method comprising:
    subsequent to a successful authentication of a user of a client device, causing display of a graphical user interface of a frontend application of the content collaboration platform on the client device, the graphical user interface including an editor region configured to receive user-generated content for a content item managed by the content collaboration platform;
    selecting a set of documents associated with an event history log that satisfies an authoritative criteria;
    extracting text snippets from the set of documents and determine a vector representation for each extracted text snippet;
    defining a set of multiple clusters of text snippets satisfying a clustering criteria based on the vector representation;
    extracting a set of representative keywords for a particular cluster of text snippets of the set of multiple clusters of text snippets;
    generating a prompt comprising the set of representative keywords and predetermined prompt text including a topic query portion;
    obtaining a generative response from a generative output engine using the generated prompt;
    analyzing the generative response to obtain a topic text string associated with the set of representative keywords;
    analyzing the particular cluster of text snippets to identify at least one system user and a set of content items associated with the particular cluster of text snippets;
    parsing the user-generated content displayed in the graphical user interface for occurrences of text matching a keyword of the set of representative keywords;
    replacing the matching text with a selectable object, selection of the selectable object causes display of an entity card interface including a first selectable card element corresponding to at least one topic text string, a second selectable card element corresponding to the at least one system user, and a third selectable card element corresponding to the content item of the set of content items associated with the particular cluster of text snippets.

2. The computer-implemented method of claim 1, wherein:
    analyzing the particular cluster of text snippets further comprises identifying an external content item hosted by an external platform;
    the entity card interface further comprises a fourth selectable card element corresponding to the external content item; and
    selection of the fourth selectable card element causes the graphical user interface to be redirected to a view of the external content item on the external platform.

3. The computer-implemented method of claim 2, further comprising:
    prior to causing display of the entity card interface, causing an authentication of the user with respect to the external platform;
    in response to an unsuccessful authentication with respect to the external platform, suppressing display of the fourth selectable card element on the entity card interface; and
    in response to a successful authentication with respect to the external platform, causing display of the fourth selectable card element on the entity card interface.

4. The computer-implemented method of claim 1, wherein:
    the at least one system user is selected based on an association score computed with respect to the particular cluster of text snippets; and
    the association score increases in response to increased content creation events with respect to the particular cluster of text snippets.

5. The computer-implemented method of claim 1, wherein:
    the clustering criteria includes a similarity threshold;

defining the set of multiple clusters of text snippets includes performing a similarity analysis on respective vector representations for respective extracted text snippets; and a respective cluster of text snippets is defined based on respective text snippets having a similarity at or above the similarity threshold.

6. The computer-implemented method of claim 1, wherein:

the event history log includes comment events; content view events; content share events; and content edit events; and the set of documents are selected based on a number of occurrences the comment events; the content view events; the content share events; and the content edit events.

7. The computer-implemented method of claim 1, wherein:

the first selectable card element is selectable to cause redirection to a detailed view of the at least one topic text string; and the detailed view including a list of content items, system user profiles, and keywords associated with the at least one topic text string.

8. The computer-implemented method of claim 1, wherein:

the second selectable card element is selectable to cause redirection to a user profile of the at least one system user; and the third selectable card element is selectable to cause redirection to view of the content item of the set of content items associated with the particular cluster of text snippets.

9. A computer-implemented method for providing a generative answer interface in a content collaboration platform, the method comprising:

causing display of a graphical user interface of a frontend application of the content collaboration platform on a client device, the graphical user interface including an editor region configured to receive user-generated content for a content item managed by the content collaboration platform;

in response to a natural language input provided to a search input field of the graphical user interface, analyzing the natural language input to determine an action intent;

in response to the action intent corresponding to a request for content items:

submitting a first query to the content collaboration platform for first content items corresponding to the natural language input;

submitting a second query to a separate platform for second content items corresponding to the natural language input; and causing display of a first response including first query results obtained in response to the first query and second query results obtained in response to the second query;

in response to the action intent corresponding to an interrogatory:

conducting a search of the first content items to extract a set of text blocks each text block satisfying a correlation criteria with respect to the natural language input;

generating a prompt comprising the set of text blocks and predefined query prompt text and providing the prompt to a generative output engine; and causing display of a generative response produced using a response from the generative output engine; and in response to the action intent corresponding to a request for an entity:

submitting a third query to an entity service using an entity portion extracted from the natural language input;

identifying a set of content items from the content collaboration platform and the separate platform corresponding to the entity portion; and causing display of an entity card interface including content obtained using the third query and one or more content items of the set of content items corresponding to the entity portion.

10. The computer-implemented method of claim 9, wherein:

the entity card interface further comprises a selectable card element associated with a topic text string;

the topic text string is generated by:

selecting a set of documents having an event history log that satisfies an authoritative criteria;

extracting text snippets from the set of documents and defining a set of multiple clusters of text snippets satisfying a clustering criteria;

extracting a set of representative keywords for a particular cluster of text snippets of the set of multiple clusters of text snippets;

generating a prompt comprising the set of representative keywords and predetermined prompt text including a topic query portion;

obtaining a generative response from a generative output engine using the generated prompt; and analyzing the generative response to obtain a topic text string associated with the set of representative keywords.

11. The computer-implemented method of claim 9, wherein:

the entity card interface further comprises a selectable card element associated with a topic text string;

the topic text string is associated to a set of system users by a topic-based data structure;

the topic text string is associated with a set of content items by the topic data structure; and the entity card interface further comprises a second selectable card element corresponding to a system user of the set of system users, and a third selectable card element corresponding to a content item of the set of content items.

12. The computer-implemented method of claim 9, wherein:

the entity card interface further comprises an entity summary; and the entity summary is generated by:

extracting a at least a portion of text content from the set of content items corresponding to the entity portion;

generating an entity prompt including the at least the portion of the extracted text content;

receiving an entity generative response from the generative output engine, the generative response produced using the entity prompt; and analyzing the entity generative response to generate the entity summary.

13. The computer-implemented method of claim 9, further comprising:

authenticating a user of the client device with respect to the content collaboration platform;

authenticating the user with respect to the separate platform; and in response to an unsuccessful authentication of the user with respect to the separate platform, suppressing display of second query results.

14. The computer-implemented method of claim 9, wherein:

in response to the action intent corresponding to the interrogatory, causing display of the first response including the first query results obtained in response to the first query and the second query results obtained in response to the second query;

the first and second query results displayed below the generative response;

in response to the action intent corresponding to the request for the entity, causing display of the first response including the first query results obtained in response to the first query and the second query results obtained in response to the second query; and the first and second query results displayed below the entity card interface.

15. A computer-implemented method for providing a generative answer interface in a content collaboration platform, the method comprising:

identifying a set of documents satisfying an authoritative criteria based on a use history of the set of documents in the content collaboration platform;

extracting text blocks from the set of documents and defining a set of multiple clusters of text blocks satisfying a clustering criteria;

extracting a set of representative keywords for a particular cluster of text blocks of the set of multiple clusters of text blocks;

generating a prompt comprising the set of representative keywords and predetermined prompt text including a topic query portion;

obtaining a generative response from a generative output engine using the generated prompt;

analyzing the generative response to obtain a topic text string associated with the set of representative keywords;

analyzing the particular cluster of text blocks to identify at least one system user and a set of content items associated with the particular cluster of text blocks;

causing display of a graphical user interface of a frontend application of the content collaboration platform on a client device, the graphical user interface a content region displaying user-generated content for a content item managed by the content collaboration platform;

parsing the user-generated content displayed in the graphical user interface for occurrences of text matching a keyword of the set of representative keywords; and replacing the matching text with a selectable object, selection of the selectable element causes display of an entity card interface including:

a first selectable card element corresponding to at least one topic text string;

a second selectable card element corresponding to the at least one system user; and a third selectable card element corresponding to the content item of the set of content items associated with the particular cluster of text blocks.

16. The computer-implemented method of claim 15, wherein:

analyzing the particular cluster or text blocks includes identifying at least one external content item hosted by an external platform; and the entity card interface further comprises a fourth selectable card element corresponding to the at least one external content item.

17. The computer-implemented method of claim 16, wherein:

in response to an unsuccessful authentication of a user of the client device with respect to the external platform, suppressing display of the fourth selectable card element.

18. The computer-implemented method of claim 16, wherein:

the content collaboration platform is a documentation platform;

the content items are user-generated electronic pages;

the external platform is an issue tracking platform; and the at least one external content item is an issue hosted by the issue tracking platform.

19. The computer-implemented method of claim 16, wherein:

defining the set of multiple clusters of text blocks comprises:

computing a vector representation for each text block;

performing a similarity analysis between vector representations of the text blocks; and defining respective clusters of text blocks based on vector representations having a threshold similarity.

20. The computer-implemented method of claim 16, wherein:

the entity card interface further comprises an entity summary; and the entity summary is generated by:

extracting at least a portion of text content from the set of content items corresponding to the particular cluster of text blocks;

generating an entity prompt including the at least the portion of the extracted text content;

receiving an entity generative response from the generative output engine, the generative response produced using the entity prompt; and analyzing the entity generative response to generate the entity summary.

* * * * *